United States Patent
Moloian et al.

(10) Patent No.: US 10,664,312 B2
(45) Date of Patent: *May 26, 2020

(54) COMPUTING RESOURCE INVENTORY SYSTEM

(71) Applicant: Bank of America Corporation, Charlotte, NC (US)

(72) Inventors: Armen Moloian, Thousand Oaks, CA (US); Ronald W. Ritchey, Centerville, VA (US)

(73) Assignee: Bank of America Corporation, Charlotte, NC (US)

( * ) Notice: Subject to any disclaimer, the term of this patent is extended or adjusted under 35 U.S.C. 154(b) by 349 days.

This patent is subject to a terminal disclaimer.

(21) Appl. No.: 15/712,336

(22) Filed: Sep. 22, 2017

(65) Prior Publication Data

US 2018/0011740 A1     Jan. 11, 2018

Related U.S. Application Data

(63) Continuation of application No. 15/064,891, filed on Mar. 9, 2016, now Pat. No. 9,792,153, which is a
(Continued)

(51) Int. Cl.
*G06F 11/34*     (2006.01)
*H04L 12/26*     (2006.01)
(Continued)

(52) U.S. Cl.
CPC ............ *G06F 9/50* (2013.01); *G06F 11/3051* (2013.01); *G06F 11/3466* (2013.01); *G06F 16/283* (2019.01); *H04L 43/06* (2013.01)

(58) Field of Classification Search
CPC ...... G06F 9/50; G06F 16/283; G06F 11/3466; G06F 11/3051; G06F 21/50; H04L 43/06; H04L 43/065; H04L 63/10
(Continued)

(56) References Cited

U.S. PATENT DOCUMENTS 5,077,582 A * 12/1991 Kravette ................ G03G 15/55
                                                          399/10
5,574,927 A    11/1996 Scantlin
(Continued)

FOREIGN PATENT DOCUMENTS

EP         0707264 A2     4/1996
JP       2003186708 A     7/2003

OTHER PUBLICATIONS

Tuebora Access Nirvana, "Tuebora IAM Service," Tuebora, Inc., California, 2012. Retrieved from [http://www.tuebora.com/] on Mar. 27, 2014.

(Continued)

*Primary Examiner* — Phuong Thao Cao
(74) *Attorney, Agent, or Firm* — Banner & Witcoff, Ltd.; Michael A. Springs

(57) ABSTRACT

Systems and methods of managing computing resources of a computing system are described. A computing resource list and computing resource information may be stored at a data store. The computing resource list may identify a set of computing resources of a computing system, and the computing resource information may respectively describe the computing resources. The computing resource list may be updated in response to a new computing resource being added to the computing system or in response to an existing computing resource being removed from the computing system. Evaluation tasks for the computing resources may be performed, and a resource evaluation report may be generated during performance of at least one of the evaluation reports.

20 Claims, 29 Drawing Sheets

Related U.S. Application Data continuation of application No. 14/267,586, filed on May 1, 2014, now Pat. No. 9,529,629, which is a continuation-in-part of application No. 13/801,314, filed on Mar. 13, 2013, now Pat. No. 9,639,594.

(60) Provisional application No. 61/740,205, filed on Dec. 20, 2012.

(51) Int. Cl.
  *G06F 11/30* (2006.01)
  *G06F 9/50* (2006.01)
  *G06F 16/28* (2019.01)

(58) Field of Classification Search
  USPC ........................................................ 707/600
  See application file for complete search history.

(56) References Cited

U.S. PATENT DOCUMENTS

| | | | |
|---|---|---|---|
| 5,649,099 A | 7/1997 | Theimer et al. | |
| 5,889,953 A | 3/1999 | Thebaut et al. | |
| 5,987,611 A | 11/1999 | Freund | |
| 6,321,334 B1 | 11/2001 | Jerger et al. | |
| 6,400,726 B1 | 6/2002 | Piret et al. | |
| 6,434,559 B1 | 8/2002 | Lundberg et al. | |
| 6,460,141 B1 | 10/2002 | Olden | |
| 6,711,687 B1 | 3/2004 | Sekiguchi | |
| 6,738,973 B1 | 5/2004 | Rekimoto | |
| 6,748,447 B1 | 6/2004 | Basani et al. | |
| 6,782,350 B1 | 8/2004 | Burnley et al. | |
| 6,947,989 B2 | 9/2005 | Gullotta et al. | |
| 6,968,385 B1 | 11/2005 | Gilbert | |
| 6,983,278 B1 | 1/2006 | Yu et al. | |
| 7,075,895 B1 | 7/2006 | Hanam | |
| 7,225,195 B2 * | 5/2007 | Avrahami | G06F 16/283 |
| | | | 707/600 |
| 7,260,689 B1 | 8/2007 | Xu et al. | |
| 7,340,469 B1 | 3/2008 | Alghathbar et al. | |
| 7,356,601 B1 | 4/2008 | Clymer et al. | |
| 7,614,082 B2 | 11/2009 | Adams et al. | |
| 7,630,974 B2 | 12/2009 | Remahl et al. | |
| 7,657,453 B2 | 2/2010 | Guldner et al. | |
| 7,657,528 B2 | 2/2010 | Bittner et al. | |
| 7,712,127 B1 | 5/2010 | Thompson et al. | |
| 7,730,094 B2 | 6/2010 | Kaler et al. | |
| 7,739,245 B1 | 6/2010 | Agarwal et al. | |
| 7,779,119 B2 * | 8/2010 | Ginter | G06F 21/55 |
| | | | 709/219 |
| 7,831,642 B1 | 11/2010 | Kumaresan et al. | |
| 7,895,638 B2 | 2/2011 | Becker et al. | |
| 7,996,368 B1 | 8/2011 | Nalder et al. | |
| 8,051,298 B1 | 11/2011 | Burr et al. | |
| 8,082,335 B2 | 12/2011 | Mishra et al. | |
| 8,086,635 B1 | 12/2011 | Rinker | |
| 8,121,913 B2 | 2/2012 | Bracken et al. | |
| 8,135,633 B1 | 3/2012 | LeBaron et al. | |
| 8,160,904 B1 | 4/2012 | Smith | |
| 8,181,016 B1 | 5/2012 | Borgia et al. | |
| 8,196,184 B2 | 6/2012 | Amirov et al. | |
| 8,196,195 B2 | 6/2012 | Bartley et al. | |
| 8,204,907 B1 | 6/2012 | Smith | |
| 8,230,434 B2 | 7/2012 | Armstrong et al. | |
| 8,230,484 B1 | 7/2012 | Wiese | |
| 8,306,854 B1 | 11/2012 | Bray et al. | |
| 8,327,457 B1 | 12/2012 | Ferrara et al. | |
| 8,386,711 B2 | 2/2013 | Miyamoto et al. | |
| 8,418,229 B2 | 4/2013 | Baikalov et al. | |
| 8,438,611 B2 | 5/2013 | Faitelson et al. | |
| 8,458,337 B2 | 6/2013 | Corley et al. | |
| 8,533,168 B2 | 9/2013 | Kuehr-McLaren et al. | |
| 8,539,556 B1 | 9/2013 | Brandwine | |
| 8,543,607 B2 | 9/2013 | Sreedhar | |
| 8,555,403 B1 | 10/2013 | Kilday | |
| 8,613,051 B2 | 12/2013 | Nguyen | |
| 8,635,689 B2 | 1/2014 | Hernandez et al. | |
| 8,639,622 B1 | 1/2014 | Moore et al. | |
| 8,639,625 B1 | 1/2014 | Ginter et al. | |
| 8,645,843 B2 | 2/2014 | Chee et al. | |
| 8,656,455 B1 | 2/2014 | Bailey et al. | |
| 8,661,534 B2 | 2/2014 | Chatterjee et al. | |
| 8,688,813 B2 | 4/2014 | Maes | |
| 8,700,581 B2 | 4/2014 | Paknad et al. | |
| 8,706,692 B1 | 4/2014 | Luthra et al. | |
| 8,745,711 B2 | 6/2014 | Matsuda | |
| 8,775,593 B2 | 7/2014 | O'Sullivan et al. | |
| 8,819,492 B2 | 8/2014 | Dande et al. | |
| 8,832,410 B2 | 9/2014 | Springberg | |
| 8,925,028 B2 | 12/2014 | Talbert et al. | |
| 8,964,990 B1 | 2/2015 | Baer et al. | |
| 9,202,049 B1 | 12/2015 | Book et al. | |
| 9,219,635 B2 | 12/2015 | Kumazawa | |
| 9,244,818 B1 | 1/2016 | Paleja | |
| 9,246,945 B2 | 1/2016 | Chari et al. | |
| 9,250,955 B1 | 2/2016 | Cox et al. | |
| 9,280,646 B1 | 3/2016 | Nandyalam et al. | |
| 9,330,134 B2 | 5/2016 | Long et al. | |
| 9,460,303 B2 | 10/2016 | MacLeod et al. | |
| 9,491,077 B2 * | 11/2016 | Ahlers | H04L 43/0876 |
| 9,621,584 B1 * | 4/2017 | Schmidt | G06F 21/577 |
| 2001/0023421 A1 | 9/2001 | Numao et al. | |
| 2002/0013855 A1 | 1/2002 | Ishii et al. | |
| 2002/0069084 A1 * | 6/2002 | Donovan | G06Q 50/265 |
| | | | 705/325 |
| 2002/0095322 A1 | 7/2002 | Zarefoss | |
| 2002/0099825 A1 | 7/2002 | Fertell et al. | |
| 2002/0099952 A1 | 7/2002 | Lambert et al. | |
| 2002/0138599 A1 * | 9/2002 | Dilman | H04L 41/00 |
| | | | 709/223 |
| 2002/0147801 A1 | 10/2002 | Gullotta et al. | |
| 2002/0156816 A1 | 10/2002 | Kantrowitz et al. | |
| 2002/0156904 A1 | 10/2002 | Gullotta et al. | |
| 2002/0169871 A1 * | 11/2002 | Cravo de Almeida | |
| | | | H04L 43/065 |
| | | | 709/224 |
| 2002/0169876 A1 | 11/2002 | Curie et al. | |
| 2003/0005333 A1 | 1/2003 | Noguchi et al. | |
| 2003/0061216 A1 | 3/2003 | Moses | |
| 2003/0061404 A1 | 3/2003 | Atwal et al. | |
| 2003/0078932 A1 | 4/2003 | Kaiserwerth et al. | |
| 2003/0083846 A1 | 5/2003 | Curtin et al. | |
| 2003/0221012 A1 | 11/2003 | Herrmann et al. | |
| 2003/0229623 A1 | 12/2003 | Chang et al. | |
| 2004/0010463 A1 | 1/2004 | Hahn-Carlson et al. | |
| 2004/0034582 A1 | 2/2004 | Gilliam et al. | |
| 2004/0158455 A1 | 8/2004 | Spivack et al. | |
| 2004/0160304 A1 | 8/2004 | Mosgrove et al. | |
| 2004/0181771 A1 | 9/2004 | Anonsen et al. | |
| 2004/0186798 A1 | 9/2004 | Blitch et al. | |
| 2004/0205360 A1 | 10/2004 | Norton et al. | |
| 2004/0210580 A1 | 10/2004 | Butler et al. | |
| 2004/0267552 A1 | 12/2004 | Gilliam et al. | |
| 2005/0021360 A1 | 1/2005 | Miller et al. | |
| 2005/0027948 A1 | 2/2005 | Marlan et al. | |
| 2005/0097353 A1 | 5/2005 | Patrick et al. | |
| 2005/0114226 A1 | 5/2005 | Tripp et al. | |
| 2005/0138031 A1 | 6/2005 | Wefers | |
| 2005/0143231 A1 | 6/2005 | Turnbull et al. | |
| 2005/0160411 A1 | 7/2005 | Sangal et al. | |
| 2005/0187852 A1 | 8/2005 | Hwang | |
| 2005/0227694 A1 | 10/2005 | Hayashi | |
| 2005/0262188 A1 | 11/2005 | Mamou et al. | |
| 2005/0283354 A1 | 12/2005 | Ouimet | |
| 2005/0288978 A1 | 12/2005 | Furland et al. | |
| 2006/0005256 A1 | 1/2006 | Cox | |
| 2006/0015450 A1 | 1/2006 | Guck et al. | |
| 2006/0031679 A1 | 2/2006 | Soltis et al. | |
| 2006/0059543 A1 | 3/2006 | Knowles et al. | |
| 2006/0098790 A1 | 5/2006 | Mendonca et al. | |
| 2006/0136582 A1 | 6/2006 | Mills | |
| 2006/0137019 A1 | 6/2006 | Dettinger et al. | |
| 2006/0143685 A1 | 6/2006 | Vasishth et al. | |
| 2006/0155738 A1 | 7/2006 | Baldwin et al. | |

(56) References Cited

U.S. PATENT DOCUMENTS

| | | |
|---|---|---|
| 2006/0156384 A1 | 7/2006 | Minium et al. |
| 2006/0161307 A1 | 7/2006 | Patel et al. |
| 2006/0178898 A1 | 8/2006 | Habibi |
| 2006/0190985 A1 | 8/2006 | Vasishth et al. |
| 2006/0293029 A1 | 12/2006 | Jha et al. |
| 2007/0005601 A1 | 1/2007 | Gaucas |
| 2007/0006284 A1 | 1/2007 | Adams et al. |
| 2007/0022315 A1 | 1/2007 | Comegys |
| 2007/0053381 A1 | 3/2007 | Chacko et al. |
| 2007/0079357 A1 | 4/2007 | Grinstein |
| 2007/0079369 A1 | 4/2007 | Grinstein |
| 2007/0079384 A1 | 4/2007 | Grinstein |
| 2007/0129960 A1 | 6/2007 | Farrell |
| 2007/0156694 A1 | 7/2007 | Lim |
| 2007/0156695 A1 | 7/2007 | Lim |
| 2007/0156912 A1 | 7/2007 | Crawford |
| 2007/0185814 A1 | 8/2007 | Boccon-Gibod et al. |
| 2007/0214497 A1 | 9/2007 | Montgomery et al. |
| 2007/0233531 A1 | 10/2007 | McMahon |
| 2007/0233600 A1 | 10/2007 | McMahon |
| 2007/0245013 A1 | 10/2007 | Saraswathy et al. |
| 2007/0271185 A1* | 11/2007 | Engler .................. G06Q 10/10 705/51 |
| 2007/0288714 A1 | 12/2007 | Nakamura |
| 2008/0005321 A1 | 1/2008 | Ma et al. |
| 2008/0027965 A1 | 1/2008 | Garrett et al. |
| 2008/0040810 A1 | 2/2008 | Kurokawa |
| 2008/0052102 A1 | 2/2008 | Taneja et al. |
| 2008/0060058 A1 | 3/2008 | Shea et al. |
| 2008/0097998 A1 | 4/2008 | Herbach |
| 2008/0098454 A1 | 4/2008 | Toh |
| 2008/0098484 A1 | 4/2008 | Cicchitto et al. |
| 2008/0098485 A1 | 4/2008 | Chiou |
| 2008/0120302 A1 | 5/2008 | Thompson et al. |
| 2008/0133907 A1 | 6/2008 | Parkinson |
| 2008/0147885 A1* | 6/2008 | Bessis ............... H04L 29/12066 709/250 |
| 2008/0148253 A1 | 6/2008 | Badwe et al. |
| 2008/0163347 A1 | 7/2008 | Ratcliff et al. |
| 2008/0215509 A1 | 9/2008 | Charlton |
| 2008/0244602 A1 | 10/2008 | Bennington et al. |
| 2008/0244605 A1 | 10/2008 | Bennington et al. |
| 2008/0256568 A1 | 10/2008 | Rowland |
| 2008/0288330 A1 | 11/2008 | Hildebrand et al. |
| 2008/0306985 A1 | 12/2008 | Murray et al. |
| 2008/0313703 A1 | 12/2008 | Flaks et al. |
| 2008/0320603 A1 | 12/2008 | Ito |
| 2009/0063691 A1 | 3/2009 | Kalofonos et al. |
| 2009/0089291 A1 | 4/2009 | Daily et al. |
| 2009/0132813 A1 | 5/2009 | Schibuk |
| 2009/0138960 A1 | 5/2009 | Felty et al. |
| 2009/0150981 A1 | 6/2009 | Amies et al. |
| 2009/0158421 A1 | 6/2009 | Hunt |
| 2009/0172674 A1 | 7/2009 | Bobak et al. |
| 2009/0222552 A1* | 9/2009 | Chroscielewski .. G06F 11/3438 709/224 |
| 2009/0271348 A1 | 10/2009 | Allen et al. |
| 2009/0271349 A1 | 10/2009 | Allen et al. |
| 2009/0271394 A1 | 10/2009 | Allen et al. |
| 2009/0271862 A1 | 10/2009 | Allen et al. |
| 2009/0287529 A1 | 11/2009 | Johnson |
| 2009/0300711 A1 | 12/2009 | Tokutani et al. |
| 2009/0307597 A1 | 12/2009 | Bakman |
| 2009/0313079 A1 | 12/2009 | Wahl |
| 2009/0320088 A1 | 12/2009 | Gill et al. |
| 2010/0004948 A1 | 1/2010 | Toomey et al. |
| 2010/0030777 A1 | 2/2010 | Panwar et al. |
| 2010/0043051 A1 | 2/2010 | Deputat et al. |
| 2010/0061249 A1 | 3/2010 | Rius i Riu et al. |
| 2010/0067390 A1 | 3/2010 | Pereira Valente et al. |
| 2010/0077458 A1 | 3/2010 | Stout et al. |
| 2010/0085155 A1* | 4/2010 | Boss ...................... H04Q 9/00 340/10.1 |
| 2010/0131526 A1 | 5/2010 | Sun et al. |
| 2010/0145771 A1 | 6/2010 | Fligler et al. |
| 2010/0153841 A1 | 6/2010 | Haug, III et al. |
| 2010/0161634 A1 | 6/2010 | Caceres |
| 2010/0169888 A1 | 7/2010 | Hare et al. |
| 2010/0204958 A1* | 8/2010 | Kawai ..................... F24F 11/30 702/185 |
| 2010/0217639 A1 | 8/2010 | Wayne et al. |
| 2010/0228989 A1 | 9/2010 | Neystadt et al. |
| 2010/0250688 A1 | 9/2010 | Sachs et al. |
| 2010/0250730 A1 | 9/2010 | Menzies et al. |
| 2010/0312842 A1 | 12/2010 | Ladouceur et al. |
| 2010/0318446 A1 | 12/2010 | Carter |
| 2010/0319051 A1 | 12/2010 | Bafna et al. |
| 2010/0333167 A1 | 12/2010 | Luo et al. |
| 2011/0004085 A1 | 1/2011 | Mensinger et al. |
| 2011/0061111 A1 | 3/2011 | Faitelson et al. |
| 2011/0072018 A1 | 3/2011 | Walls et al. |
| 2011/0078306 A1 | 3/2011 | Krishnamurthy |
| 2011/0107436 A1 | 5/2011 | Cholas et al. |
| 2011/0113493 A1 | 5/2011 | Moore |
| 2011/0126111 A1 | 5/2011 | Gill et al. |
| 2011/0128886 A1* | 6/2011 | Husney ............. H04W 52/0216 370/254 |
| 2011/0131572 A1 | 6/2011 | Elyashev et al. |
| 2011/0173545 A1 | 7/2011 | Meola |
| 2011/0179498 A1 | 7/2011 | Haselsteiner |
| 2011/0191213 A1 | 8/2011 | Mora et al. |
| 2011/0225417 A1 | 9/2011 | Maharajh et al. |
| 2011/0239044 A1 | 9/2011 | Kumar et al. |
| 2011/0246527 A1 | 10/2011 | Bitting et al. |
| 2011/0258683 A1 | 10/2011 | Cicchitto |
| 2011/0264278 A1 | 10/2011 | Gilbert et al. |
| 2011/0265150 A1 | 10/2011 | Spooner et al. |
| 2011/0288907 A1 | 11/2011 | Harvey et al. |
| 2011/0302622 A1 | 12/2011 | Bregman et al. |
| 2011/0307788 A1 | 12/2011 | Cheung et al. |
| 2012/0005724 A1 | 1/2012 | Lee |
| 2012/0029969 A1 | 2/2012 | Franke et al. |
| 2012/0030072 A1 | 2/2012 | Boudreau et al. |
| 2012/0030073 A1 | 2/2012 | Boudreau et al. |
| 2012/0042354 A1 | 2/2012 | Vitiello et al. |
| 2012/0046989 A1 | 2/2012 | Baikalov et al. |
| 2012/0047575 A1 | 2/2012 | Baikalov et al. |
| 2012/0079556 A1 | 3/2012 | Wahl |
| 2012/0088540 A1 | 4/2012 | Smith et al. |
| 2012/0095797 A1 | 4/2012 | Nishimura et al. |
| 2012/0098638 A1 | 4/2012 | Crawford |
| 2012/0102489 A1 | 4/2012 | Staiman et al. |
| 2012/0102543 A1 | 4/2012 | Kohli et al. |
| 2012/0110670 A1 | 5/2012 | Mont et al. |
| 2012/0134550 A1 | 5/2012 | Knoplioch et al. |
| 2012/0151512 A1 | 6/2012 | Talbert et al. |
| 2012/0166485 A1 | 6/2012 | Tashiro et al. |
| 2012/0173728 A1 | 7/2012 | Haskins et al. |
| 2012/0185454 A1 | 7/2012 | Zhang |
| 2012/0196571 A1 | 8/2012 | Grkov et al. |
| 2012/0216243 A1 | 8/2012 | Gill et al. |
| 2012/0221347 A1 | 8/2012 | Reiner |
| 2012/0233114 A1* | 9/2012 | Locherer ................ G06Q 10/06 707/602 |
| 2012/0233312 A1 | 9/2012 | Ramakumar et al. |
| 2012/0240193 A1 | 9/2012 | Littlefield et al. |
| 2012/0240242 A1 | 9/2012 | Ferenczi et al. |
| 2012/0266073 A1 | 10/2012 | Tanaka et al. |
| 2012/0266228 A1 | 10/2012 | Dash et al. |
| 2012/0278708 A1 | 11/2012 | Jesudasan et al. |
| 2012/0278903 A1 | 11/2012 | Pugh |
| 2012/0297456 A1 | 11/2012 | Rose et al. |
| 2012/0310410 A1* | 12/2012 | Adams ..................... E05B 45/06 700/237 |
| 2012/0311672 A1 | 12/2012 | Connor et al. |
| 2012/0311684 A1 | 12/2012 | Paulsen et al. |
| 2012/0317565 A1 | 12/2012 | Carrara et al. |
| 2013/0013548 A1 | 1/2013 | Alexander et al. |
| 2013/0024909 A1 | 1/2013 | Morita |
| 2013/0030937 A1 | 1/2013 | Larguia et al. |
| 2013/0031070 A1 | 1/2013 | Ducharme et al. |
| 2013/0042294 A1 | 2/2013 | Colvin et al. |
| 2013/0046884 A1 | 2/2013 | Frost et al. |
| 2013/0047247 A1 | 2/2013 | Matsuda |

(56) References Cited

U.S. PATENT DOCUMENTS

| | | |
|---|---|---|
| 2013/0067093 A1 | 3/2013 | Moreno et al. |
| 2013/0067538 A1 | 3/2013 | Dharmarajan et al. |
| 2013/0080520 A1 | 3/2013 | Kiukkonen et al. |
| 2013/0097223 A1 | 4/2013 | Mishkevich et al. |
| 2013/0111489 A1 | 5/2013 | Glew et al. |
| 2013/0159049 A1 | 6/2013 | Arumugam et al. |
| 2013/0167199 A1 | 6/2013 | Said et al. |
| 2013/0198639 A1 | 8/2013 | Casco-Arias Sanchez et al. |
| 2013/0227638 A1 | 8/2013 | Giambiagi et al. |
| 2013/0246334 A1 | 9/2013 | Ahuja et al. |
| 2013/0246901 A1 | 9/2013 | Massand |
| 2013/0254866 A1 | 9/2013 | Koster et al. |
| 2013/0262059 A1* | 10/2013 | Grbovic ............... G06Q 10/04 703/6 |
| 2013/0283356 A1 | 10/2013 | Mardikar et al. |
| 2013/0298202 A1 | 11/2013 | Warshavsky et al. |
| 2013/0312084 A1 | 11/2013 | Tandon |
| 2013/0316746 A1 | 11/2013 | Miller et al. |
| 2013/0326580 A1 | 12/2013 | Barclay et al. |
| 2013/0332984 A1 | 12/2013 | Sastry et al. |
| 2013/0333021 A1 | 12/2013 | Sellers et al. |
| 2014/0040314 A1 | 2/2014 | Ebrahimi et al. |
| 2014/0067538 A1 | 3/2014 | Hook et al. |
| 2014/0068718 A1 | 3/2014 | Mureinik |
| 2014/0075492 A1 | 3/2014 | Kapadia et al. |
| 2014/0089150 A1 | 3/2014 | Wong et al. |
| 2014/0089511 A1 | 3/2014 | McLean |
| 2014/0096188 A1 | 4/2014 | Mont et al. |
| 2014/0101061 A1 | 4/2014 | Boudreau et al. |
| 2014/0108251 A1 | 4/2014 | Anderson et al. |
| 2014/0108404 A1 | 4/2014 | Chen et al. |
| 2014/0109168 A1 | 4/2014 | Ashley et al. |
| 2014/0129511 A1 | 5/2014 | Bramel et al. |
| 2014/0143831 A1 | 5/2014 | Fieweger |
| 2014/0164544 A1 | 6/2014 | Gagneraud |
| 2014/0172486 A1 | 6/2014 | Kwan et al. |
| 2014/0173035 A1 | 6/2014 | Kan et al. |
| 2014/0181913 A1 | 6/2014 | Kling et al. |
| 2014/0181914 A1 | 6/2014 | Kling et al. |
| 2014/0181965 A1 | 6/2014 | Kling et al. |
| 2014/0196115 A1 | 7/2014 | Pelykh |
| 2014/0207813 A1 | 7/2014 | Long et al. |
| 2014/0208399 A1 | 7/2014 | Ponzio, Jr. |
| 2014/0237498 A1 | 8/2014 | Ivins |
| 2014/0244569 A1 | 8/2014 | Seto |
| 2014/0280977 A1 | 9/2014 | Martinez et al. |
| 2014/0282024 A1 | 9/2014 | Ebner et al. |
| 2014/0282825 A1 | 9/2014 | Bitran et al. |
| 2014/0282880 A1 | 9/2014 | Herter et al. |
| 2014/0282922 A1 | 9/2014 | Iwanski et al. |
| 2014/0289402 A1 | 9/2014 | Moloian et al. |
| 2014/0289796 A1 | 9/2014 | Moloian et al. |
| 2014/0298423 A1 | 10/2014 | Moloian et al. |
| 2014/0331252 A1 | 11/2014 | Jin et al. |
| 2014/0331277 A1 | 11/2014 | Frascadore et al. |
| 2014/0337971 A1 | 11/2014 | Casassa Mont et al. |
| 2014/0344129 A1 | 11/2014 | Campbell et al. |
| 2014/0351927 A1 | 11/2014 | Huang et al. |
| 2014/0359085 A1 | 12/2014 | Chen |
| 2014/0359695 A1 | 12/2014 | Chari et al. |
| 2014/0365353 A1 | 12/2014 | Shvarts |
| 2014/0379593 A1 | 12/2014 | Koehler et al. |
| 2014/0380058 A1 | 12/2014 | Agarwal et al. |
| 2015/0026823 A1 | 1/2015 | Ramesh et al. |
| 2015/0066572 A1 | 3/2015 | McLaren et al. |
| 2015/0082432 A1 | 3/2015 | Eaton et al. |
| 2015/0120520 A1 | 4/2015 | Prokopenko et al. |
| 2015/0120713 A1 | 4/2015 | Kim et al. |
| 2015/0150125 A1* | 5/2015 | Dulkin ................... H04L 63/20 726/22 |
| 2015/0154418 A1 | 6/2015 | Redberg |
| 2015/0163068 A1 | 6/2015 | Cudak et al. |
| 2015/0200943 A1 | 7/2015 | Pitre |
| 2015/0200948 A1 | 7/2015 | Cairns et al. |
| 2015/0249852 A1 | 9/2015 | Tang et al. |
| 2015/0249864 A1 | 9/2015 | Tang et al. |
| 2015/0281239 A1 | 10/2015 | Brophy |
| 2015/0319760 A1 | 11/2015 | Wright et al. |
| 2015/0372890 A1 | 12/2015 | Fan et al. |
| 2016/0057168 A1 | 2/2016 | Reddock |
| 2016/0119380 A1 | 4/2016 | Gutesman et al. |
| 2016/0274955 A1 | 9/2016 | Hu |
| 2016/0314578 A1 | 10/2016 | Banerjee et al. |
| 2017/0060930 A1 | 3/2017 | Elkherj et al. |
| 2017/0236067 A1 | 8/2017 | Tjiong |

OTHER PUBLICATIONS

Tuebora Access Nirvana, "Access Request, Approval and Delivery," Tuebora, Inc., California, 2012. Retrieved from [http://www.tuebora.com/] on Mar. 27, 2014.

Tuebora Access Nirvana, "Access Change Monitoring," Tuebora, Inc., California, 2012. Retrieved from [http://www.tuebora.com/] on Mar. 27, 2014.

Tuebora Access Nirvana, "Access Certification—Recertification," Tuebora, Inc., California, 2012. Retrieved from [http://www.tuebora.com/] on Mar. 27, 2014.

Easter, C., "Method to Report Access Control of LAN Server Resources on a Per User Basis," IBM Technical Disclosure Bulletin, Apr. 1992, 1 page.

An Oracle White Paper, "Integrated Identity Governance," a Business Overview, 17 pages, Jul. 2012.

* cited by examiner

Welcome Reviewer!
First_Name Last_Name

| Pending Reviews | Date Assigned | Due Date | Status |
|---|---|---|---|
| User Reviews | MM/DD/YYY | MM/DD/YYY | 3 of 10 Complete |
| Application Reviews | MM/DD/YYY | MM/DD/YYY | Not Started |
| Resource Reviews | MM/DD/YYY | MM/DD/YYY | Complete, Not Submitted |
| Violation Reviews | MM/DD/YYY | MM/DD/YYY | Complete, Not Submitted |
| Role Reviews | MM/DD/YYY | MM/DD/YYY | Complete |

My Staff | My Applications | My Other Resources | My Roles

| ID No. | Name | Type | Location | Business Role | Hired | Termination | Review Type |
|---|---|---|---|---|---|---|---|
| ID No. 1 | Last Name, First Name | Type 1 | California | Business Role 1 | MM/DD/YYYY | -- | Risk Violation |
| ID No. 2 | Last Name, First Name | Type 2 | California | Business Role 2 | MM/DD/YYYY | -- | Annual |
| ID No. 3 | Last Name, First Name | Type 3 | California | Business Role 3 | MM/DD/YYYY | MM/DD/YYYY | Annual |
| ID No. 4 | Last Name, First Name | Type 1 | California | Business Role 1 | MM/DD/YYYY | -- | Regulatory |
| ID No. 5 | Last Name, First Name | Type 2 | Nevada | Business Role 2 | MM/DD/YYYY | MM/DD/YYYY | Regulatory |
| ID No. 6 | Last Name, First Name | Type 3 | Utah | Business Role 3 | MM/DD/YYYY | MM/DD/YYYY | Outlier |

FIG. 5A

Welcome Reviewer!
First_Name Last_Name

PENDING USER ACCESS REVIEWS

| ID No. | Name | Review Type | Resource ID | Access Type | Entitlement Description | Rule Violated | Date Granted | Approved By | Decision |
|---|---|---|---|---|---|---|---|---|---|
| ID No. 1 | Name | Risk Violation | Res. ID No. 1 | Credentials | Lorem ipsum dolor sit ? | Fee Reversal | MM/DD/YYYY | Name | ☑ ☒ ⇧ |
| ID No. 2 | Name | Annual | Res. ID No. 2 | Credentials | Lorem ipsum dolor sit ? | -- | MM/DD/YYYY | Name | ☑ ☒ ⇧ |
| ID No. 3 | Name | Annual | Res. ID No. 3 | Credentials | Lorem ipsum dolor sit ? | -- | MM/DD/YYYY | Name | ☑ ☒ ⇧ |
| ID No. 4 | Name | Quarterly | Res. ID No. 4 | Credentials | Lorem ipsum dolor sit ? | -- | MM/DD/YYYY | Name | ☑ ☒ ⇧ |
| ID No. 5 | Name | Regulatory | Res. ID No. 5 | Credentials | Lorem ipsum dolor sit ? | -- | MM/DD/YYYY | Name | ☑ ☒ ⇧ |
| ID No. 6 | Name | Outlier | Res. ID No. 6 | Credentials | Lorem ipsum dolor sit ? | -- | MM/DD/YYYY | Name | ☑ ☒ ⇧ |

Logout

FIG. 5B

Welcome Reviewer!
First_Name Last_Name

Logout

ACCESS RIGHTS FOR USER: Last Name, First Name ← 546

| ID No. | Access Type Description | Resource ID | Access Type | Entitlement Description | Date Granted | Approved By | Decision |
|---|---|---|---|---|---|---|---|
| ID No. 1 | Task Description [?] | Res. ID No. 1 | Task | | MM/DD/YYYY | Name | ☑ ☒ |
| ID No. 2 | User Group Description [?] | Res. ID No. 2 | User Group | | MM/DD/YYYY | Name | |
| ID No. 3 | Role Description [?] | Res. ID No. 3 | Role | | MM/DD/YYYY | Name | |
| ID No. 4 | Credentials Description [?] | Res. ID No. 4 | Credentials | Lorem ipsum dolor sit [?] | MM/DD/YYYY | Name | ☑ ☒ |
| ID No. 5 | Task Description [?] | Res. ID No. 5 | Task | | MM/DD/YYYY | Name | |
| ID No. 6 | Credentials Description [?] | Res. ID No. 6 | Credentials | Lorem ipsum dolor sit [?] | MM/DD/YYYY | Name | ☑ ☒ |

528  526  530 532

ACCESS RIGHTS HISTORY

| ID No. | Access Type Description | Resource ID | Access Type | Entitlement Description | Date Granted | Date Revoked | Event |
|---|---|---|---|---|---|---|---|
| ID No. 11 | User Group Description | Res. ID No. 7 | User Group | | MM/DD/YYYY | MM/DD/YYYY | Term |
| ID No. 12 | Role Description | Res. ID No. 8 | Role | | MM/DD/YYYY | MM/DD/YYYY | Regulatory |
| ID No. 13 | Credentials Description | Res. ID No. 9 | Credentials | Lorem ipsum dolor sit | MM/DD/YYYY | MM/DD/YYYY | Transfer |
| ID No. 14 | Credentials Description | Res. ID No. 10 | Credentials | Lorem ipsum dolor sit | MM/DD/YYYY | MM/DD/YYYY | Transfer |
| ID No. 15 | Task Description | Res. ID No. 11 | Task | Lorem ipsum dolor sit | MM/DD/YYYY | MM/DD/YYYY | Violation |
| ID No. 16 | Credentials Description | Res. ID No. 12 | Credentials | Lorem ipsum dolor sit | MM/DD/YYYY | MM/DD/YYYY | LOA |

FIG. 5C

Welcome Reviewer!
First_Name Last_Name

Logout

PENDING APPLIATION ACCESS REVIEWS

| ID No. | Application Description | Last Review Date | Reviewed By | Due Date | Status | Items Needing Review |
|---|---|---|---|---|---|---|
| ID No. 1 | Lorem ipsum dolor sit amet, c | MM/DD/YYYY | Name | MM/DD/YYYY | Complete | 0 of 10 |
| ID No. 2 | Lorem ipsum dolor sit amet, c | MM/DD/YYYY | Name | MM/DD/YYYY | Not Started | 7 of 7 |
| ID No. 3 | Lorem ipsum dolor sit amet, c | MM/DD/YYYY | Name | MM/DD/YYYY | Not Started | 3 of 3 |
| ID No. 4 | Lorem ipsum dolor sit amet, c | MM/DD/YYYY | Name | MM/DD/YYYY | 3 of 5 Complete | 2 of 5 |

FIG. 5D

Welcome Reviewer!
First_Name Last_Name

APPLICATION ACCESS DETAILS: Application ID No. — 580

| ID No. | Name | Environment | Resource ID | Access Type | Entitlement Description | Consumed By | Date Granted | Approved By | Decision |
|---|---|---|---|---|---|---|---|---|---|
| ID No. 1 | Name | Environment 1 | Res. ID No. 1 | User Group | Lorem ipsum dolor sit ame | — | MM/DD/YYYY | Name | ☑ ☒ ⇧ |
| ID No. 2 | Name | Environment 2 | Res. ID No. 2 | Role | Lorem ipsum dolor sit ame | — | MM/DD/YYYY | Name | ☑ ☒ ⇧ |
| ID No. 3 | Name | Environment 3 | Res. ID No. 3 | Credentials | Lorem ipsum dolor sit ame | App. ID No. 7 | MM/DD/YYYY | Name | ☑ ☒ ⇧ |
| ID No. 4 | Name | Environment 1 | Res. ID No. 4 | Credentials | Lorem ipsum dolor sit ame | App. ID No. 8 | MM/DD/YYYY | Name | ☑ ☒ ⇧ |

APPLICATION PERMISSIONS

| ID No. | Permission | Type | Permission Description | Requires Review? | Risk Level |
|---|---|---|---|---|---|
| ID No. 1 | Permission 1 | Read | Lorem ipsum dolor sit amet. | Y | 2 |
| ID No. 2 | Permission 2 | Write | Donec blandit porta. | N | 1 |
| ID No. 3 | Permission 3 | Execute | Vivamus auctor interdum. | N | 1 |
| ID No. 4 | Permission 4 | Execute | Cras interdum odio non. | Y | 3 |

FIG. 5E

Welcome Reviewer!
First_Name Last_Name

Logout

MY RESOURCES

| ID No. | Resource Description | Last Review Date | Date Created | Last Reviewed By |
|---|---|---|---|---|
| ID No. 1 | Lorem ipsum dolor sit amet, c | MM/DD/YYYY | MM/DD/YYY | Name |
| ID No. 2 | Lorem ipsum dolor sit amet, q | MM/DD/YYYY | MM/DD/YYYY | Name |
| ID No. 3 | Lorem ipsum dolor sit amet, q | MM/DD/YYYY | MM/DD/YYYY | Name |
| ID No. 4 | Lorem ipsum dolor sit amet, q | MM/DD/YYYY | MM/DD/YYYY | Name |
| ID No. 5 | Lorem ipsum dolor sit amet, q | MM/DD/YYYY | MM/DD/YYYY | Name |
| ID No. 6 | Lorem ipsum dolor sit amet, q | MM/DD/YYYY | MM/DD/YYYY | Name |

RESOURCE USERS: Resource ID No. 1 – Resource Description

| ID No. | Name | Job Code | Title | Location | Manager | Outlier? | Date Granted | Approved By | Decision |
|---|---|---|---|---|---|---|---|---|---|
| ID No. 1 | Name | Job Code 1 | Title A | California | Name | – | MM/DD/YYY | Name | ✓ ✗ |
| ID No. 2 | Name | Job Code 2 | Title B | California | Name | – | MM/DD/YYY | Name | ✓ ✗ |
| ID No. 3 | Name | Job Code 3 | Title C | Nevada | Name | ! | MM/DD/YYY | Name | ✓ ✗ |
| ID No. 4 | Name | Job Code 3 | Title D | Utah | Name | | MM/DD/YYY | Name | ✓ ✗ |

FIG. 5F

Welcome Reviewer!
First_Name Last_Name

RESOURCE DETAILS: Resource ID – Resource Name

Resource Name: Resource Name
Resource Location: Atlanta Data Center

Resource Description: Lorem ipsum dolor sit amet, consectetur adipiscing elit.

Resource Permissions

| ID No. | Permission | Type | Permission Description | Requires Review? |
|---|---|---|---|---|
| ID No. 1 | Permission 1 | Read | Lorem ipsum dolor sit amet. | N |
| ID No. 2 | Permission 2 | Write | Donec blandit porta. | Y |
| ID No. 3 | Permission 3 | Execute | Vivamus auctor interdum. | Y |
| ID No. 4 | Permission 4 | Delete | Cras interdum odio non. | N |

Associated Resources

| ID No. | Resource Name | Resource Type | Resource ID | Resource Description |
|---|---|---|---|---|
| ID No. 1 | Resource Name | Application | Res. ID No. 1 | Phasellus faucibus nisi ac metus. |
| ID No. 2 | Resource Name | Application | Res. ID No. 2 | Quisque venenatis ut magna. |
| ID No. 3 | Resource Name | Server | Res. ID No. 3 | Donec et nulla aliquet. |

Logout

FIG. 5G

Welcome Reviewer!
First_Name Last_Name — 518

Risk Management Rule Violations — 632

| Violation Type | Base Access Right | Conflicting Access Right | Violation Description | Justification | Expires | Decision |
|---|---|---|---|---|---|---|
| Separation of Duties | Access Right A | Access Right D | Lorem ipsum dolor sit amet. | Training | MM/DD/YYY | ☑ ☒ ⇧ |
| Separation of Duties | Access Right A | Access Right E | Donec blandit porta. | -- | MM/DD/YYY | ☑ ☒ ⇧ |
| Separation of Duties | Access Right B | Access Right F | Vivamus auctor interdum. | -- | MM/DD/YYY | ☑ ☒ ⇧ |
| Separation of Duties | Access Right C | Access Right G | Cras interdum odio non. |  | MM/DD/YYY | ☑ ☒ ⇧ |

528, 530, 532

Logout

Welcome Reviewer!
First_Name Last_Name

Logout

Create or Modify Risk Management Rule

Rule Name: [Rule Name]

Rule Description: Integer aliquam, enim eget sagittis bibendum, urna libero volutpat.

| Roles | Tasks | Permissions |
|---|---|---|

Task Name 1 – Task Description
Task Name 2 – Task Description
Task Name 3 – Task Description
Task Name 4 – Task Description
Task Name 5 – Task Description

Base Access Right: Role 2 – Role Description

Conflicting Access Rights:
Permission 2 – Permission Description
Permission 4 – Permission Description
Task 2 – Task Description
Role 5 – Role Description Add >
< Remove

Violation Severity: ☐ Low  ☷ Medium  ■ High

Exceptions:
1. Exception No. 1 – Exception Description
2. Exception No. 2 – Exception Description
3. Exception No. 3 – Exception Description

Add   Modify

Save   Cancel

FIG. 5I

Welcome Reviewer!
First_Name Last_Name                                                                Logout

Create or Modify Exception to Risk Management Rule – Rule Name

654

Base Access Right

| Role 2 – Role Description |

Conflicting Access Rights

| Permission 2 – Permission Description |
| Permission 4 – Permission Description |
| Task 2 – Task Description |
| Role 5 – Role Description |

Rule Description

| Integer aliquam, enim eget sagittis bibendum, urna libero volutpat. |

Violation Severity

662  ▦ High

690 ⌢ LOGICAL OPERATOR

| Equals |
| Not Equals |
| Greater Than |
| Less Than |

692

ATTRIBUTES

Location
| - Select Location - |   Attribute No. 4  | - Select Attribute - |

Division
| - Select Division - |   Attribute No. 5  | - Select Attribute - |

Job Code
| Job Code 3 |   Attribute No. 6  | - Select Attribute - |

694 ⌢ EXPIRATION

| March 14 |
| M T W T F S S |
| 1 2 3 4 5 6 7 |
| 8 9 10 11 12 13 14 |
| 15 16 17 18 19 20 21 |
| 22 23 24 25 26 27 28 |
| 29 30 1 2 3 4 5 |
| 6 |

696 ⌢ ( Save )   ( Cancel ) ⌢ 698

FIG. 5J

Welcome Reviewer!
First_Name Last_Name

PENDING ROLE REVIEWS — 722

| | Role Details | Description | Last Reviewed | Date Granted | Approved By |
|---|---|---|---|---|---|
| ▲ | Role No. 2 – Role Name | Lorem ipsum dolor sit amet. | MM/DD/YYY | MM/DD/YYY | Name |
| ▶ | Role No. 6 – Role Name | Lorem ipsum dolor sit amet. | | MM/DD/YYY | Name |
| | ▲ Task No. 3 | Donec blandit porta. | | MM/DD/YYY | Role |
| | ▼ Task No. 5 | Donec blandit porta. | | MM/DD/YYY | Role |
| | Permission No. 7 | Cras interdum odio non. | | MM/DD/YYY | Task |
| | Permission No. 9 | Cras interdum odio non. | | MM/DD/YYY | Task |

Users for Selected Role: Role No. 6 – Role Name — 724

| ID No. | Name | Job Code | Job Title | Location | Manager | Date Granted | Approved By | Review? |
|---|---|---|---|---|---|---|---|---|
| ID No. 1 | Name | Job Code No. 1 | Job Title A | California | Last Name, First Name | MM/DD/YYY | Last Name, First Name | ○ |
| ID No. 2 | Name | Job Code No. 1 | Job Title A | California | Last Name, First Name | MM/DD/YYY | Last Name, First Name | ○ |
| ID No. 3 | Name | Job Code No. 3 | Job Title C | Nevada | Last Name, First Name | MM/DD/YYY | Last Name, First Name | ○ |
| ID No. 4 | Name | Job Code No. 8 | Job Title H | Utah | Last Name, First Name | MM/DD/YYY | Last Name, First Name | |

FIG. 5L

Welcome Reviewer!
First_Name Last_Name                                                                 Logout

Role Review: Role No. 6 – Role Name    Role Description: Consectetur adipiscing elit.    ← 748    ← 742

Access Rights to Review

| | Access Right | Access Type | Access Right Description | Last Reviewed | Date Granted | Approved By | Decision |
|---|---|---|---|---|---|---|---|
| ▲ | Task No. 8 | -- | Donec blandit porta. | MM/DD/YY | MM/DD/YYYY | Last Name, First Name | ☑ ☒ ⇧ |
| ▶ | Task No. 10 | -- | Donec blandit porta. | | MM/DD/YYYY | Last Name, First Name | ☑ ☒ ⇧ |
| | Permission No. 13 | Read-Only | Cras interdum odio non. | | MM/DD/YYYY | Task | ☑ ☒ ⇧ |
| | Permission No. 15 | Execute | Cras interdum odio non. | | MM/DD/YYYY | Task | ☑ ☒ ⇧ |

750, 752 ← rows;  528 530 532 ← Decision column markers

← 744

All Access Rights for Role

| | Access Right | Access Type | Access Right Description | Decision |
|---|---|---|---|---|
| ▲ | Task No. 8 | -- | Donec blandit porta. | ☑ ☒ ⇧ |
| ▶ | Task No. 10 | -- | Donec blandit porta. | ☑ ☒ ⇧ |
| | Permission No. 12 | Execute | Cras interdum odio non. | |
| | Permission No. 13 | Read-Only | Cras interdum odio non. | ☑ ☒ ⇧ |
| | Permission No. 15 | Execute | Cras interdum odio non. | ☑ ☒ ⇧ |

528 530 532

Users to Review ← 746

| ID No. | Name | Job Code | Decision |
|---|---|---|---|
| ID No. 1 | Name | Job Code 1 | ☑ ☒ ⇧ |
| ID No. 2 | Name | Job Code 2 | ☑ ☒ ⇧ |
| ID No. 3 | Name | Job Code 3 | ☑ ☒ ⇧ |
| ID No. 4 | Name | Job Code 3 | ☑ ☒ ⇧ |

COMPUTING RESOURCE INVENTORY SYSTEM

CROSS-REFERENCE TO RELATED APPLICATIONS

This application is a continuation of U.S. patent application Ser. No. 15/064,891 entitled "Computing Resource Inventory System" and filed on Mar. 9, 2016, which issued as U.S. Pat. No. 9,792,153 on Oct. 17, 2017, which is a continuation of U.S. patent application Ser. No. 14/267,586 entitled "Computing Resource Inventory System" and filed on May 1, 2014, which issued as U.S. Pat. No. 9,529,629 on Dec. 27, 2016, and which is a continuation-in-part of U.S. patent application Ser. No. 13/801,314 entitled "Common Data Model for Identity Access Management Data" and filed on Mar. 13, 2013, which issued as U.S. Pat. No. 9,639,594 on May 2, 2017, and which claims the benefit of U.S. Provisional Patent Application No. 61/740,205 entitled "Common Data Model for Identity Access Management Data" and filed on Dec. 20, 2012, each of which are incorporated by reference herein in their entirety.

BACKGROUND

Identity and access management (IAM) refers to the processes, technologies, and policies for managing digital identities and controlling how those identities can be used to access resources. For large business entities having thousands of employees and complex computer systems, IAM can be a challenge.

As personnel join, leave, and move throughout the enterprise, access rights to various computing resources may need to be updated, e.g., to add, remove, or modify access rights. Furthermore, periodic access reviews may need to be performed to ensure that access rights for personnel do not exceed the scope of their authority. In other words, access reviews may be used to determine whether employees can access only those resources necessary to perform their job duties. Moreover, it may also be important to ensure personnel are not provided with incompatible access rights—combinations of access rights that would allow personnel to carry out incompatible tasks.

In order to ensure computing systems remain secure, reviews of access rights may be performed periodically. In some organizations, however, access reviews may involve hundreds of thousands of access rights. Reviewing such a large volume of access rights on a regular basis may strain the available resources of that organization. Therefore, a need exists for improved approaches to identity and access management.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

A first aspect described herein provides a system for managing computing resources of a computing system. The system may include at least one processor, memory storing instructions executable at the processor, and a data store that stores a computing resource list and computing resource information. The computing resource list may identify a set of computing resources of a computing system, and the computing resource information may respectively describe the computing resources. The system may update the computing resource list responsive to new computing resources being added to the computing system and responsive to existing computing resources being removed from the computing system. The system may perform evaluation tasks for the computing resources and generate a resource evaluation report during performance of at least one of the evaluation tasks.

A second aspect described herein provides a computer-implemented method of managing computing resources of a computing system. A computing resource list and computing resource information may be stored at a data store. The computing resource list may identify a set of computing resources of a computing system, and the computing resource information may respectively describe the computing resources. The computing resource list may be updated in response to a new computing resource being added to the computing system or in response to an existing computing resource being removed from the computing system. Evaluation tasks for the computing resources may be performed, and a resource evaluation report may be generated during performance of at least one of the evaluation tasks.

A third aspect described herein provides non-transitory computer-readable media having instructions that, when executed by a processor of a computing device, cause the computing device to perform steps for managing computing resources of a computing system. The instructions, when executed, may cause a computing device to store a computing resource list and computing resource information at a data store. The computing resource list may identify a set of computing resources of a computing system, and the computing resource information may describe the computing resources. The instructions, when executed, may also cause the computing device to update the computing resource list in response to a new computing resource being added to the computing system and in response to an existing computing resource being removed from the computing system. The instructions, when executed, may further cause the computing device to perform evaluation tasks for the computing resources and generate a resource evaluation report during performance of at least one of the evaluation tasks.

One of the evaluation tasks may include determining whether the computing resource has provided a current access report for a current reporting period. Another one of the evaluation tasks may include determining whether the total number of access rights identified in the current access report deviates from a total number of access rights identified in a previous access report provided by the computing resource.

These and other aspects of the present disclosure will be apparent in view of the detailed description provided below.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps disclosed may be optional. It will also be appreciated with the benefit of this disclosure that one or more components illustrated in the accompanying figures may be positioned in other than the disclosed arrangement and that one or more of the components illustrated may be optional.

FIGS. 5A-M illustrate respective examples of implementations of various interfaces of an identity and access management review system.

DETAILED DESCRIPTION

Figure 1:
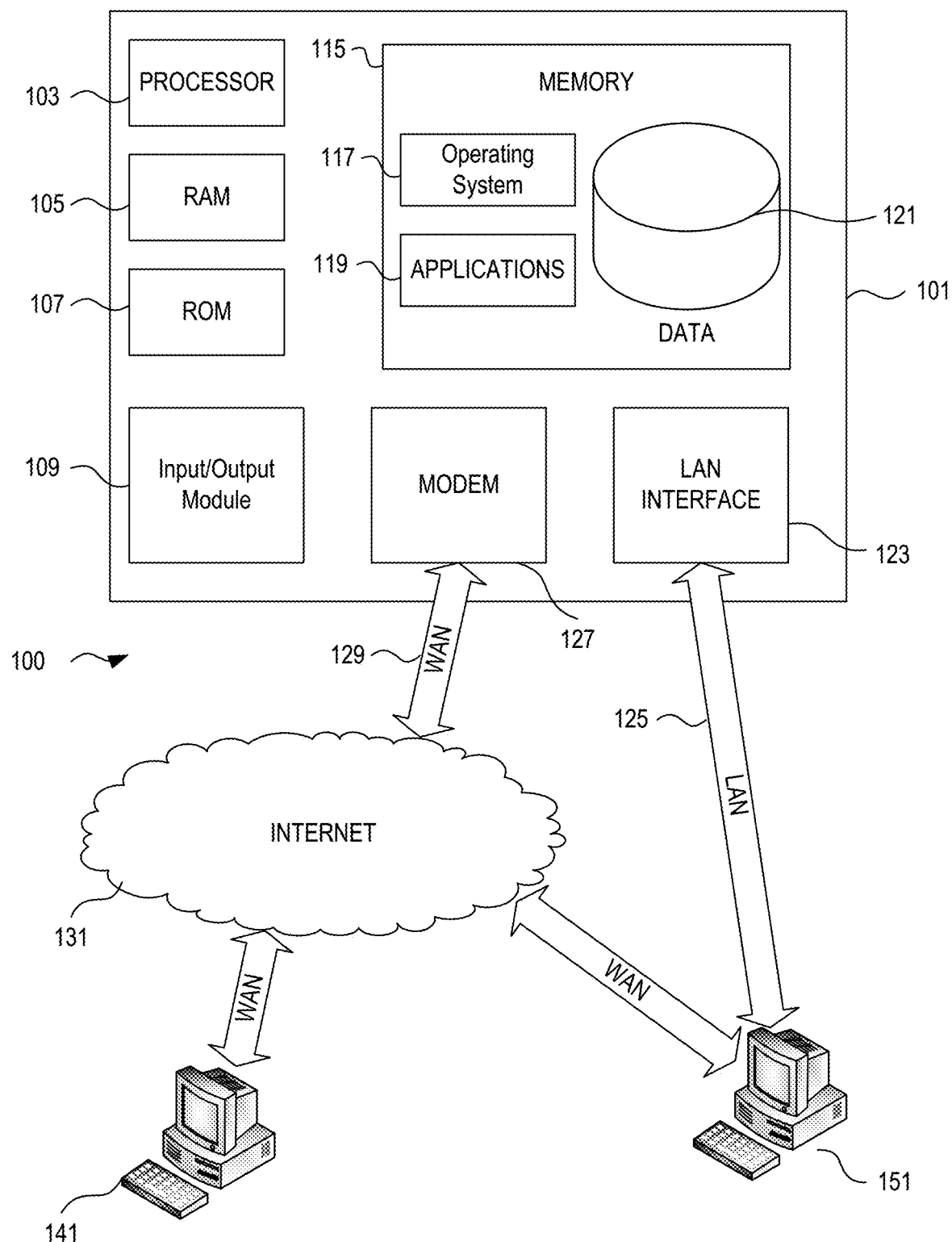
FIG. 1 is a block diagram of an example operating environment in which various aspects of the disclosure may be implemented.

Aspects of the disclosure related to identity and access management (IAM). Identity and access management may alternatively be referred to as identify management (IdM) as well as access and identity management (AIM). The aspect of the disclosure discussed in further detail below provide improvements to the management of IAM information, the presentation of IAM information, and the review of IAM information. Aspects of the disclosure below may be described in the context of business enterprises and the computer systems of such business enterprises. It will be appreciated, however, that aspects of the present disclosure may selectively implemented at the computer systems of any type of enterprise.

In general the IAM system described below improves the preparation, management, and review of IAM information by providing a centralized location at which administrators can browse IAM information, perform access reviews, manage risk, and perform other IAM-related activities that will be appreciated with the benefit of this disclosure. This centralized location may, for convenience, be referred to as an IAM dashboard. The aspects of the IAM system described in further detail below include: an inventory system that comprehensively identifies the computing resources deployed in a computing system; an interactive IAM management tool for viewing access rights and pending reviews of such access rights; and various approaches to quality assurance of IAM information, reconciliation of access rights, risk management, and review of access rights. The IAM system described thus provides enterprises the ability to perform thorough and comprehensive reviews of access rights while minimizing redundancy in performing access reviews and fulfilling access requests. The IAM system described also enables an enterprise to quickly and efficiently address any issues associated with access rights provisioned at a computing system or resources deployed in a computing system. These and additional advantages will be appreciated with the benefit of the additional disclosures described in further detail below.

For convenience individuals that utilize the IAM system described below may be referred to as administrators. An administrator may correspond to one of various types of individuals involved in managing or maintaining computing systems of an enterprise. Such individuals may include, for example: individuals that supervise users and computing resources of a computing system; individuals that engineer roles, user groups, and tasks for a computing system; individuals that perform reviews of access rights at the computing system; individuals that manage risk associated with the computing system; and individuals that provision access rights at the computing system for users and resources. Accordingly administrators may be referred to, in various contexts, as managers, role engineers, reviewers, risk managers, and so forth.

Additionally the IAM system may provide administrators various reports related to access rights, access requests, and access reviews. The IAM system may provide such reports in various forms. In one example, a report may be a document provided to an administrator as an email attachment. In another example, a report may be the email itself. In a further example, the IAM system may provide the report at the IAM dashboard as part of an interface presented to an administrator. The IAM system may also be selectively configured to employ additional and alternative approaches to providing the various reports described below.

It is also to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. In addition, "set" as used in this description refers to a collection that may include one element or more than one element. Moreover, aspects of the disclosure may be implemented in non-transitory computer-readable media having instructions stored thereon that, when executed by a processor, cause the processor to perform various steps described in further detail below. As used in this description, non-transitory computer-readable media refers to all computer-readable media with the sole exception being a transitory propagating signal.

FIG. 1 illustrates a block diagram of at least a portion of an IAM system 101 (e.g., a computer server) in communication system 100 that may be used according to an illustrative embodiment of the disclosure. The system 101 may have a processor 103 for controlling overall operation of the system and its associated components, including RAM 105, ROM 107, input/output (I/O) module 109, and memory 115.

I/O module 109 may include a microphone, keypad, touch screen, and/or stylus through which a user of the IAM system 101 may provide input, and may also include one or more of a speaker for providing audio output and a video display device for providing textual, audiovisual and/or graphical output. Software may be stored within memory 115 and/or storage to provide instructions to processor 103 for enabling the system 101 to perform various functions. For example, memory 115 may store software used by the system 101, such as an operating system 117, application programs 119, and an associated database 121. Processor 103 and its associated components may allow the system 101 to run a series of computer-readable instructions to process and respond to access requests and to facilitate access reviews.

The system 101 may operate in a networked environment supporting connections to one or more remote computers, such as terminals 141 and 151. The terminals 141 and 151 may be personal computers or servers that include many or all of the elements described above relative to the system 101. Alternatively, terminal 141 and/or 151 may be a data store that is affected by the backup and retention policies stored on the system 101. The network connections depicted in FIG. 1 include a local area network (LAN) 125 and a wide area network (WAN) 129, but may also include other networks. When used in a LAN networking environment, the system 101 is connected to the LAN 125 through a network interface or adapter 123. When used in a WAN networking environment, the system 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, one or more application programs 119 used by the IAM system 101 according to an illustrative embodiment of the disclosure may include computer executable instructions for invoking functionality related to processing and responding to access requests and to facilitating access reviews.

The IAM system 101 and/or terminals 141 or 151 may also be mobile terminals, such as smart phones, personal digital assistants (PDAs), and the like including various other components, such as a battery, speaker, and antennas (not shown).

The disclosure is operational with numerous other general purpose or special purpose computer system environments or configurations. Examples of well-known computer systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

Figure 2:
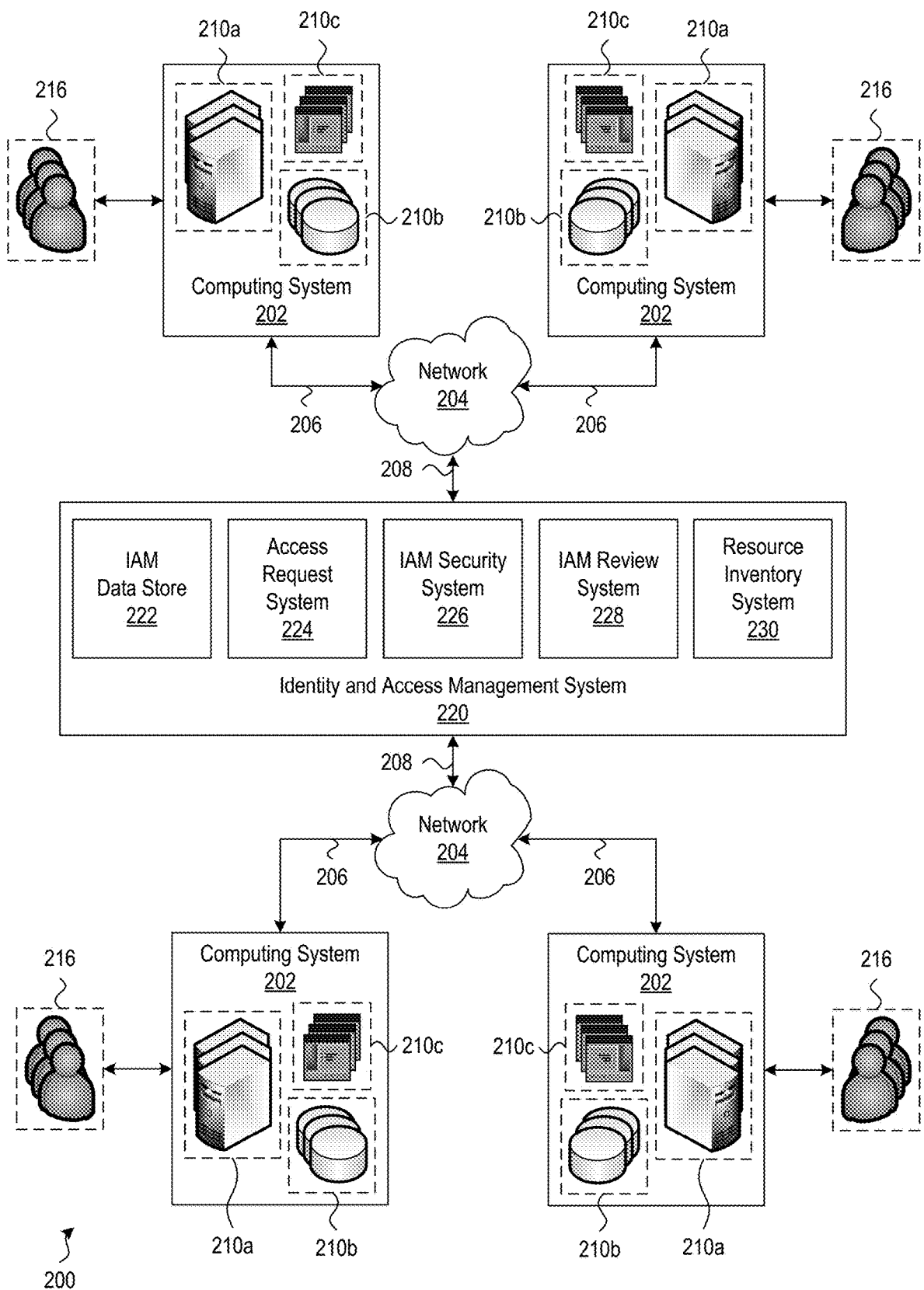
FIG. 2 is a block diagram of an example enterprise-wide computing system.

FIG. 2 is an illustration of an example enterprise-wide computing system 200. An enterprise-wide computing system 200 may maintain multiple distributed computing systems 202. Each computing system 202 may be separate and distinct. The computing systems 202 may be physically separated from each other, for example, by location (e.g., North America, Europe, Asia). Additionally or alternatively, the computing systems 202 may be logically separated from each other, for example, by institution or department (e.g., banking, information technology).

The computing systems 202 may be connected by one or more communication links 206 to computer networks 204. The computer networks 204 may be linked to an IAM system 220 via communication links 208. The computer networks 204 may be any suitable computer networks including the Internet, an intranet, a wide-area network (WAN), a local-area network (LAN), a wireless network, a digital subscriber line (DSL) network, a frame relay network, an asynchronous transfer mode network, a virtual private network (VPN), or any combination of any of the same. Communication links 206 and 208 may be any communication links suitable for communicating between computing systems 202 and networks 204, such as network links, dial-up links, wireless links, hard-wire links, and the like. It will be appreciated that the network communications shown are illustrative and other means of establishing communication links between the computing systems and networks may be used. The existence of any of various well-known protocols such as TCP/IP, Ethernet, FTP, HTTP, HTTPS, and the like is presumed.

Each computing system 202 may include collections of servers 210a, databases 210b, and software applications or software programs 210c (collectively resources 210), where the servers 210a may host databases 210b and applications 210c. The collections of servers 210a, databases 210b, and applications 210c will be referred to as resources. The IAM system 220 may be employed to manage access rights to physical and logical resources within the enterprise-wide computing system 200. The responsibilities of the IAM system in managing access may include processing access requests, provisioning requested access rights, reviewing provisioned access rights, revoking access rights, and other IAM activities.

Users 216 are selectively provisioned with access rights to these resources 210. Resources 210 may also be provisioned with access rights in order to access other resources of a computing system 202. Access refers to the ability of a user to perform operations on a resource, such as, for example, create, read, update, delete, and execute. Access to a particular resource is referred to as a permission. A set of permissions may be associated with a task, and a set of tasks may be associated with a role or user group. Individual permissions may also be associated with a role or user group. A permission provisioned to a particular user or resource may be referred to as an entitlement.

Permissions, entitlements, roles, user groups, and tasks may be collectively referred to as access rights. Accordingly provisioning access rights for a user 216 may include associating a resource permission with that user such that the user is entitled to access and capable of accessing the resource 210 associated with the permission. Access rights may be similarly provisioned for a resource 210 such that the resource is entitled to access and capable of accessing other resources of a computing system 202. When a user 216 or resource 210 receives an entitlement, corresponding login credentials may be created for the user or resource. Provisioning access rights may also include assigning a particular role, user group, or task to a user 216 or resource 210. Revoking access rights may include removing associations with permissions, roles, user groups, and tasks. Additional and alternative examples of provisioning and revoking access rights will be appreciated by those skilled in the art.

Generally, the IAM system 220 may include an IAM data store 222, an access request system 224, an IAM security system 226, an IAM review system 228, and a resource inventory system 230. The IAM data store 222 may contain information regarding users, user groups, roles, tasks, resources, access rights, permissions, and entitlements. The access request system 224 may be used to request changes to access rights for a particular user, user group, or role. In some examples, the access request system 224 may be a ticketing system, which provides functionality to submit access requests, generates access request tickets, routes access request tickets to administrators, and changes access rights based on the information in the access request ticket (i.e., fulfillment). The fulfillment process may include either provisioning access rights or revoking access to a particular resource for a particular user, user group, or role, depending on the content of the access request. An access request may include information such as a description of the access rights changes requested, date of request submission, user requesting changes, and a status (e.g., open, closed). When an access request is submitted, the status of the access request may be described as "open." Once the fulfillment process is complete, the status of the access request may be changed, and the status of the access request may be described as "closed." Additionally, the access request will be updated with the date the access rights were changed. Access requests may be submitted to grant or provision access rights to a user and may also be submitted to remove or revoke access rights from a user. Access requests requesting access rights be granted or provisioned to a user may be referred to as access grant requests. Access requests requesting access rights be removed or revoked from a user may be referred to as access revocation requests. Access requests requesting a change to a set of access rights associated with a user (e.g., by provisioning a new access right or by revoking an existing access right) may be referred to as an access change request. Furthermore, an access request that has not yet been fulfilled may be referred to as a pending access request, and an access request that has been fulfilled may be referred to as a fulfilled access request.

The IAM security system 226 may receive access reports from the resources in the enterprise-wide computing system 200. Access reports from a particular resource identify all of the access rights currently associated with all users, user groups, and roles for that particular resource. The access rights identified in an access report may thus be referred to as reported access rights. The access reports received by the IAM security system 226 may be used to reconcile access rights.

The IAM review system 228 is an interactive tool which may reconcile access rights, perform reviews, view resource information, define risk management rules and exceptions, and define granular risk. The IAM review system 228 will be discussed in further detail below.

The resource inventory system 230 may be used to manage all physical and logical resources in the enterprise-wide computing system 200. The resource inventory system 230 provides a list of all resources deployed at all of the computing systems 202 in the enterprise-wide computing system 200. Additionally or alternatively, the resource inventory system 230 provides a list of all resources deployed at all of the computer systems 202 in the enterprise-wide computer system 200 which require a login. The resource inventory system 230 may also be used to reconcile access rights based on the access reports received by the IAM security system 226. The resource inventory system 230 will be discussed in further detail below.

1. Resource Inventory

Figure 3A:
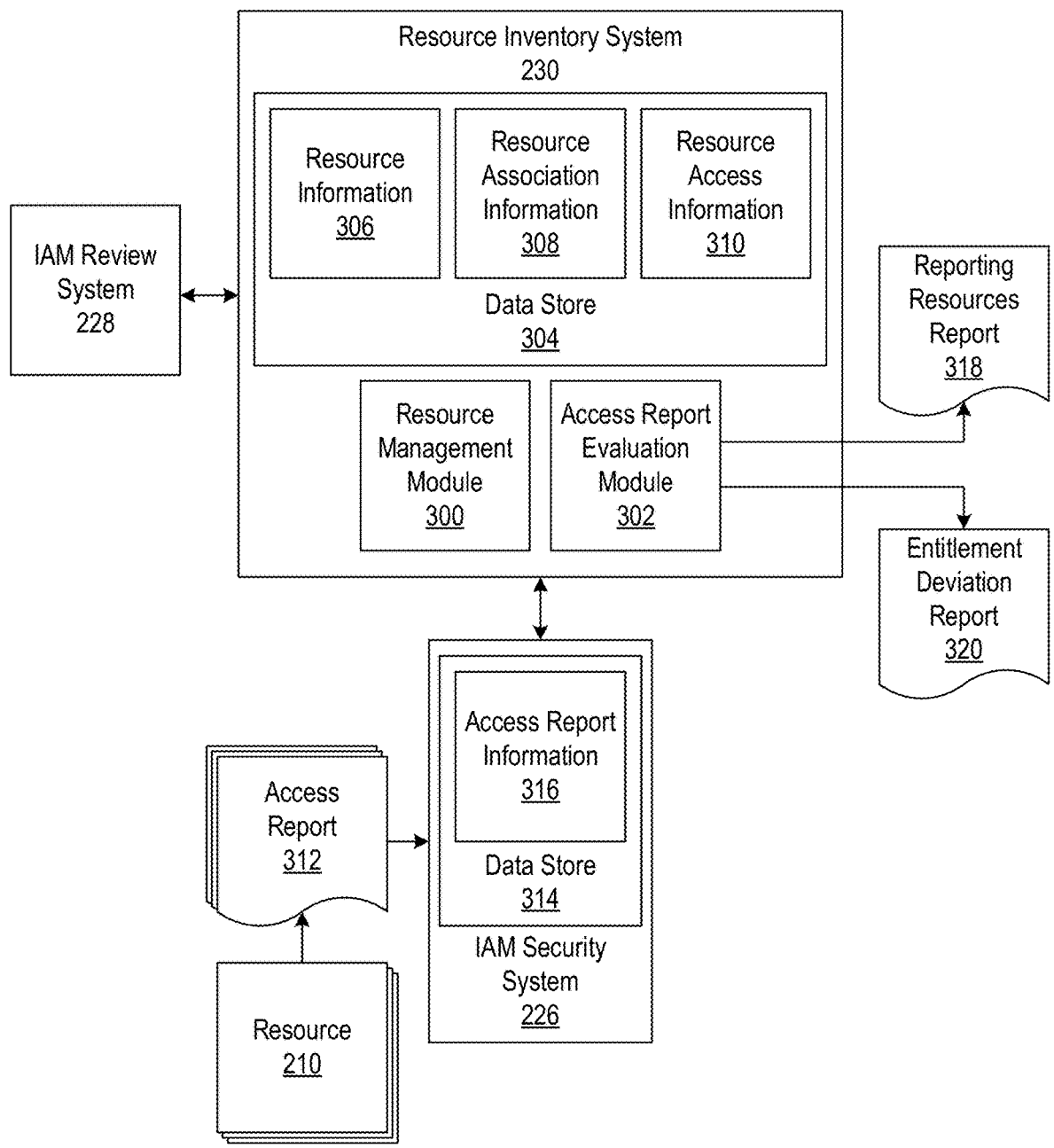
FIG. 3A is a block diagram of an example of an implementation of a resource inventory system.

In FIG. 3A, a block diagram of an example of an implementation of a resource inventory system 230 is shown. As noted above, a resource refers to a computing resource of a computing system. The resource inventory system 230, in this example, includes a resource management module 300, a access report evaluation module 302, and a data store 304 that stores resource inventory information. Resource inventory information stored at the data store 304 may include, e.g., resource information 306, resource association information 308, and resource access information 310.

Resource information 306 may include a list of the computing resources and metadata for a resource 210, for example, a unique identifier, type (e.g., server, database, or application), geographic location, network address, business division, resource group, and status (e.g., active or inactive). The resource information 306 that lists the resources 210 of the enterprise-wide computing system 200 may thus correspond to the resource inventory for the enterprise-wide computer system. It will be appreciated that even if a resource 210 is not actively connected to or operating at a computing system 202 (i.e., is inactive), the resource inventory system 230 may nonetheless store information for that resource in order to maintain a comprehensive inventory of all resources in the enterprise-wide computing system 200. Accordingly the resource information 306 may include a list of computing resources that comprehensively identify the computing resources 210 of the computing system 200. A comprehensive computing resource list that identifies each computing resource of a computing system has advantages over a partial list of the computing resources of the computing system. A comprehensive list of the computing resources 210 at the computing system 200 advantageously enables resource managers to obtain a full understanding of the status of the computing system and its individual components. Stated differently, the comprehensive list of computing resources 210 advantageously ensures that the computing system does not include any computing resource the resource managers are not aware of. In this way, the resource managers of an enterprise may advantageously review the access rights associated with each computing resource of the computing system to ensure that each computing resource is secured according to the security and IAM policies of the enterprise. It will be appreciated, however, that depending on the goals and policies of an enterprise, the list of computing resources may not identify each computing resource of a computing system despite the advantages of a comprehensive list. For example, a computing system may include computing resources identified as "high priority" and computing resources identified as "low priority." In this example, the resource information 306 may include a computing resource list that identifies the "high priority" computing resources but not the "low priority" computing resources. As seen from this example, a computing resource list that is not comprehensive is nonetheless useful to obtain a full understanding of the "high priority" computing resources of the computing system. Additional and alternative metadata for a resource 210 will be appreciated by those skilled in the art. Resource association information 308 may, for example, identify associations between resources 210, e.g., between applications 210c and databases 210b for data storage and retrieval, between applications that interact with each other, and between resources that are located at the same computing system 202. Additional and alternative types of associations between resources 210 will be appreciated by those skilled in the art.

Resource access information 310 may, for example, identify users 216 and resources 210 that are provisioned with access rights to resources of a computing system 202. Accordingly resource access information 310 may include a list of all current and previous entitlements respectively associated with users 216 and resources 210. In this way the resource inventory system 230 may provide an access rights history for a particular user or a particular resource. The access rights history may indicate the date when an access right was provisioned and, if removed, the date the access right was revoked. The access rights identified in the access rights history may be referred to as historical access rights and include currently provisioned access rights for a user and previously provisioned access rights for the user. Resource access information 310 may also include a list of all permissions respectively associated with each resource 210 of the enterprise-wide computing system 200. Additional and alternative types of resource access information will be appreciated by those skilled in the art. The data store 304 may store the resource information 306, resource association information 308, and resource access information 310 as a set of interrelated database records and in accordance with an IAM data model. In some alternative example implementations, the IAM data store 222 may store a portion of the resource inventory information in conjunction with the data store 304 of the resource inventory system 230.

The resource management module 300 may be configured to, in operation, facilitate the maintenance and management of the resource inventory for the enterprise. A resource manager may utilize the resource management module 300 to update the resources 210 listed in resource inventory. A resource manager may, for example, add a new resource 210 to the resource inventory when a new resource is added to a computing system 202, remove an existing resource from the resource inventory when the resource is removed from a computing system, or modify the information for an existing resource, e.g., when the status, location, or network address of the existing resource changes at the enterprise-wide computing system 200.

Resources 210 may report to an IAM security system 226 on a regular basis. In particular, resources 210 may provide periodic (e.g., daily) access reports 312. Each resource 210 may provide a respective access report 312. An access report 312 may indicate the entitlements used to access the resource 210 as well as the user, user group, or role associated with the entitlement. It will be appreciated that if an entitlement is not used to access a resource 210, then the resource 210 may not include that entitlement in the access report 312. Resources 210 may provide respective access reports 312 to the IAM security system 226 for storage. The IAM security system 226 may include a data store 314 that stores access report information 316 corresponding to the information in the access reports 312. The data store 314 of the IAM security system 226 may store the access report information 316 as, e.g., a set of related database records respectively corresponding to the access reports received and the entitlements identified in those access reports. The access report information 316 may include the date an access report 312 was received, the resource 210 that provided the access report, and a respective set of entitlements and associated users, user groups, roles, resources, and so forth.

The access report evaluation module 302 may be in signal communication with the IAM security system 226 and thus have access to the access report information 316. The access report evaluation module 302 may be configured to, in operation, periodically perform various resource evaluation tasks and generate various types of resource evaluation reports. Resource evaluation tasks may include determining whether a resource has provided an access report as expected and determining whether the access rights reported as having been used to access the resource conform to expectations. The resource evaluation module 302 may, for example, compare the access report information 316 to the resource information 306 and determine whether each resource 210 listed in the resource inventory provided an access report 312 for the current reporting period. If a resource 210 listed in the resource inventory has not provided an access report 312 for the current reporting period, then the access report evaluation module 302 may identify the resource as a non-reporting resource in a reporting resources report 318. If the resource 210 has provided an access report 312 for the current reporting period, then the access report evaluation module 302 may identify the resource as a reporting resource in the reporting resources report 318. The access report evaluation module 302 may also be configured to, in operation, compare the reported entitlements for a current reporting period to the reported entitlements from a previous reporting period and determine whether the total number of reported entitlements deviate significantly between the reporting periods. If, for example, the total number of reported entitlements has changed in the current reporting period by more than a predetermined difference threshold (e.g., 10%), then the access report evaluation module 302 may identify the resource 210 in an entitlement deviation report 320. The difference threshold may be an absolute difference between the total number of access rights reported or may be a percentage of access rights reported for a current reporting period relative to a previous reporting period. As an example, if a resource 210 has previously reported an average of around 50,000 entitlements but only reports around 5,000 entitlements for the current reporting period, then the access report evaluation module 302 may identify that resource in the entitlement deviation report 320 due to the significant drop in the number of entitlements reported. The reporting resources report 318 and the entitlement deviation report 320 may be provided to an administrator who may then advantageously investigate why a resource 210 is not providing access reports 312 or investigate the deviation in the entitlements reported. The reporting resources report 318 and the entitlement deviation report 320 may be generally referred to as resource evaluation reports. In addition, the access report evaluation module 302 may select resources 210 for evaluation at the end of the current reporting period.

Figure 3B:
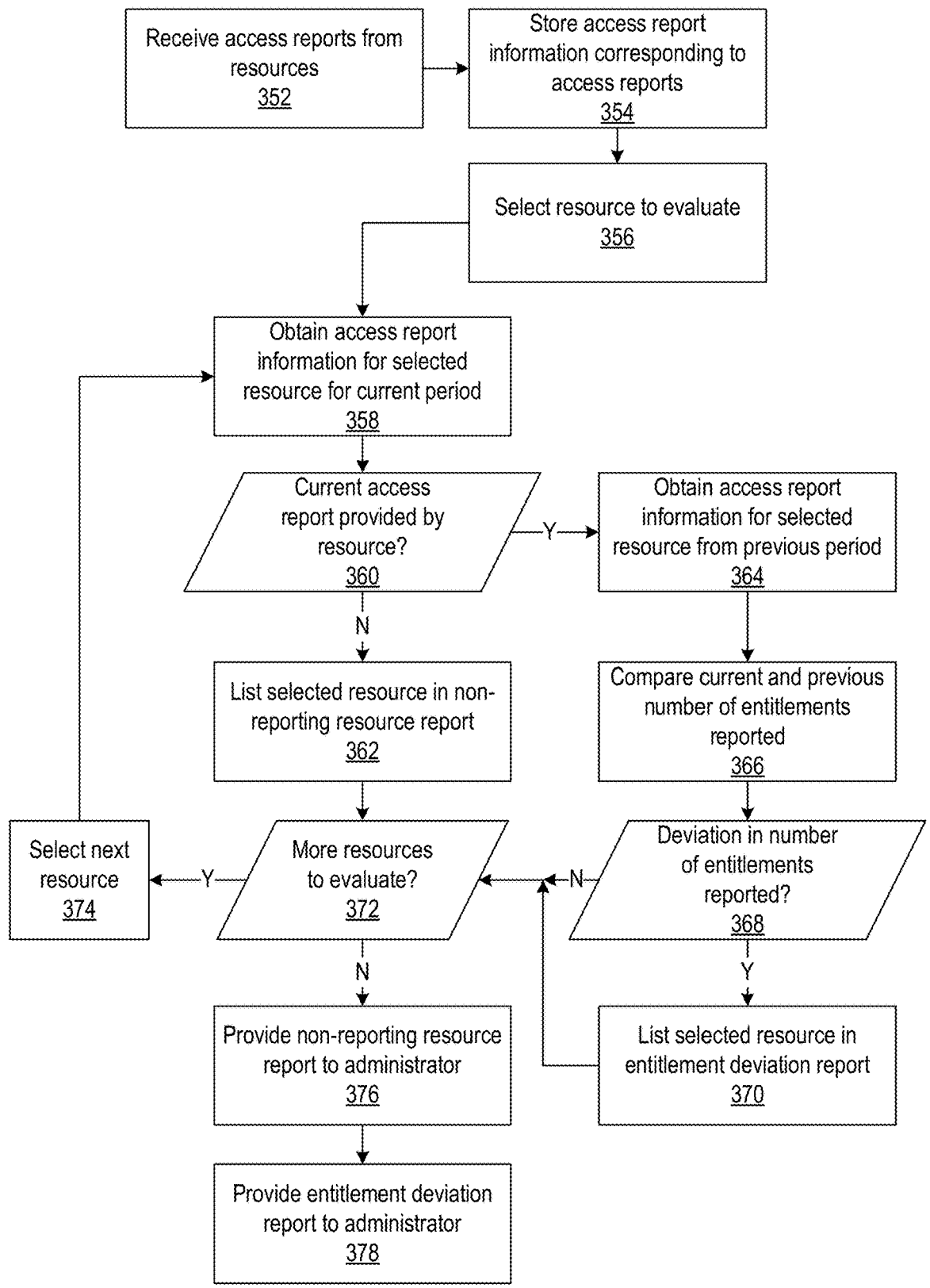
FIG. 3B is a flowchart of example method steps for evaluating access reports.

Referring now to FIG. 3B, a flowchart 350 of example method steps for evaluating access reports 312 is shown. An IAM security system 226 may periodically receive access reports 312 from respective resources 210 (block 352), and the IAM security system may store access report information 316 corresponding to the information in the access reports received (block 354). The access report evaluation module 302 may then iterate over the resource inventory list by selecting a resource 210 (block 356) and obtain access report information 316 associated with the selected resource for the current reporting period (block 358). If the selected resource did not provide an access report for the current reporting period (block 360:N), then the access report evaluation module 302 may list the selected resource in a reporting resources report 318 (block 362) identifying the selected resource as a non-reporting resource in the report.

If, however, the selected resource did provide an access report for the current reporting period (block 360:Y), then the access report evaluation module 302 may identify the selected resource as a reporting resource in the reporting resources report 318. The access report evaluation module 302 may also obtain access report information 316 associated with the selected resource for one or more previous reporting periods (block 364). The access report information 316 for the previous reporting periods may include, for example, a total number of entitlements reported in the immediately preceding period or, additionally or alternatively, an average number of entitlements reported during multiple previous reporting periods. The access report evaluation module 302 may then compare the current number of reported entitlements to the previous number of reported entitlements (block 366). If there has been a significant deviation in the number of entitlements reported during the current reporting period relative to the one or more previous reporting periods (block 368:Y), then the access report evaluation module may list the selected resource in an entitlement deviation report 320 (block 370) and identify the current access report from that resource as an atypical access report in the deviation report 320. A significant deviation may be, for example, a decrease in the total number of reported entitlements above a predetermined threshold (e.g., 10%). The access report evaluation module 302 may be selectively configured to employ additional or alternative criteria when determining whether a significant deviation has occurred with respect to the number of reported entitlements. Stated more generally, the access report evaluation module 302 may assess a difference between the total number of access rights reported in the access reports, and determine whether that difference exceeds a predetermined difference threshold.

If there has not been a significant deviation in the number of reported entitlements during the current reporting period (block 368:N), then the selected resource may not be included in the entitlement deviation report 320 as the entitlements reported for the current reporting period correspond to what was expected for the current reporting period. In some example implementations, however, the access report evaluation module 302 may include the resource in the entitlement deviation report 320 and identify the current access report from that resource as a typical access report in the entitlement deviation report.

If resources remain to be evaluated (block 372:Y), the access report evaluation module 302 may select the next resource for evaluation (block 374) and repeat the steps described above to determine whether to list the next selected resource in the reporting resources report 318 or the entitlement deviation report 320. Once each resource has been evaluated (block 372:N), the access report evaluation module 302 may provide the non-reporting resource report to an administrator (block 376) and provide the entitlement deviation report to an administrator (block 378). The access report evaluation module 302 may evaluate the access reports 312 on a regular basis (e.g., daily). In this way, administrators may quickly identify and address technical issues associated with the resources 210 of the enterprise-wide computing system 200.

2. Interactive Identity Access Management Tool

Figure 4:
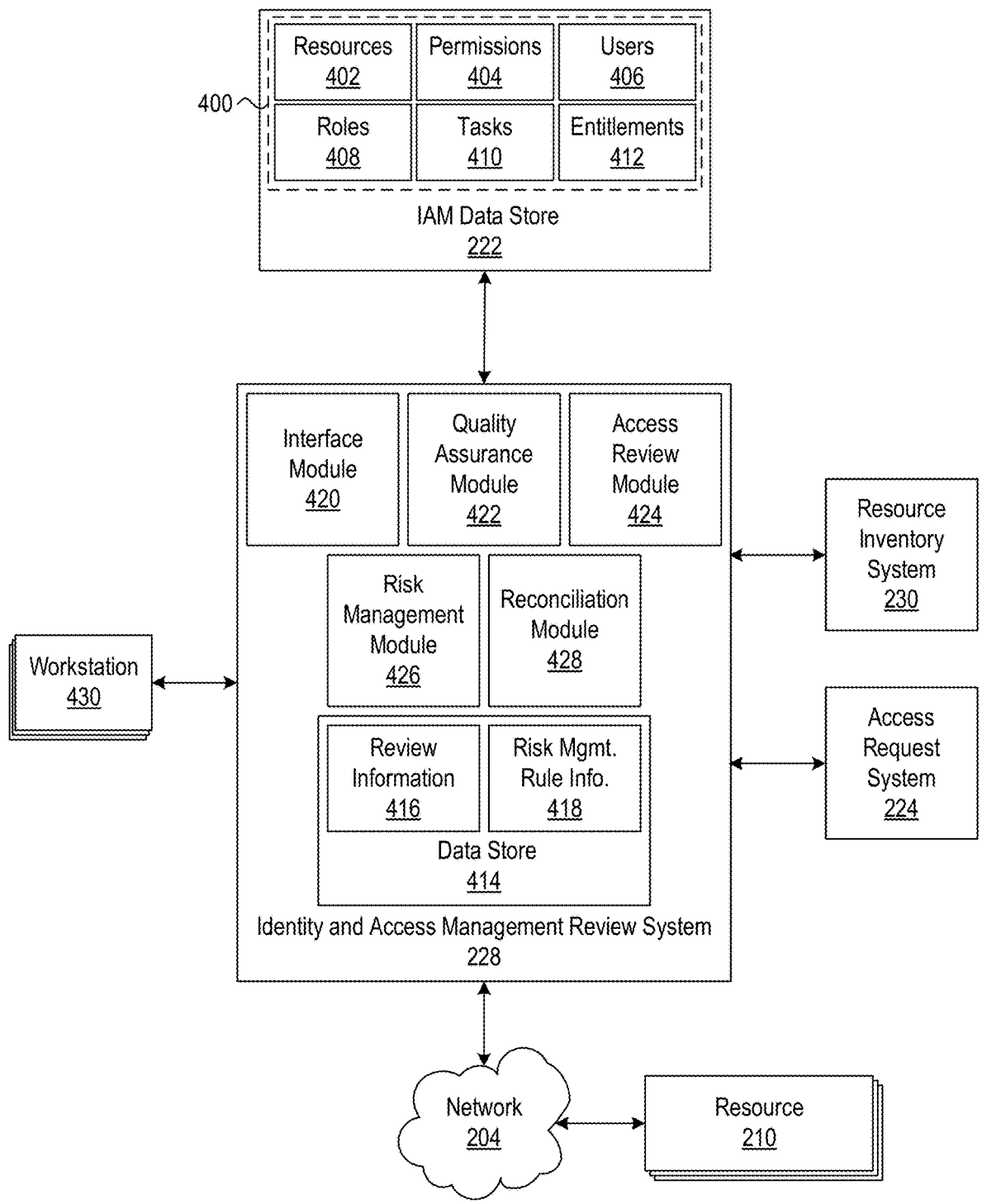
FIG. 4 is block diagram of an example of an implementation of an identity and access management review system.

In FIG. 4, a block diagram of an example of an implementation of an identity and access management (IAM) review system 228 is shown. The IAM review system 228 may be in signal communication with the IAM data store 222, the access request system 224, and the resource inventory system 230. The IAM review system 228 may also be in signal communication with the resources 210 of the enterprise-wide computing system 200 via one or more networks 204.

The IAM data store 222 may implement an IAM data model 400 and store IAM data in accordance with the IAM data model. IAM date may include, for example, resource information 402, permission information 404, user information 406, role information 408, task information 410, and entitlement information 412. Each of these types of IAM data will be appreciated with the benefit of this disclosure. The IAM data store 222 may also store other types of IAM data not shown in FIG. 4.

The IAM review system 228 may be implemented as a collection of modules that are configured to, in operation, perform various functions associated with identity access management. The modules may reside at a single location (e.g., one application server) or be distributed across multiple locations (e.g., multiple interconnected application servers). Other approaches to implementing the IAM review system 228 will be appreciated by those skilled in the art and may be selectively employed. The IAM review system 228 may also include data store 414 that stores access review information 416 and risk management rule information 418.

Access review information 416 may be related to pending and completed access reviews. Accordingly access review information 416 may include, e.g., an access review type, the assigned reviewer, the triggering event, the access review decision, an explanation for the decision, the access review status, the due date, the number of days overdue, and the date the access review was completed. The IAM review system 228 may facilitate access reviews of several types of IAM information including users 216, applications 210c, other resources 210a and 210b, risk violations, and roles. During an access review, a review may approve or reject an entitlement associated with a user 216 or a resource 210. A reviewer may also route an access review to another individual for clarification of the information under review or for reassignment of the access review to that individual. Accordingly access review information 416 may also include the individual the access review was routed to and the date the access review was routed. If the reviewer rejects an entitlement under review, the reviewer may submit a request to revoke the access rights associated with the entitlement. Different events may trigger an access review periodic internal reviews, periodic regulatory reviews, and ad hoc risk violation reviews. Access review statuses may include, e.g., "pending," "complete," and "routed." Additional types of access review information 416 will be appreciated with the benefit of this disclosure. Access reviews will be discussed in further detail below.

Risk management rule information 418 identifies incompatible roles, tasks, and resource permissions within the enterprise-wide computing system 200. As described in further detail below, a risk manager may define risk management rules that indicate which roles, tasks, and resource permissions are incompatible with one another. If a user is provisioned with access rights that violate a defined risk management rule, then a reviewer may be notified and prompted to approve or reject the provisioned access rights. Risk management rule information 418 may also include information related to exceptions to risk management rules. The data store 414 of the IAM review system 228 may store the risk management rule information 418 as a set of related database records having relationships to the permission information 404, permission information 404, and task information 410 in the IAM data store 222. Risk management, risk management rules, and exceptions to risk management rules will be discussed in further detail below.

The modules of the IAM review system 228, in this example, include: an interface module 420, a quality assurance (QA) module 422, an access review module 424, a risk management module 426, and a reconciliation module 428. Alternative implementations of the IAM review system 228 may include additional or alternative modules that facilitate identity and access management. The modules 420-428, in this example, may work together to carry out the functional aspects of the IAM review system 228.

The interface module 420 may accept input and provide output from an administrator when operating the IAM review system 228. An administrator may access and operate the IAM review system 228 from a workstation 430, e.g., a desktop computer, a laptop computer, a tablet computer, a palmtop computer, a cellular telephone ("smartphone"), and other types of computing devices. The interface module 420 may be implemented as a desktop application, a mobile application, or a web application. The interface module 420 may display various interfaces that include IAM information, access review information, and other types of information that will be appreciated with the benefit of this disclosure. The interface module 420 may accept input from an administrator to, e.g., view different types of IAM information, receive an access review decision, submit an access request, define risk management rules and exceptions, navigate through the interfaces, and perform other IAM activities that will be appreciated with the benefit of this disclosure. Example interfaces described below with reference to FIGS. 5A-M.

The QA module 422 may be configured to, in operation, perform various quality assurance checks within the IAM system 220. A quality assurance check may be implemented as a quality assurance task carried out by the QA module 422. Example quality assurance checks may include evaluation of submitted access requests, roles, entitlements, and data integrity. In particular, the QA module 422 may be configured to, in operation, automatically identify when a defined role matches a set of requested access rights, automatically determine whether a set of requested access rights have already been provisioned for a user, automatically identify unused entitlements, and identify circumstances of data incompatibility between components of the enterprise-wide computing system. These example QA checks and their correspond QA tasks will be discussed in further detail below.

The reconciliation module 428 may be configured to, in operation, perform various reconciliations within the IAM system 220. Reconciliations may involve evaluation of permissions, entitlements, access report information 316, and access requests. The reconciliation module 428 may be configured to perform different types of reconciliations including, for example: expectation reconciliation in which the reconciliation module compares current entitlements to expected entitlements; termination reconciliation in which the reconciliation module ensures any entitlements for a terminated user 216 are purged from the IAM system 220; authorization reconciliation in which the reconciliation module ensures that all current entitlements can be traced to an approved access request; and deviation reconciliation in which the reconciliation module flags access rights that are assigned to users having attributes that appear to deviate from the attributes of the other users assigned such access rights. With respect to termination reconciliation, a user 216 may be terminated, for example, when that user ends a term of employment with the enterprise or goes on a leave-of-absence. With respect to deviation reconciliation, a user 216 having attributes that deviate from other users may be referred to as an "outlier."

The risk management module 426 may be configured to, in operation, facilitate construction of risk management rules and corresponding exceptions. The risk management module 426 may also be configured to, in operation, monitor newly provisioned access rights and compare newly provisioned access rights to the risk management rules. The risk management module 426 may also determine whether any exceptions associated with the risk management rule apply. The risk management module 426 may create risk violation reviews for violated risk management rules and assign the violations to a reviewer. As described in further detail below, a violation severity level may be associated with a risk management rule The access review module 424 may be configured to, in operation, facilitate completion of access reviews at the IAM review system 228. As noted above, access reviews may include reviews of users 216, applications 210c, other resources 210a and 210b, risk violations, and roles. The access review module 424 may retrieve access review information 416 and provide a list of pending access reviews to be completed by a reviewer. The access review module 424 may also be configured to identify previously completed access reviews during subsequent reviews so as to advantageously avoid repeating such access reviews. The access review module 424 may also be configured to receive and process the access review decisions of the reviewer which may include creating access requests to revoke access rights or routing access reviews to other individuals for clarification or reassignment. Access reviews will be discussed in further detail below.

Referring now to FIGS. 5A-M, example interfaces that the interface module 420 may present to the user while interacting with the IAM review system 228 are shown. The various interfaces shown in FIGS. 5A-M may collectively correspond to the IAM dashboard mentioned above as the centralized location for managing IAM information. Managers employed at an enterprise may be responsible for conducting reviews of users, applications, and other resources under their supervision. Accordingly, managers are one type of user that may utilize the IAM review system 228 to conduct reviews, perform reconciliation, engineer and review roles, and carry out other tasks related to identity and access management. It will be appreciated, however, that other types of users may utilize the IAM review system 228 for IAM purposes (e.g., managers may delegate or reassign tasks or reviews to non-manager users). It will also be appreciated that the example interfaces shown in these figures are described below by way of example only. Other implementations of these interfaces may display additional and alternative types of information in additional or alternative arrangements. Such additional and alternative implementations will be appreciated with the benefit of this disclosure.

In FIG. 5A, an example of an implementation of a first type of interface 500 of an IAM review system 228 is shown. The example interface 500 in FIG. 5A is a main dashboard interface 500, in other words, the main interface from which a manager may navigate through the IAM review system 228. The individual that navigates through and interacts with the IAM review system 228 may also be referred to as the operator. The main dashboard interface 500 may include one or more portals. In at least one arrangement, the main dashboard interface 500 may include a pending review portal 502, where each listing within the pending review portal 522 represents a type of review to be completed. Each listing within the pending review portal 522 corresponds to one or more pending reviews of that type. The review types may include user reviews 504, application reviews 506, resource reviews 508, violation reviews 510, role reviews 511, and other resource-related reviews. For each pending review type, the pending review portal 502 may display a date the reviews were assigned, a due date for the reviews, and a current status of the reviews (e.g., x of y completed, not started, completed, not submitted). The pending review portal 502 may also include additional review information, e.g., days until due, days overdue, routing information identifying an individual that the manager routed reviews to for clarification or delegation, and other types of review-related information. To navigate to a review interface, the manager may select one of the pending review types from the pending review portal 502. For example, selecting "User Reviews" 504 in FIG. 5A would bring the manager to the user review interface 520 (FIG. 5B). Similarly, selecting "Application Reviews" 506 would bring the manager to an application review interface 560 (FIG. 5D), selecting "Resource Reviews" 508 would bring the manager to a resource review interface 590 (FIG. 5F), selecting "Violation Reviews" 510 would bring the manager to a violation review interface 630 (FIG. 5H), and selecting "Role Reviews" 511 would bring the manager to a pending role review interface 720 (FIG. 5L).

Additionally or alternatively, the dashboard interface 500 may include portals listing users 216 that the manager supervises (i.e., e.g., all individuals that report to the current manager), as well as applications, other resources, and roles managed by the current manager. For each user, the user portal 512 may display a unique identifier for the user, a last name, a first name, a user type, a location, a business role, a hire date, a termination date, and a review type. To navigate to a user detail interface 540 (FIG. 5C), the manager may select one of the users listed in the user portal 512.

Similarly, the applications portal 514, other resources portal 516, and role portal 517 may respectively display metadata describing applications, other resources, and roles managed by the manager. To navigate to an application detail interface 570 (FIG. 5E), the manager may select one of the applications listed in the applications portal 514. To navigate to a resource detail interface 610 (FIG. 5G), the manager may select one of the resources listed in the resource portal 516. To navigate to a role review interface 740 (FIG. 5M), the manager may select one of the roles listed in the role portal 517.

It is appreciated that the information displayed on the dashboard interface 500 and on the other interfaces described below (FIGS. 5B-M) is specific to the manager logged into the IAM review system 228, as indicated by the interface header 518. For example, the reviews, users, applications, and other resources presented on the various portals of the dashboard are assigned to or associated with the manager.

In FIG. 5B, an example of an implementation of a second type of interface 520 of an IAM review system 228 is shown. The example interface 520 in FIG. 5B is a user access review interface 520. The user access review interface 520 may include a pending user access review portal 522, which lists pending user reviews assigned to the manager. Each user review 524 listed within the user access review portal 522 represents one user access review assigned to the manager. For each pending user access review 524, the pending user access review portal 522 may display a unique user identifier, a last name, a first name, a review type, a resource identifier, an entitlement description a date entitlement was granted, and a name of individual that approved the entitlement. If the user review resulted from a risk violation, then the user access review portal 522 may also identify the violated rule. The pending user access review portal 522 may also include additional review information describing the relationship between the user, the resource, and the entitlement (e.g., last date entitlement was used). To navigate to a user detail interface 540 (FIG. 5C), the manager may select one of the user reviews 524 (e.g., by selecting the user identification, last name, or first name) listed in the pending user access review portal 522. Additionally or alternatively, to navigate to the risk management rule configuration interface 650 (FIG. 5I), the manager may select the risk management rule that was violated for one of the user reviews 524 in the pending user access review portal 522.

In at least one arrangement, the pending user access review portal 522 may include a selectable user interface element 526 to request clarification of the entitlement description for a pending user access review 524. The manager may select the element 526 for a particular pending user access review 524 in order to obtain more information about the entitlement and thus make a more informed decision on whether to approve the entitlement associated with the pending user access review 524.

Further, the pending user access review portal 522 may include one or more selectable user interface elements for each pending user access review 524 to allow the manager to process the review. In at least one arrangement, the selectable user interface elements may include an element 528 to approve the entitlement, an element 530 to reject the entitlement, and an element 532 to route the user review to another individual. When the manager selects the element 528 to approve a user access review 524, the IAM review system 228 may update the user access review record with the date approved and the name of individual that approved the review. If, however, the manager selects the element 530 to reject the user access review 524, the IAM review system 228 may automatically create an access request that requests the revocation of the entitlement. The manager may also select the element 532 to route the a user review 524 to another individual. Selecting element 532 may cause the IAM review system 228 to prompt the manager to select another individual (e.g., another user of the IAM review system 228) for delegation or reassignment of the review.

In FIG. 5C, an example of an implementation of a third type of interface 540 of an IAM review system 228 is shown. The example interface 540 in FIG. 5C is a user detail interface 540. The user detail interface 540 presents the collection of access rights associated with the selected user, as indicated by the access collection header 546. In at least one arrangement, the user detail interface 540 may include a current access rights portal 542, and a historic access rights portal 544. The current access rights portal 542 provides a listing of the access rights currently associated with the selected user. The historic access rights portal 544 provides a listing of the access rights previously associated with the selected user.

In at least one arrangement, for each access right 548, the current access rights portal 542 may display a unique access right identifier, an access type, an access description, a unique resource identifier of the associated resource, an entitlement description, a date entitlement was granted, and a name of individual that approved the access right. According to at least one aspect, if an access right 548 is pending review for entitlement, the current access rights portal 542 may include one or more selectable user interface elements for each pending user access review to allow the manager to process the review. In some examples, the selectable user interface elements may include an approve entitlement element 528, a reject entitlement element 530, and a route review element 532. These selectable user interface elements operate in a similar fashion to the selectable user interface elements in FIG. 2 above.

Similarly, in at least one arrangement, for each access right 550, the historic access rights portal 544 may display the same attributes of access right 548 as presented in the current access rights portal. Additionally, for each access right 550, the historic access rights portal 544 may display a date the access right 550 was revoked, and an event associated with the revocation (e.g., an end of employment term, transfer to another division or branch, a risk violation, or the result of a regulatory access rights review).

In FIG. 5D, an example of an implementation of a fourth type of interface 560 of an IAM review system 228 is shown. The example interface 560 in FIG. 5D is an application review interface 560. The application review interface 560 may include a pending application access review portal 562, which provides a listing of all applications 564 with pending application reviews assigned to the manager, as indicated by the interface header 518. For each application 564, the application review interface 560 may display a unique application identifier, an application description, an individual that last reviewed the application, a date of the last review, a status of the pending application review (e.g., not started, started, completed), and a progress indicator representing the number of access rights that have been reviewed for the access review relative to the total number of access rights to review for the application review. To navigate to an application detail interface 570 (FIG. 5E), the manager may select one of the applications 564 listed in the applications portal 514.

In FIG. 5E, an example of an implementation of a fifth type of interface 570 of an IAM review system 228 is shown. The example interface 570 in FIG. 5E is an application detail interface 570. Although an application may be a type of resource, some example implementations of the IAM review system 228 may separate reviews and details for applications from reviews and details for other types of resources (e.g., servers, databases). In at least one arrangement, the application detail interface 570 may include an application access detail portal 572 and an application permissions portal 574. The application access detail portal 572 provides a listing of all access rights associated with the selected application, as indicated by the application access header 580. In some examples, the application detail interface 570 may include multiple portals such that each portal provides a listing of all access rights associated with the selected application for a particular deployment environment (e.g., live, testing, and development). The application permissions portal 574 provides a list of permissions associated with the selected application.

In at least one arrangement, for each access right 576, the application access detail portal 572 may display a unique application identifier, an application name, an environment in which an instance of the application is deployed, a unique resource identifier of the resource that hosts an instance of the application, a resource name, an access type, an entitlement description, a date entitlement was granted, and an individual that granted the entitlement. The application access detail portal 572 may also include additional review information describing the relationship between the application, the resource, and the entitlement (e.g., last date entitlement was used). According to at least one aspect, if an access right 576 is pending review of an entitlement, the application access detail portal 572 may include one or more selectable user interface elements for each pending application access review to allow the manager to process the review. In at least one arrangement, the selectable user interface elements may include an approve entitlement element 528, a reject entitlement element 530, and a route review element 532. These selectable user interface elements in a similar fashion to the selectable user interface elements in FIG. 2 above. A manager may thus utilize the application access detail portal 572 to review entitlements to a selected application. If the manager rejects an entitlement to a selected application, the access review module 424 may automatically submit an access request that requests revocation of the rejected entitlement.

In at least one arrangement, for each permission 578, the application permissions portal 574 may display a unique permission identifier, the name of the permission, the type of permission (e.g., create, read, write, execute, delete), and a description of the permission. For each permission 587, the application permissions portal 574 may also indicate whether a review is required for that permission. The applications permissions portal 574 may include a user interface element 588 (e.g., a text box, radio buttons, checkbox, drop-down menu) allowing the manager to modify whether a particular permission 578 requires review. In response to input received at the user interface element 588 for one of the permissions 578, the IAM review system 228 may set a review flag indicating whether review of that permission is required. The review flag of a permission 578 may, for example, be set to "Y" when the input indicates that review of the permission is required and set to "N" when the input indicates that review of the permission is not required. The applications permission portal 574 may also include a user interface element 589 allowing the manager to set a risk level for a permission 578. As discussed further below, the risk level associated with a permission 578 may be utilized to automatically set the review flag of that permission. Individually selecting which permissions of a resource requires review advantageously allows the manager to express risk associated with that resource in a granular fashion. As a result, the total number of reviews to complete for that application may be advantageously reduced. Granular risk expression will be discussed in further detail below.

In FIG. 5F, an example of an implementation of a sixth type of interface 590 of an IAM review system 228 is shown. The example interface 590 in FIG. 5F is a resource review interface 590. The resource review interface 590 may present a list of resources other than applications (e.g., servers, databases). In some examples, the resource review interface 590 may include a resources portal 592 and a resource users portal 594. The resources portal 592 may display a list of resources assigned (e.g., for supervision) to the manager, as indicated by the interface header 518. The resource users portal 594 may display a list of users with entitlements to access a selected resource 596. The resource users portal 594 may also enable the manager to review the entitlements of the users having access to the selected resource.

In at least one arrangement, for each resource 596, the resources portal 592 may display a unique resource identifier, a resource description, a date the resource was created (or deployed at a computing system), a date the resource was last reviewed, and a name of individual that last reviewed the resource. To navigate to a resource detail interface 610 (FIG. 5G), the manager may select one of the resources 596 listed in the resources portal 592.

In at least one arrangement, for each resource review 598, the resource users portal 594 may display a unique user identifier, a last name, a first name, a user job code, a title, a user location (e.g., geographic region or office), a name of the user's manager, a date entitlement was granted, a name of individual that approved the entitlement, and an indicator of whether the user is an outlier (i.e., whether one or more attributes of the user deviate from the typical attributes of similar users have a similar entitlement).

According to at least one aspect, the resource users portal 594 may include one or more selectable user interface elements for each pending resource review 598 to allow the manager to process the review. In at least one arrangement, the selectable user interface elements may include an approve entitlement element 528, a reject entitlement element 530, and a route review element 532. These selectable user interface elements operate in a similar fashion to the selectable user interface elements in FIG. 2 above. The manager may thus utilize the resources users portal 594 to review user entitlements to a selected resource. If the manager rejects an entitlement associated with the selected resource, then the access review module 424 may automatically create an access request that requests revocation of the rejected entitlement.

In FIG. 5G, an example of an implementation of a seventh type of interface 610 of an IAM review system 228 is shown. The example interface 610 in FIG. 5G is a resource detail interface 610. The resource detail interface 610 may present details of a particular resource. In at least one arrangement, the resource detail interface 610 may include a resource detail header 612, a resource permissions portal 614, and an associated resources portal 616. In at least one arrangement, the resource detail header 612 provides the details of the selected resources. For example, the resource detail header 612 may include the resource name, resource location, and location description.

According to one or more aspects, the resource permissions portal 614 may provide a listing of all permissions associated with the selected resource, as indicated by the resource detail header 612. In at least one arrangement, for each permission 618, the resource permissions portal 614 may display a unique permission identifier, a permission name, a permission type (e.g., create, read, write, execute, delete), and a permission description. For each permission 618, the resource permissions portal 614 may also indicate whether a review is required for that permission. The resource permissions portal 614 may include a user interface element 620 (e.g., a text box, radio buttons, checkbox, drop-down menu) allowing a resource manager to modify whether a particular permission requires review as described above with reference to the user interface element 588. In this way the manager may similarly express risk associated with the selected resource in a granular fashion thus advantageously reducing the total number of reviews required for that resource.

In at least one example implementation, the associated resources portal 616 may provide a listing of other resources associated with the selected resource. For example, the associated resources portal 616 may present other resources the selected resource has entitlements to. Additionally or alternatively, the associated resources portal 616 may present other resources having entitlements to the selected resource. For each associated resource 622, the associated resources portal 616 may display a unique resource identifier, a resource name, a resource type (e.g., application, server, database), and a resource description. To view resource details for one of the associated resources 622 (i.e., to navigate to the resource detail interface 610), the manager may select one of the associated resource 622 listed in the associated resources portal 616.

In FIG. 5H, an example of an implementation of an eighth type of interface 630 of an IAM review system 228 is shown. The example interface 630 in FIG. 5H is a violation review interface 630. In at least one arrangement, the violation review interface 630 may include a risk management rule violation portal 632, which presents pending risk violation reviews. A risk violation review may be triggered by the IAM system 220 when a user, application, or other resource is provisioned with incompatible access rights, e.g., combinations of incompatible roles, tasks, or permissions. Access rights may be incompatible, for example, due to separation-of-duties principles.

For each pending risk violation review 634, the risk management rule violation portal 632 may display a violation type (e.g., separation-of-duties), a base access right, a conflicting access right, a description of the violation, and information regarding any exceptions to the risk violation. In some examples, there may exist an exception to the risk violation, such that the risk violation is deemed to be acceptable (e.g., when a user is provisioned with access rights for a temporary training period). A manager may thus utilize the risk management rule violations portal 632 to review risk violations detected at the IAM system 220. If the manager determines that the exception does indeed apply to the risk violation, the manager may approve the risk violation and justify the approval by identifying the applicable exception. If the manager does not approve of the risk violation, then the access review module 424 may automatically create an access request that requests revocation of the conflicting entitlement that violates the risk management rule. The manager may also view and configure the details of a risk management rule at a risk management rule configuration interface 650 (FIG. 5I). To navigate to a risk management rule configuration interface 650 (FIG. 5I), the manager may select one of the violations listed in the risk management rule violations portal 632.

Further, the risk management rule violations portal 632 may include one or more selectable user interface elements for each pending risk violation review 634 to allow the manager to process the review. In at least one arrangement, the selectable user interface elements may include an approve entitlement element 528, a reject entitlement element 530, and a route review element 532. These selectable user interface elements operate in a similar fashion to the selectable user interface elements in FIG. 2 above. Additionally, in some examples, if the manager selects the approve entitlement element 528, the IAM review system 228 may prompt the manager for a justification, which may be stored as review information 416 in a review record at the data store 414.

In FIG. 5I, an example of an implementation of a ninth type of interface 650 of an IAM review system 228 is shown. The example interface 650 in FIG. 5I is a risk management rule configuration interface 650 ("rule configuration interface"). In at least one example implementation, the rule configuration interface 650 allows the manager to create risk management rules by identifying rule violations (e.g., incompatible access rights). In at least one arrangement, the rule configuration interface 650 may allow the manager to create a new risk management rule or modify an existing risk management rule. The risk management configuration interface may include an access rights portal 652 that lists roles, task, and permissions selectable as base access rights or conflicting access rights for the risk management rule being configured. According to one or more aspects, a risk management rule may be defined by a name 654, a description 656, a base access right 658, one or more conflicting access rights 660, a violation severity level 662 (e.g., low, medium, high, critical), and one or more exceptions 664 to the risk management rule. The IAM system 220 may determine whether new access requests violate risk management rules defined and stored in the IAM review system 228 based on the base access right and one or more conflicting access rights respectively selected for the risk management rules. If a new access request is determined to violate a risk management rule, the IAM review system 228 may trigger a violation review, which may be displayed at the violation review interface 630 (FIG. 5H). Additionally, in at least one example implementation, even if a risk management rule exception applies, the violation review may still be triggered, but the applicable exception may be displayed with the violation review at the violation review interface 630 (FIG. 5H). In this way, the IAM review system 228 may ensure that a violations of risk management rules are presented to managers for approval.

The rule configuration interface 650 may identify the access right selected as the base access right 658 for the risk management rule being configured. The rule configuration interface 650 may also include a list of access rights 660 selected as conflicting with the base access right. As seen in FIG. 5I, various combinations of roles, tasks, and permissions may be defined as conflicting access rights (e.g., role-role, role-task, role-permission, task-task, task-permission, and permission-permission). The rule configuration interface 650 may include input elements 670a-b to add and remove access rights to a risk management rule being configured. A manager may add an access right to the risk management rule as a base or conflicting access right by selecting one of the access rights in the access rights portal 652 and selecting the input element 670a to add the selected access right to the risk management rule. A manager may remove the base access right 658 or one of the conflicting access rights in the list 660 and selecting the input element 670b to remove the selected access right. It will be appreciated that other example implementations (e.g., combination of user interface elements) may be selectively employed to create and modify risk management rules without departing from the scope of the present disclosure.

In some examples, the rule configuration interface 650 may also include a list of exceptions 664 created for a conflicting access right (e.g., text box, drop-down, add/remove options, and the like) Selecting one of the conflicting access rights in the list of conflicting access rights 660 may cause the exceptions 664 associated with the selected conflicting access right to be displayed in the list. The rule configuration interface may include an input element 672 to add a new exception to the conflicting access right selected and an input element 674 to modify an existing exception for the conflicting access right selected. Selecting the element 672 to add or the element 674 to modify an exception may cause the manager to navigate to the risk exception configuration interface 680.

In at least one example implementation, the rule configuration interface 650 may include selectable user interface elements 676 and 678 to respectively save or the changes made to a risk management rule. The manager may select the save element 676 to create or modify the risk management rule in the IAM system 220 with the selections made in the rule configuration interface 650. The manager may also select the cancel element 678 to abandon the creation or modification of the risk management rule. Additionally or alternatively, upon selection of the save element 676 or the cancel element 687, the rule configuration interface 650 may alert the manager. If the manager selects the save element 676, then the IAM review system 228 may alert the user to invalid (e.g., empty, blank, invalid) components in the risk configuration portal. If the manager selects the cancel element 678, then the IAM review system 228 may ask for confirmation as to whether the manager would like abandon the changes made to the risk management rule.

In FIG. 5J, an example of an implementation of a tenth type of interface 680 of an IAM review system 228 is shown. The example interface 680 in FIG. 5J is a risk exception configuration interface 680. The risk exception configuration interface 680 allows the manager to create and configure exceptions to risk management rules created in the rule configuration interface 650 (FIG. 5I). The risk exception configuration interface 680 allows the manager to create or modify an exception to a selected risk management rule using selectable user interface elements associated with various types of metadata and logical operators. The risk exception configuration interface 680 may display information associated with a selected risk management rule including the rule name 654, the base access right 658, the list of the conflicting access rights 660, the violation severity level 662 (e.g., low, medium, high, critical), and the rule description 656.

To configure a risk exception, the manager may select a logical operator 690 (e.g., equals, not equals, greater than, less than, and so on) and one or more attributes 692 to evaluation against a selected attribute. The manager may also select an expiration date 694 for the risk exception being configured. In at least one arrangement, the user may select one or more attributes based on metadata associated with a user (e.g., location, division, job code), an application (e.g., environment), or another resource (e.g., location, permission type). Other types of metadata associated with other components of the IAM system will be appreciated with the benefit of this disclosure and may be selectively employed to configure risk exceptions. Furthermore the risk exception configuration interface 680 may allow a user to select multiple values of a particular attribute to be alternatively evaluated against the logical operator (e.g., job code 1 OR job code 3).

In at least one example implementation, the risk exception configuration interface 650 may include selectable user interface elements 696 and 698 to respectively save or cancel the changes made to a risk exception being configured. The save element 696 and the cancel element 698 may be similar to that described above in relation to the rule configuration interface 650 (FIG. 5I).

Figure 5K:
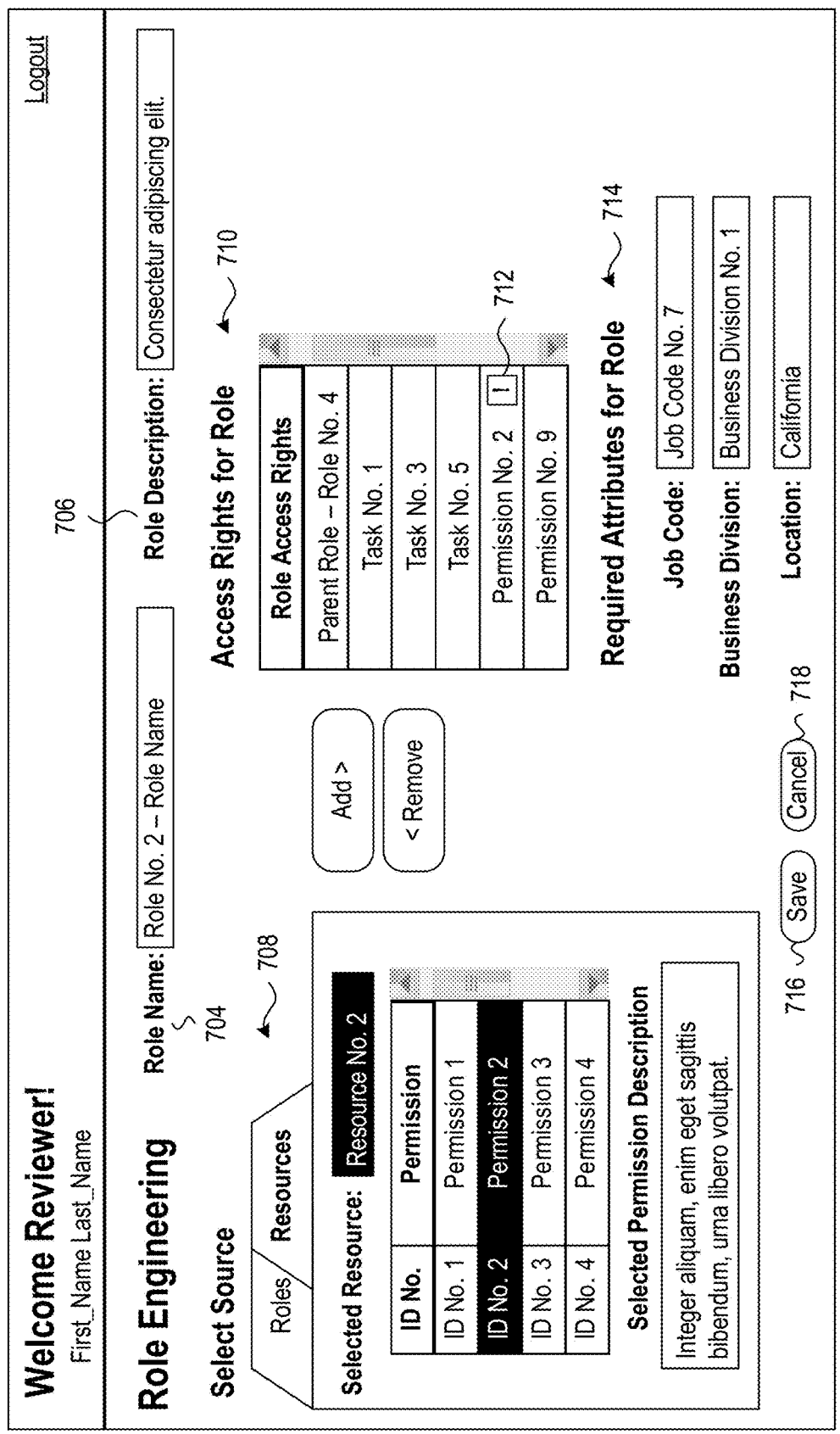

In FIG. 5K an eleventh type of interface 700 of an IAM review system 228 is shown. The example interface 700 in FIG. 5K is a role configuration interface 700. In at least one example implementation the role configuration interface 700 allows the manager (e.g., role engineers) to create new roles and associate access rights to those roles (e.g., tasks, permissions). The role configuration interface 700 allows the manager to create new roles or modify an existing role. According to one or more aspects, a role may be defined by a role name 704, a role description 706, and one or more access rights 710. The role configuration interface 700 may also include input elements that allow the manager to specify required attribute values 714 that a user must possess in order to be assigned the role such as, e.g., job code, business division, and location. These user attributes prescribe the attributes that users must have in order to be in the group. The one or more access rights may be selected from different sources (e.g., existing roles, resources).

In at least one arrangement, the role configuration interface 700 may include one or more input elements to allow the manager to define the various components of a role. For example, the role configuration interface 700 may include a role name input element 704 (e.g., text box, and the like), a role description 706 (e.g., text box, and the like), such that the manager can set the role name and the role description. The role configuration interface 700 may also include a list of access rights 710 (e.g., tasks, permissions) selected for the role being configured. It will be appreciated that other example implementations (e.g., combination of user interface elements) to create and modify roles may be utilized, without departing from the scope of the present disclosure.

The role configuration 700 may include an access right portal 708 that lists access rights the manager may select to add to the role being configured. As seen in FIG. 5K, a manager may add resource permissions to the role being configured. The manager may select a resource at the access right portal 708, and the access right portal may display a list of permissions associated with the selected resource. The manager may then select one of the permissions to add to the role being configured. The access right portal 708 may also display a description of the resource permission selected. The access right portal 708 may similarly display a list of existing roles the manager may add as a parent role of the role being configured. The manager may select an existing role from the interactive list of roles in order to view tasks and permissions associated with that existing role. The manager may then select one or more of these tasks and permissions to add to the role being configured. Additionally or alternatively, the manager may select one of the existing roles from the access right portal 708 as a parent role of the role being configured. In this way the role being configured may inherit the access rights of the role selected as the parent role. In some example implementations, all of the tasks and permissions associated with a parent role may be automatically added to the role being configured. The role configuration interface 700 may also include elements to add and remove selected access rights.

In some examples, the IAM review system 228 may evaluate existing risk management rules when a manger adds access rights to a role being configured in order to determine whether the selected access right violates a risk management rule. If any of the access rights selected for the role are determined to violate a risk management rule, the role configuration interface 700 may display a violation indicator 712 with the conflicting access right listed in the list of access rights 710 for the role.

In at least one example implementation, the role configuration interface 700 may include selectable user interface elements 716 and 718 to respectively save or cancel the changes made to the role being configured. The manager may select the save element 716 to create or modify the role in the IAM system 220 with the selections made at the role configuration interface 700. The manager may also select the cancel element 718 to abandon the creation or modification of role. Additionally or alternatively, upon selection of the save element 716 or the cancel element 718, the IAM review system 228 may alert the current manger. For example, if the manager selects the save element 716, IAM review system 228 may alert the user to invalid (e.g., empty, blank, invalid) components at the role configuration interface 700. The IAM review system 228 may also alert the manager if the manager attempts to save a role for which a selected access right violates a risk management rule. If the manager selects the cancel element 718, the IAM reviews system 228 may ask for confirmation as to whether the manager would like abandon the changes made to the role being configured.

In FIG. 5L a twelfth type of interface 720 of an IAM review system 228 is shown. The example interface 720 in FIG. 5L is a pending role review interface 720. The pending role review interface 720 may include a pending role review portal 722 and a user portal 724. The pending role review portal 722 may list roles 726 with pending access reviews. The user portal 724 may list users currently assigned to or otherwise associated with a selected role. The pending role review portal 722 may list roles 726, tasks 728 associated with a role, and permissions 730 associated with a task. The roles 726 listed in the pending role review portal 722 may be associated with a pending review. For each role 726, the pending reviews portal 722 may display details for the roles 726, tasks 728, and permissions 730 listed. Role details may include a role description, a date last reviewed, a date granted, and a name of an individual that approved the role. Each role 726 listed at the pending role review portal 722 may be expanded or collapsed to show or hide the tasks and corresponding permissions associated with that role. For example, a role 726 may be expanded to show the tasks 728 associated with the selected role. For a task 728, the pending role review portal 722 may display a task description and a date granted (e.g., the date the task was assigned to the role). Further, a task 728 within the pending role review portal 722 may be expanded or collapsed to show or hide the permissions 730 associated with the selected task. For a permission 730, the pending role review portal 722 may display a permission description and a date granted (e.g., the date the permission was associated with the task).

In at least one example implementation, selecting one of the roles 726 from the pending role review portal 722 may causes the users portal 724 to list the users assigned the selected role. For a user 732, the users portal 724 may display a unique user identifier, a last name, a first name, a job code, a job title, a location, the name of the user's manager, a date the role was assigned to user, and a name of an individual that approved the assignment. Additionally or alternatively, the users portal 724 may include a selectable user interface element 734 to manually trigger an access review for the role assigned to the selected user 732. The manager may also select a task 728 at the pending role review portal 722 to display the users 732 assigned to the selected task at the user portal 724. The manager may further select a permission 730 to display the users 732 having an entitlement to the selected permission at the user portal 724.

In FIG. 5M a thirteenth type of interface 740 of an IAM review system 228 is shown. The example interface 740 in FIG. 5M is a role review interface 740. The role review interface 740 may be used to review a role selected at the pending role review interface 720, as indicated by the role review header 748. In at least one arrangement, the role review interface 740 may include an access review portal 742, access rights portal 744, and a user portal 746. The access review portal 742 may provide a listing of pending access reviews associated with the selected role. The access rights portal 744 provides a listing of all access rights for the selected role. The user portal 746 provides a listing of all users assigned to the selected role.

In at least one arrangement, for each pending access review 750 and 752 (e.g., tasks, permissions), the access review portal 742 may display an access right, an access type, an access right description, a date last reviewed, a date granted, a name of an individual that approved the access right, and one or more selectable user interface elements for each pending access right review to allow the manager to process the access right review. In some examples, the selectable user interface elements may include an approve access right element 528, a reject access right element 530, and a route access right review element 532. These selectable user interface elements operate in a similar fashion to the selectable user interface elements in FIG. 2 above. In some examples, each task review 750 within the access review portal 742 may be expanded or collapsed to show or hide the permission reviews 752 associated with the selected task review 750. A manager may utilize the role review interface 740 to approve or reject tasks and corresponding permissions that are associated with the selected role. If the manager rejects a task or permission for the role, then the access review module 424 may automatically create an access request that requests the rejected task or permission be removed from the selected role. Furthermore the role review interface 740 improves the role review process by separating the pending access reviews 750 and 752 from all of the access rights associated with the role.

The access rights portal 744 may similar to the access review portal 742, except that it may display all access rights associated with the selected role. Thus, not all listings in the access rights portal 744 may require a review. Accordingly, the selectable user interface elements to approve, reject, or route the access review may only appear for those access rights requiring a review.

In at least one arrangement, for each user 754, the user portal 746 may display a unique user identifier, a last name, a first name, a job code, and selectable user interface elements to approve, reject, or route the access review for the selected user. These selectable user interface elements operate in a similar fashion to the selectable user interface elements in the access review portal 742 and in FIG. 2 above. A manager may thus also utilize the role review interface to approve or reject users that are assigned the selected role. If the manager rejects a user assigned to the selected role, then the access review module 424 may automatically create an access request that requests the user be removed from the role.

With regard to the interfaces and portals shown (FIGS. 5A-M), the interfaces and portals may include the ability to sort, filter, search, and otherwise manipulate the data displayed through the IAM review system 228. For FIGS. 5A-M, it will be appreciated that the interfaces and portals shown are illustrative and other means of displaying and interacting with the IAM review system 228 may be used.

3. Quality Assurance

The IAM review system 228 may include a quality assurance module 422 that, in operation, selectively performs various quality assurance (QA) checks at the enterprise-wide computing system 200. QA checks may include, for example: identification of non-use of roles; determination of whether an access request is redundant; identification of unused entitlements; and identification of data incompatibility among the components of the IAM review system. The QA module 422 may perform one or more of these QA checks periodically (e.g., daily, weekly, and so forth) or on demand in response instructions received from an administrator. Identification of non-use of roles may include automatically determining whether requested access rights match a defined role and, if so, refraining from provisioning the access rights specified in the access request. Instead the requestor may be instructed to submit a new access request that specifies the defined role that matches the previously requested access rights. Determining whether an access request is redundant may include automatically evaluating the current access rights of the user and a requested change to those access rights specified in an access change request in order to determine whether the requested change to the access rights has already been fulfilled, e.g., whether a requested access right has already been provisioned or revoked. If so, the access request may be closed, denied, discarded, or otherwise ignored. Identification of unused permissions may include automatically determining which provisioned permissions a user does and does not utilize to access the resources 210 of the enterprise-wide computing system 200. Identification of data incompatibility among components may include determining whether resources 210 provide access reports with access information structured, arranged, and formatted that enables a review to complete access reviews based on the access report. Identification of data incompatibility may also include determining whether access requests structure, arrange, and format access request information that allows the requested access rights to be subsequently provisioned. If a reviewer cannot complete an access review due to the format of the access information in an access report, the access review may be added to a list of unactionable action items. Similarly, if access rights cannot be provisioned due to the format of the access request information in an access request, the access request may also be added to a list of unactionable action items. By identifying unactionable action items, administrators may ensure referential integrity among the components of the enterprise-wide computing system 200. Each of these QA checks will be discussed in further detail below.

Figure 6:
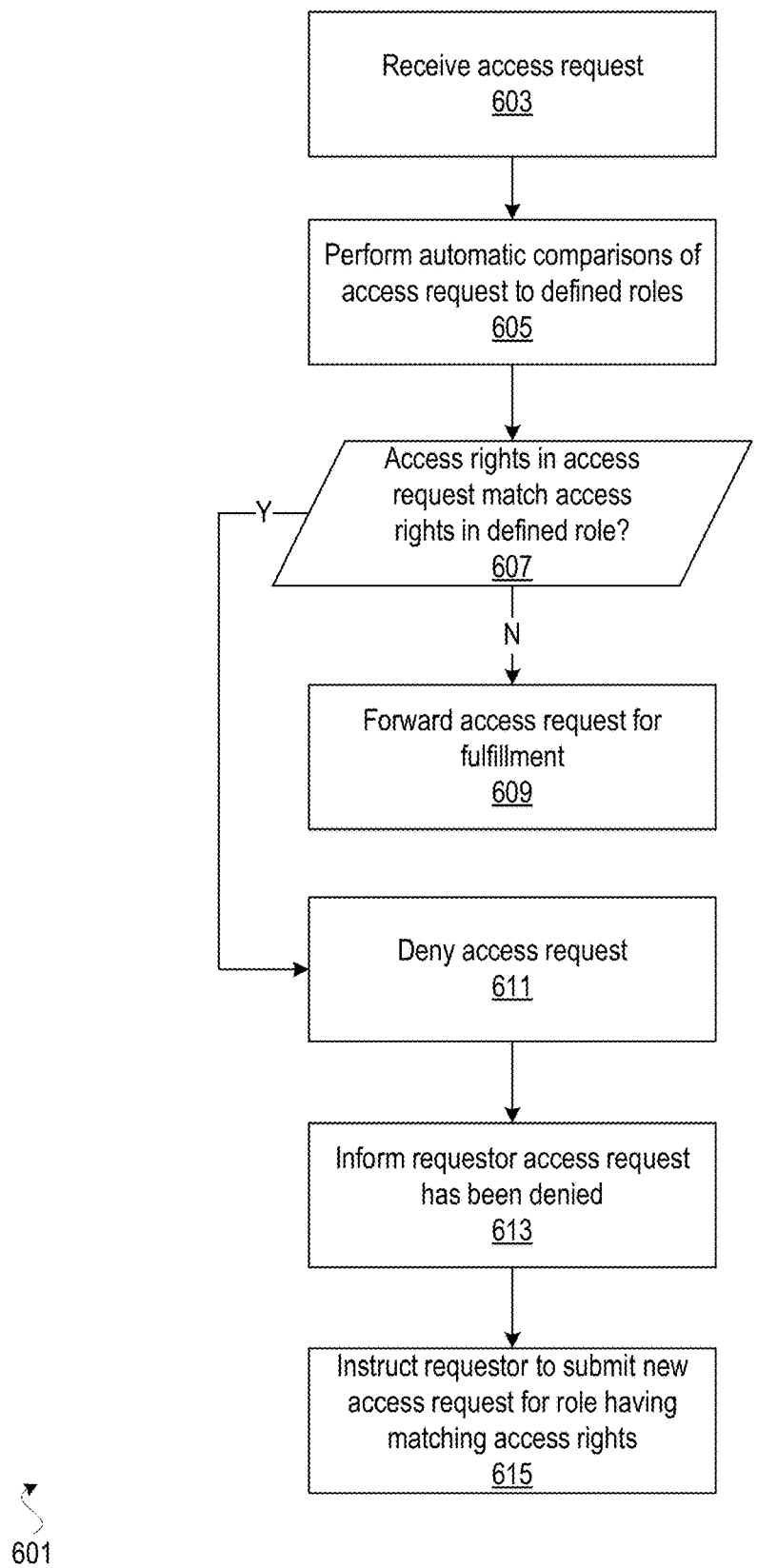
FIG. 6 is a flowchart of example method steps for identifying unused roles.

FIG. 6 is a flowchart 601 of example method steps for identifying unused roles. An access request may be submitted and received at the IAM review system 228 (block 603). The access request may specify a user and one or more access rights to provision for the user. Roles in the IAM system 220 may be associated with various types of access rights such as permissions for resources 210. The QA module 422 may thus automatically compare the access rights requested in the access request to the access rights associated with the roles defined in the IAM system 220 (block 605). The QA module 422 may obtain a list of defined roles from the IAM data store 222. The QA module 422 may then determine whether the access rights requested in the access request match the access rights of a defined role (block 607). As noted above, an access request may specify one or more permissions to provision for a specified user. Therefore an access request may match a defined role when each requested access right respectively matches an access right associated with the role, e.g., tasks and permissions. In other words, a set of requested access rights may match a set of access rights associated with a role when the set of requested access rights includes all of the access rights in the set of access rights associated with the role.

If the requested access rights do not match the access rights of any defined role (block 607:N), then the QA module 422 may forward the access request to the access request system (e.g., as an access request ticket) for fulfillment (block 609). If, however, the requested access rights do match the access rights of one of the defined roles (block 607:Y), then the QA module 422 may deny the access request (block 611), e.g., deny, discard, or otherwise ignore the access request. The QA module 422 may also inform the requestor that the access has been denied (block 613), e.g., via an email. The QA module 422 may also instruct the requestor to submit a new access request for the role identified as matching the access request (block 615). The QA module 422 may, for example, identify the matching role when informing the requestor that the access request was denied. By enforcing the use of roles to provision access requests, the QA module 422 of the IAM review system 228 may advantageously ensure an enterprise adheres to recommended identity and access management practices.

Figure 7:
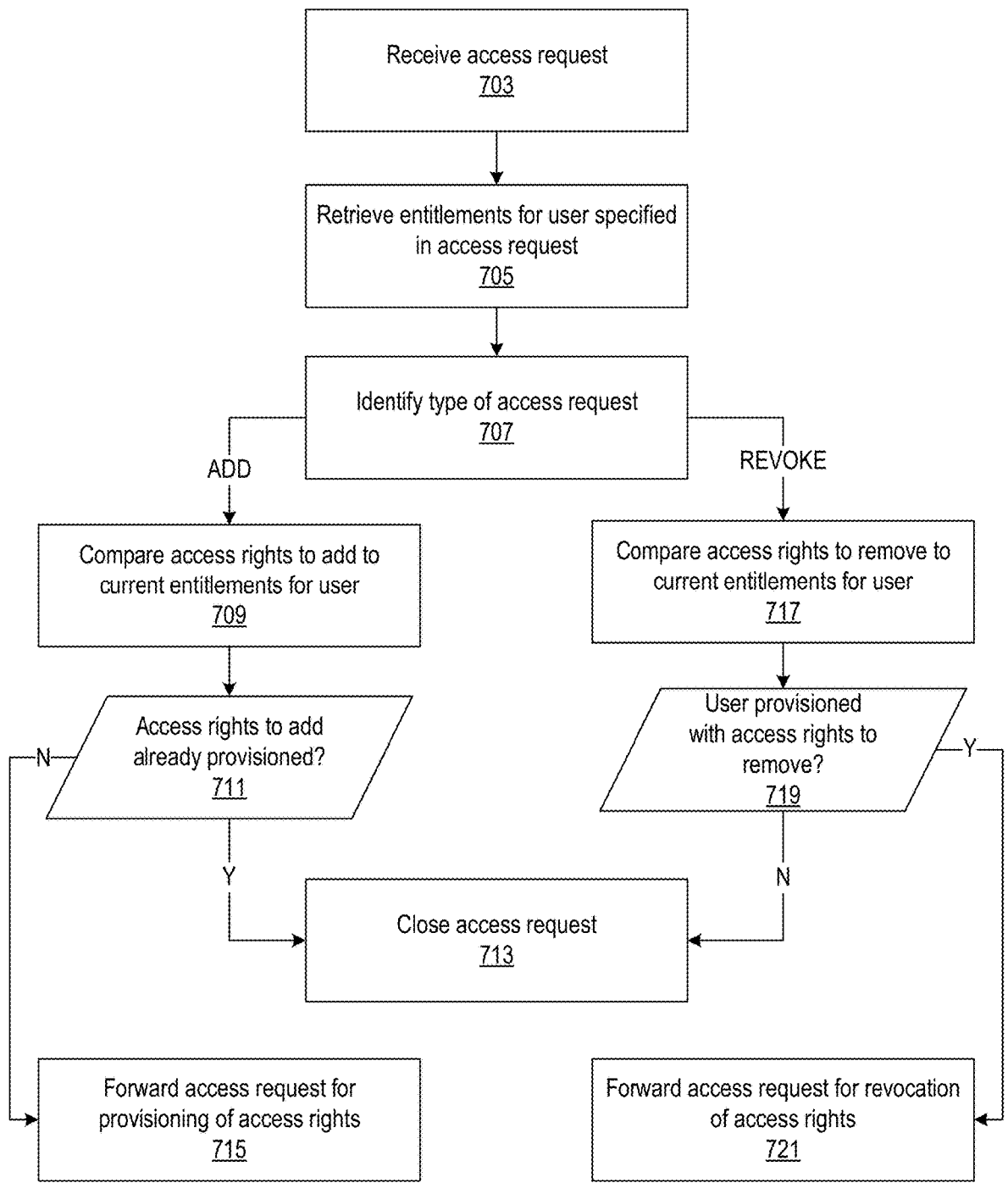
FIG. 7 is a flowchart of example method steps for identifying redundant access requests.

In FIG. 7 a flowchart 701 of example method steps for identifying redundant access requests is shown. An access request may specify access rights to add or revoke for a user. An access request may specify, for example, a role, task, or permission to add to or revoke from a user. An access request may be received at the IAM review system 228 (block 703). The access request may be an access change request as described above and may be submitted to the access request system 224. The IAM review system 228 may be configured to intercept access requests submitted to the access request system 224 in order to determine whether the access request is redundant. As described further below, the IAM review system 228 may provide the access request to the access request system 224 if the access request is not redundant. If the access request is redundant, however, the IAM review system 228 may not provide the access request to the access request system 224 and instead deny the access request. Upon receipt of an access request, the QA module 422 may retrieve the entitlements for the user specified in the access request (block 705). The QA module 422 may retrieve the user entitlements from the IAM data store 222. The QA module 422 may then determine the type of access request, i.e., whether to provision new access rights or whether to revoke existing access rights (block 707).

If the access request specifies access rights to add (block 707:ADD), then the QA module 422 may compare the access rights to add to the current entitlements for the user (block 709). If the access request specifies a permission to add, then the QA module 422 may determine whether a current entitlement for the user corresponds to the requested permission. If the access request specifies a task to add, then the QA module 422 may determine whether each permission associated with the task respectively corresponds to a current entitlement for the user. If the access request specifies a role to add, then the QA module 422 may determine whether each permission associated with the role, as well as each permission of any tasks associated with the role, respectively corresponds to a current entitlement for the user. If each permission to add has already been provisioned for the user (block 711:Y) then the QA module 422 may close access request (block 713), e.g., deny, discard, or otherwise ignore the access request. If at least one of the requested access rights has not been provisioned for the user (block 711:N), then the QA module 422 may forward the access request to the access request system 224 for provisioning of any access rights not already provisioned for the user (block 715).

If the access request specifies access rights to revoke (block 707:REVOKE), then the QA module 422 compare the access rights to revoke to the current entitlements for the user (block 717). If the access request specifies a permission to revoke, then the QA module 422 may determine whether the permission corresponds to one of the current entitlements of the user. If the access request specifies a task to revoke, the QA module 422 may determine whether the user is currently associated with the task and may determine whether any of the permissions associated with the task correspond to one of the current entitlements of the user. If the access request specifies a role, then the QA module 422 may determine whether the user is currently associated with the role and may determine whether any permissions associated with the role, as well as any permissions of the tasks associated with the role, correspond to a current entitlement of the user. If the user is not currently associated with the task or role and none of the current entitlements for the user correspond to the access rights to revoke (block 719:N), then the QA module 422 may close the access request (block 713), e.g., deny, discard, or otherwise ignore the access request. If the user is still currently associated with the task, still associated with the role, or at least one of the current entitlements of the user corresponds to an access rights to revoke (block 719:Y), then the QA module 422 may forward access request for revocation of any such access rights that have not yet been revoked (block 721).

By determining whether an access request is redundant, an enterprise may avoid situations where access requests are submitted and proceed all the way to the provisioning stage only to have an administrator determine that the access request has already been fulfilled, i.e., access rights to add have already been provisioned or access rights to remove have already been revoked. The QA module 422 thus advantageously helps an enterprise to avoid wasted efforts, to reduce the number of access requests sent for fulfillment, and to reduce the utilization of computing resources used to fulfill access requests.

Figure 8:
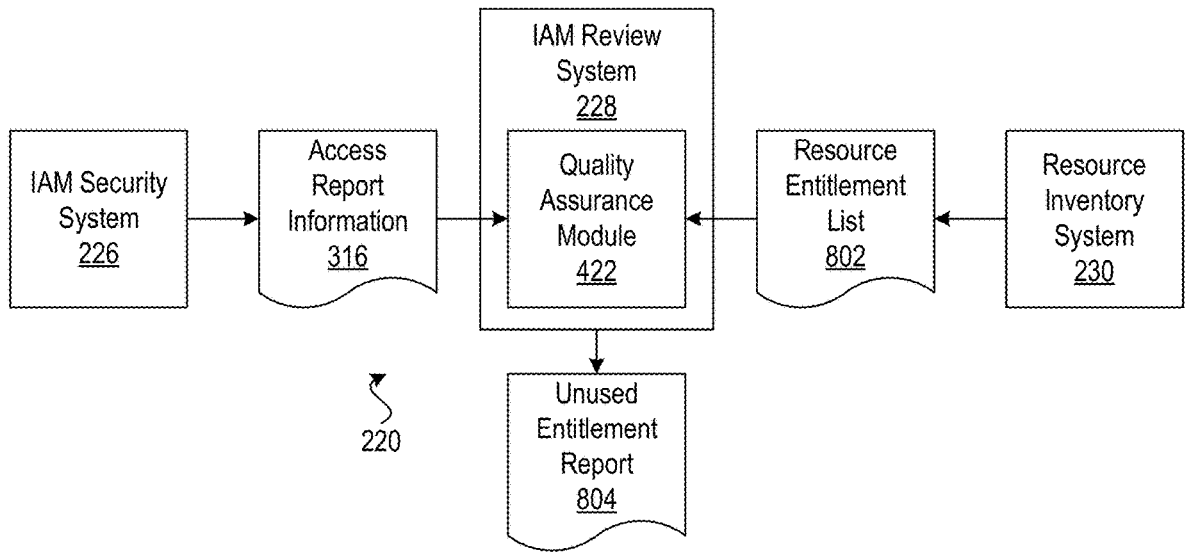
FIG. 8 is a block diagram illustrating an example workflow between components of an identity and access management system for identifying unused entitlements.
Figure 9:
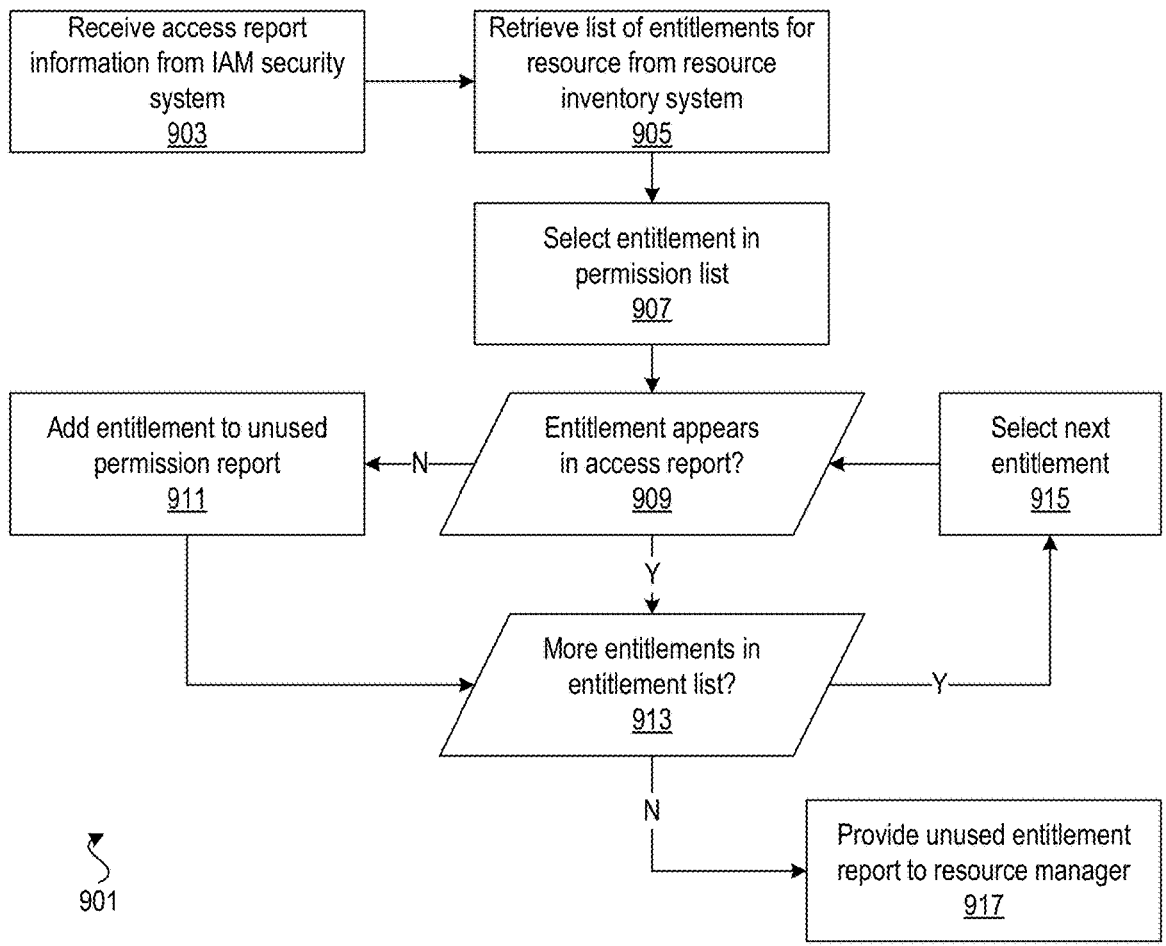
FIG. 9 is a flowchart of example method steps for identifying unused entitlements.

The QA module 422 of the IAM review system 228 may also be used to identify unused entitlements. If a user does not utilize an entitlement, then the entitlement may be removed as unnecessary for that user. In FIG. 8, an example workflow between components of the IAM review system 228 used to identify unused entitlements is shown. In FIG. 9 a flowchart 901 of example method steps for identifying unused entitlements is shown. A resource 210 may periodically provide an access report 312 (block 903). The access report 312 may include a list of entitlements used to access the resource 210 since previous access report. Resources may provide access reports to the IAM security system 226 that stores access report information 316 corresponding to the access reports 312. As noted above, an entitlement identifies a permission to access a particular resource provisioned for a user. The resource inventory system 230 may provide resource entitlement list 802 that identifies all of the entitlements associated with that resource 210 (block 905). The QA module 422 may obtain the access report information 316 from the IAM security system 226 and obtain the resource entitlement list 802 for that resource from the resource inventory system 230. The QA module 422 may then iterate over the resource entitlement list to compare the entitlements for the resource to the access report information 316. The QA module 422 may select an entitlement (block 907) and determine whether the selected entitlement appears in the access report information 316 (block 909). If the selected entitlement does not appear in the access report information 316 (block 907:N), then the QA module 422 may add the selected entitlement to an unused entitlement report 804 (block 911) and identify the selected entitlement as an unused entitlement (i.e., an unused access right) in the unused entitlement report 804. If the selected entitlement does appear in the access report information 316, then the QA module 422 may determine whether there are additional entitlements to evaluate and, if so (block 913:Y), select the next entitlement in the resource entitlement list 802 for evaluation (block 915). Once all entitlements in the resource entitlement list 802 have been evaluated (block 913:N), the QA module 422 may provide the unused entitlement report 804 to the manager of the resource (block 915). In some example implementations, the QA module 422 may be configured to identify the selected entitlement as a used entitlement (i.e., a used access right) in an entitlement report.

The resource manager may then investigate why the user having the entitlement has not utilized the entitlement to access the resource. If the resource manager determines the user does not need the entitlement to carry out assigned roles or tasks, then the resource manager may submit an access request to remove the entitlement from the user. The example steps shown in FIG. 9 may be repeated periodically or on-demand for other resources of the enterprise-wide computing system 200. In this way, the QA module 422 of the IAM review system 228 ensures that users only have those entitlements needed to access carry out assigned roles or tasks.

As an example, a resource may be associated with fifty entitlements used to access that resource. The access report provided by the resource may only indicate that users only utilized forty of those entitlements access the resource. During evaluation of the entitlements associated with the resource, the QA module 422 may identify the ten unused entitlements based on the comparison of the access report to the resource entitlement list received from the resource inventory. The QA module 422 may thus add the ten unused entitlements to the unused entitlement report 804 and provide the unused entitlement report to the manager of the resource. The resource manager may then submit respective access requests to remove those ten unused entitlements.

An access report 312 may also identify permissions for the resource, roles assigned to users that access the resource, and tasks that involve accessing the resource. The QA module 422 may thus also obtain a resource permission list, resource role list, or a resource task list from the resource inventory system 230 for comparison to the access report information 316. A resource permission list may identify all permissions for a resource. The resource role list may identify roles that are associated with the resource, e.g., roles that are configured to have access to the resource. A resource task list may identify tasks that are associated with the resource, e.g., task that involve accessing the resource. The QA module 422 may perform steps similar to those shown in FIG. 9 to compare a resource permission list, a resource role list, or a resource task list to an access report provided by the resource. The QA module 422 may thus also generate an unused permission report, an unused role report, and an unused task report each of which may be similar to the unused entitlement report 804 shown in FIG. 8. The QA module 422 may add a permission to the unused permission list if the access report does not indicate the permission was used to access the resource. The QA module 422 may add a role associated with resource to the unused role list if the access report does not identify any users assigned that role. The QA module 422 may also add a task associated with the resource to the unused task list if the access report does not indicate the resource was accessed during execution of the task. The QA module 422 may provide the unused permission list, unused resource list, or unused task list to the resource manager. The resource manager may then update the resource to remove any unused permissions, may update an unused role to remove association with resource, or may update an unused tasks to remove association with the resource.

With respect to referential integrity, access rights are the focus of three different activities of identity and access management: i) submitting access requests to add or revoke access rights, e.g., utilizing the access request system 224; ii) reporting what access rights were used to actually access a resource, e.g., providing resource access reports; and iii) reviewing access rights that have been provisioned for users, e.g., utilizing the IAM review system. Ideally the access request system 224, the resources 210 of the enterprise-wide computing system 200, and the IAM review system 228 format and arrange access right information in the same way such that access requests, access reports, and access reviews all have the same level of actionable granularity. In other words, there is ideally a relatively high level of referential integrity among the components such that access rights may be requested on the same actionable level with which they are reported and with which they are reviewed.

In practice, however, the components of the enterprise-wide computing system 200 might not format and arrange access right information in the same way. For example, the manner in which a resource 210 formats an access report identifying the entitlements used to access the resource may differ from the manner in which access rights are provisioned or revoked for users. Access rights might be named differently, grouped differently, or the number of access rights may differ between components. As an example, an access request may request that a single task be add to a user. The requested task, however, may have been originally created as part of a role and thus cannot be individually add to the user. As a result, the access request, in this example, may be unactionable and remain unfulfilled due to the mismatch between the task requested and the access rights that are available to be provisioned.

Figure 10:
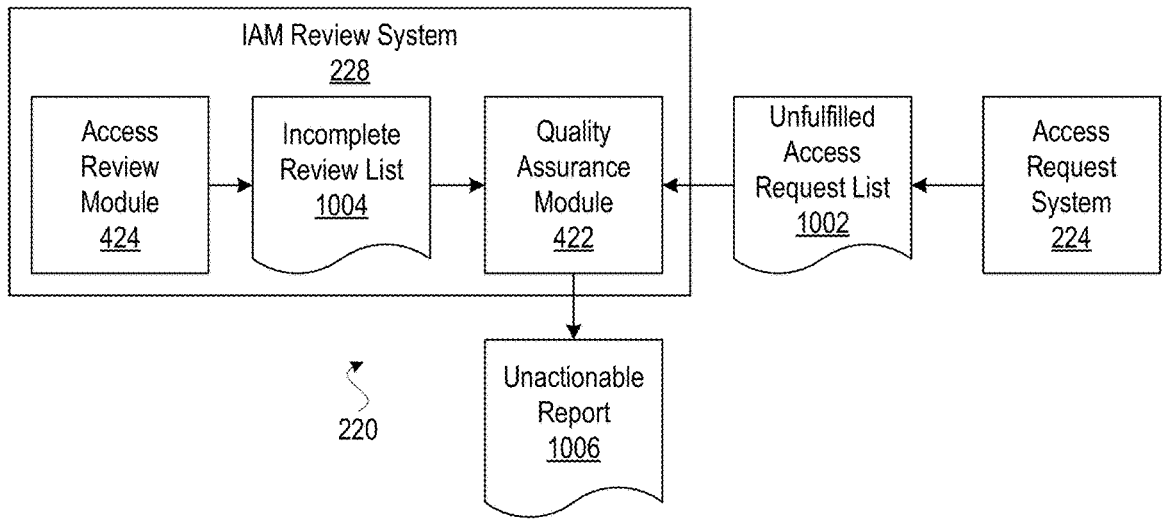
FIG. 10 is a block diagram illustrating an example workflow between components of an identity and access management system for identifying unactionable action items.
Figure 11:
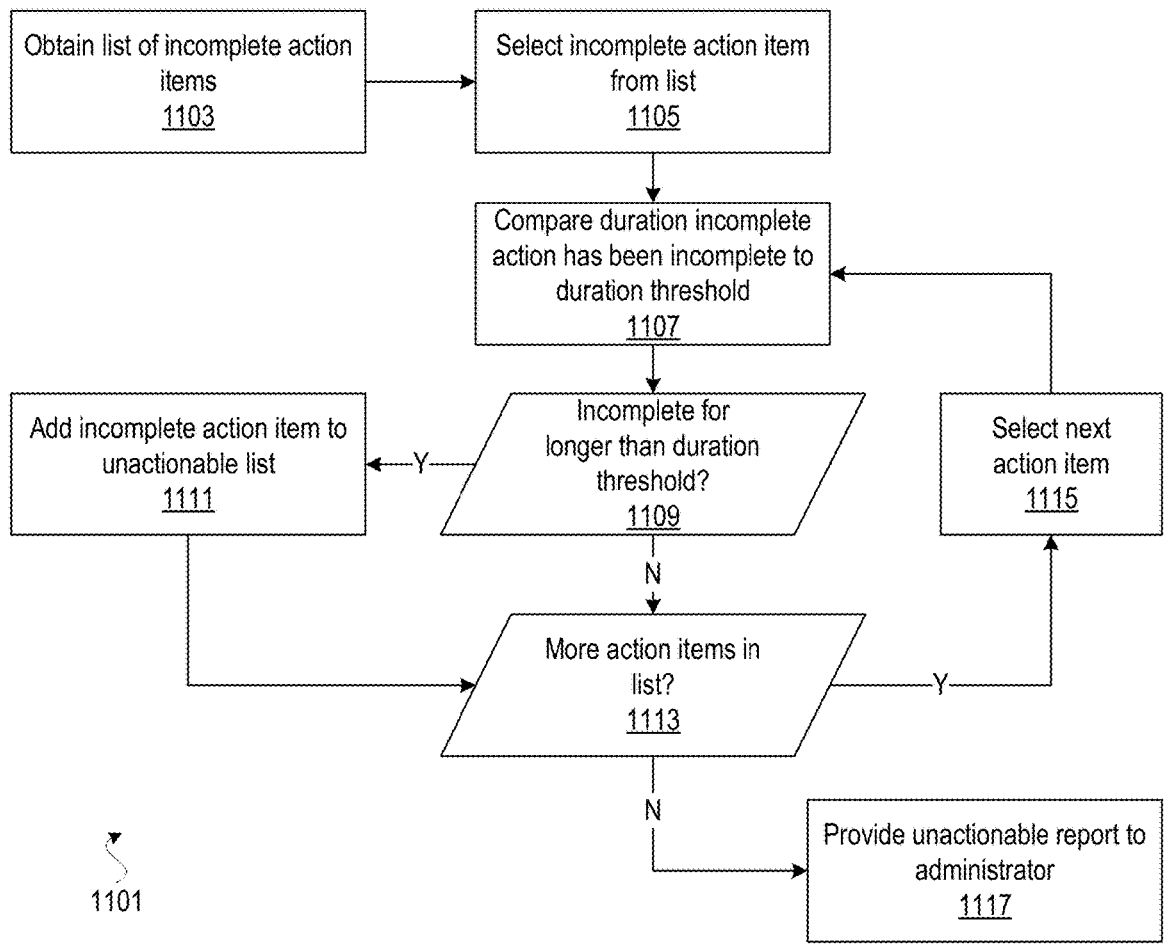
FIG. 11 is a flowchart of example method steps for identifying unactionable action items.

In FIG. 10 an example workflow between components of the IAM review system 228 used to identify unactionable action items is shown. In FIG. 11 a flowchart 1101 of example method steps for identifying unactionable action items is shown. The QA module 422 may be configured to perform a QA check that identifies unactionable action items. As noted above, action items may include access requests that have not been fulfilled (i.e., unfulfilled access requests) and access reviews that have not been completed (i.e., incomplete access reviews).

The QA module 422 may obtain a list of action items that have not yet been completed (block 1103). The access request system 224, for example, may provide list of access requests that have remained unfulfilled, i.e., an unfulfilled access request list 1002. The access review module 424 may also provide a list of access reviews that have not been completed as of their specified due date, i.e., an incomplete review list 1004. The QA module 422 may iterate over the list 1002 or 1004 of unactionable action items and determine how long the action items have been pending, in other words, calculate a duration an incomplete action item has remained incomplete. For example, the QA module 422 may select an incomplete action item from the list (block 1105) and compare the duration the incomplete action item has remained incomplete to a predetermined duration threshold (block 1107). The duration threshold may depend on the action item type. The predetermined duration threshold for an access request may be, e.g., three days from the date the access request was submitted. The duration threshold for an access review may be, e.g., seven days from the due date of the access review. Alternative duration thresholds may be selectively employed.

If an action item has remained incomplete for longer than the predetermined duration threshold (block 1109:Y), then the QA module 422 may add the action item to an unactionable report 1006 (block 1111) and identify that action item as an unactionable action item in the report. If the action item has not yet been incomplete for longer than the predetermined duration threshold (block 1109:N), then the QA module 422 may determine whether there are more incomplete action items in the list 1002 or 1004 to evaluate (block 1113). If so (block 1113:Y), then the QA module 422 may select the next incomplete action item in the list 1002 or 1004 (block 1115) and compare the duration the next selected action item has remained incomplete to the predetermined duration threshold. Once the QA module 422 has evaluated each incomplete action item in the list 1002 or 1004, the QA module may provide the unactionable report 1006 to administrator (block 1117). The administrator may thus advantageously investigate why action items have not been completed. If action items have not been completed to due to incompatibility issues, then the administrator may initiate efforts to make improve the referential integrity between the system components associated with the incomplete action item as described above.

4. Reconciliation

As mentioned above, the IAM review system 228 may be utilized for reconciliation of access rights. Access right reconciliation may include a systematic analysis of the access rights that have been provisioned for a user in order to determine whether the user has been provisioned with all access rights the user is entitled to and has not been provisioned with access rights the user is not entitled to. Access right reconciliation may also include a systematic analysis of access rights that have been provisioned for a user in order to determine whether the user received such access rights through appropriate channels. An appropriate channel, in this example, may be the access request system 224 (FIG. 2) in which an entitlement can be traced back to an approved access request.

The reconciliation module 428 of the IAM review system 228 (FIG. 4) may be configured to perform various types of reconciliation tasks with respect to access rights in an enterprise-wide computing system. Examples of various types of access right reconciliation tasks include: expectation reconciliation, termination reconciliation, authorization reconciliation, and deviation reconciliation. Each of these types of reconciliation will be discussed in further detail below.

In general, the reconciliation module may generate one or more reports that list or otherwise identify entitlements that should be provisioned or revoked for one or more users. It will be appreciated that, although each type of reconciliation is described independently, one or more of the different types of reconciliation efforts described below may be performed simultaneously or sequentially with the results appearing in a single reconciliation report. In such an example implementation, the reconciliation report may be divided into several sections where each section presents the reconciliation results for a different type of access right reconciliation. In other example implementations, the reconciliation module may provide multiple reconciliation reports where each report presents the reconciliation results for a different type of access right reconciliation.

Expectation reconciliation refers to ensuring that the actual access rights reported for a user are consistent with the expected access rights for that user. During expectation reconciliation the reconciliation module 428 may compare a set of reported entitlements to a set of expected entitlements. The reconciliation module 428 may flag expected entitlements that are not being reported and may also flag reported entitlements that are not expected. Stated differently, expectation reconciliation involves comparing the entitlements a user is reported to have with the entitlements that user is expected to have.

Figure 12:
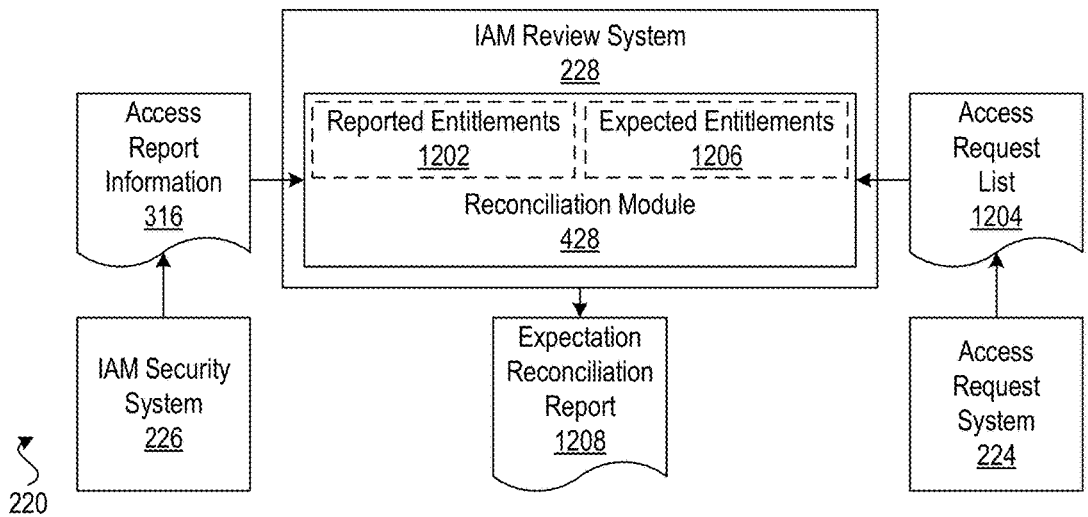
FIG. 12 is a block diagram illustrating an example workflow between components of an identity and access management system for conducting expectation reconciliation.
Figure 13:
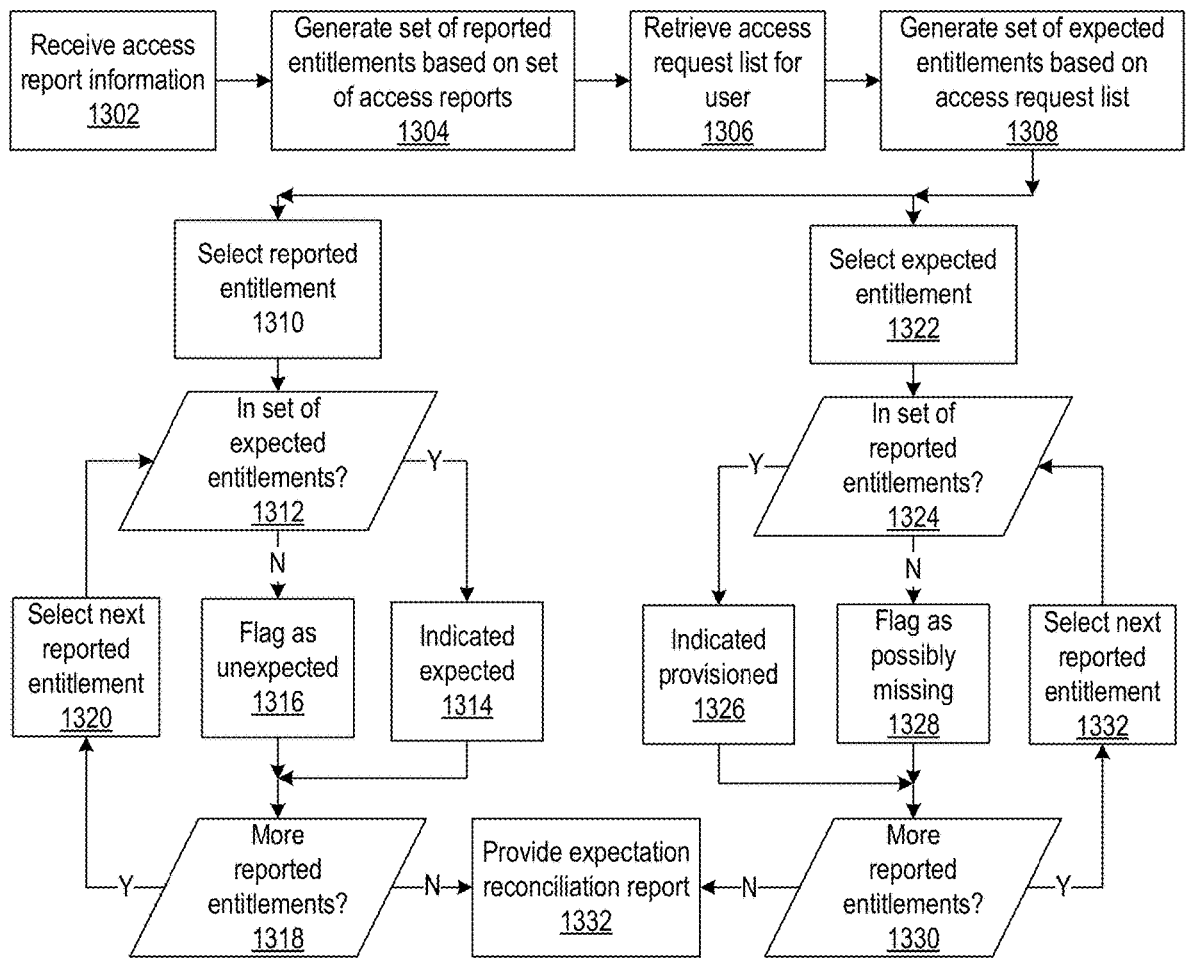
FIG. 13 is a flowchart of example method steps for performing expectation reconciliation.

FIG. 12 illustrates an example workflow between the components of the IAM review system 228 for conducting expectation reconciliation. FIG. 13 is a flowchart 1300 of example method steps for performing expectation reconciliation. The reconciliation module 428 of the IAM review system 228 may receive access report information 316 from the IAM security system 226 (block 1302). The access report information 316 may correspond to multiple access reports 312 respectively received from resources 210 of the enterprise-wide computing resources. As noted above, the access report information 316 may respectively identify the entitlements used to access the resources 210. Based on the access report information 316, the reconciliation module 428 may generate a set of reported entitlements 1202 for a particular user (block 1304). The set of reported entitlements 1202 may include entitlements a user used to access the various resources 210 of the enterprise-wide computing system 200. The reconciliation module 428 may also receive an access request list 1204 for that user from the access request system 224 (block 1306). The access request list 1204 may be a list of access requests that requested provisioning of access rights for user. The access rights identified in an access request list may be referred to a requested access rights. Based on the access request list 1204, the reconciliation module 428 may also generate a set of expected entitlements 1206 for the user (block 1308). The set of expected entitlements 1206 may exclude access rights that were provisioned but subsequently revoked. The reconciliation module 428 may then compare the set of reported entitlements 1202 to the set of expected entitlements 1206. Based on the comparison, the reconciliation module 428 may generate an expectation reconciliation report 1208. The expectation reconciliation report 1208 may identify a reported access right as either an expected access right or an unexpected access right as shown below. The expectation reconciliation report 1208 may also identify a requested access right as either a provisioned access right or a non-provisioned access right as also shown below.

As seen in FIG. 13, the reconciliation module 428 may identify unexpected entitlements and potentially missing entitlements in parallel simultaneously or sequentially. For convenience, however, these two aspects of the expectation reconciliation process will be described below as performed sequentially. With respect to reported entitlements, the reconciliation module 428 may select a reported entitlement 1202 (block 1310) and determine whether the selected reported entitlement appears in set of expected entitlements 1206 (block 1312). If the selected reported entitlement 1202 appears in the set of expected entitlements 1206 (block 1312:Y), then the reconciliation module 428 may indicate in the expectation reconciliation report 1208 that the reported entitlement is expected (block 1314), i.e., identify the reported entitlement as an expected entitlement. If, however, the reported entitlement 1202 does not appear in the set of expected entitlements 1206 (block 1312:N), then the reconciliation module 428 may flag the reported entitlement as unexpected in the expectation reconciliation report 1208 (block 1316), i.e., identify the reported entitlement as an unexpected entitlement. The reconciliation module 428 may then determine whether there are more reported entitlements 1202 to evaluate and, if so (block 1318:Y), select the next reported entitlement (block 1320) to determine whether the next selected reported entitlement appears in the set of expected entitlements 1206. The reconciliation module 428 may repeat the process for each reported entitlement 1202 in the set of reported entitlements.

With respect to expected entitlements, the reconciliation module 428 may select an expected entitlement 1206 (block 1322) and determine whether the selected expected entitlement appears in set of reported entitlements 1202 (block 1324). If the selected expected entitlement does appear in set of reported entitlements 1202 (block 1324:Y), then the reconciliation report may indicate that the selected expected entitlement has been provisioned in the expectation reconciliation report 1208 (block 1326), i.e., identify the requested entitlement as a provisioned access right. If, however, the selected expected entitlement 1206 does not appear in the set of reported entitlements 1202, then the reconciliation module 428 may flag the selected expected entitlement as potentially missing in the expectation reconciliation report 1208 (block 1328), i.e., identify the requested access right as a non-provisioned access right. The reconciliation module 428 may then determine whether there are more expected entitlements 1206 to evaluate and, if so (block 1330:Y), select the next reported entitlement (block 1332) to determine whether the next selected expected entitlement appears in the set of reported entitlements 1202. The reconciliation module 428 may repeat the process for each expected entitlement 1206 in the set of expected entitlements. An expected entitlement may not appear in the set of reported entitlements 1202 if, for example, the access rights corresponding to the entitlement have not been provisioned for the user or if the user has not utilized the entitlement to access the resource associated with the entitlement to access resource; if not used to access resource, then may be unnecessary and thus revoked.

Once the reconciliation module 428 has evaluated each reported entitlement 1202 in the set of reported entitlements (block 1318:N) and evaluated each expected entitlement 1206 in the set of expected entitlements (block 1330:N), the reconciliation module 428 may provide the expectation reconciliation report 1208 (block 1332), e.g., to an administrator. The administrator may then advantageously investigate any unexpected or unused entitlements associated with the user. If an entitlement is unexpected or unused, then the administrator may submit respective access requests to revoke any unexpected or unused entitlements.

The expectation reconciliation report 1208 may indicate that a reported entitlement 1202 is expected or that an expected entitlement 1206 is provisioned by indicating the entitlement is, e.g., "valid" or "confirmed" in the expectation reconciliation report. In some example implementations, the expectation reconciliation report 1208 may include reported and expected entitlements that have been confirmed as well as unexpected and unused entitlements. In other example implementations, the expectation reconciliation report 1208 may only include unexpected and unused entitlements.

The expectation reconciliation process may be repeated for multiple users. In some example implementations, the expectation reconciliation report 1208 may include expectation reconciliation results for a single user. In other example implementations, the expectation reconciliation report 1208 may include expectation reconciliation results for multiple users. Expectation reconciliation advantageously allows administrators to identify breakdowns in the process of fulfilling access requests, e.g., determining whether a resource is correctly reporting an entitlement flagged as unused, determining whether the access request is an actionable access request (i.e., requests access rights in a manner such that access rights can be provisioned), and determining whether an access request was closed without provisioning the requested access rights and, if so, why.

Termination reconciliation refers to ensuring that access rights for a user have all been revoked upon termination of that user. The set of access rights may be all access rights provisioned for a user or a subset of all access rights provisioned for the user. Termination reconciliation may also be performed to purge entitlements for a user that has been placed on leave-of-absence or otherwise identified as inactive within the enterprise. In this way, the enterprise may advantageously ensure that user does not inherit previously provisioned access rights if the user is reactivated within the enterprise.

Figure 14:
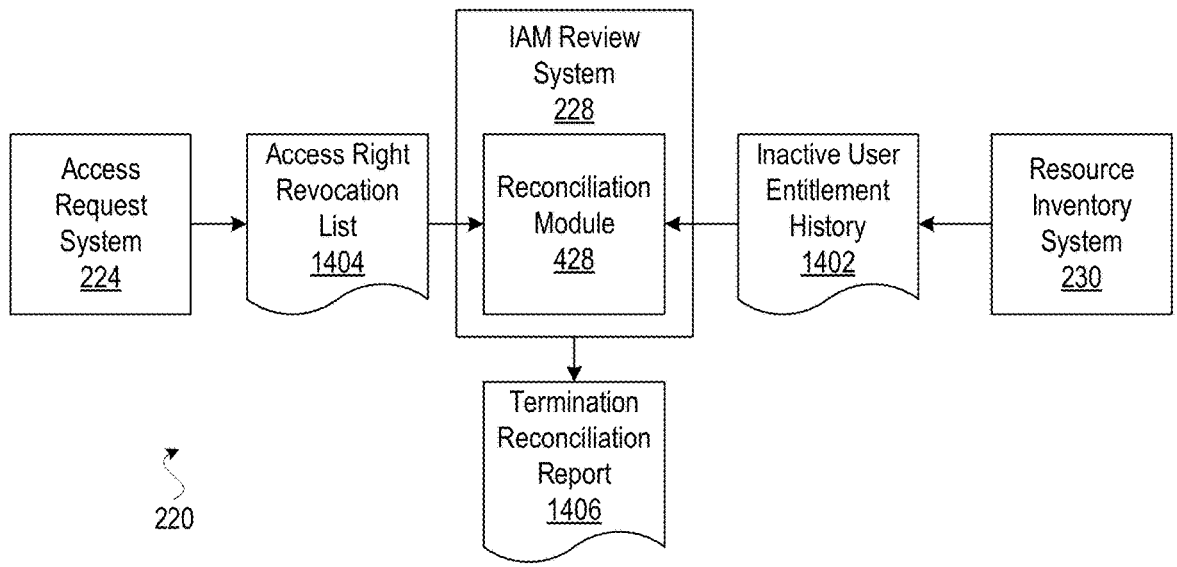
FIG. 14 is a block diagram illustrating an example workflow between components of an identity and access management system for conducting termination reconciliation.
Figure 15:
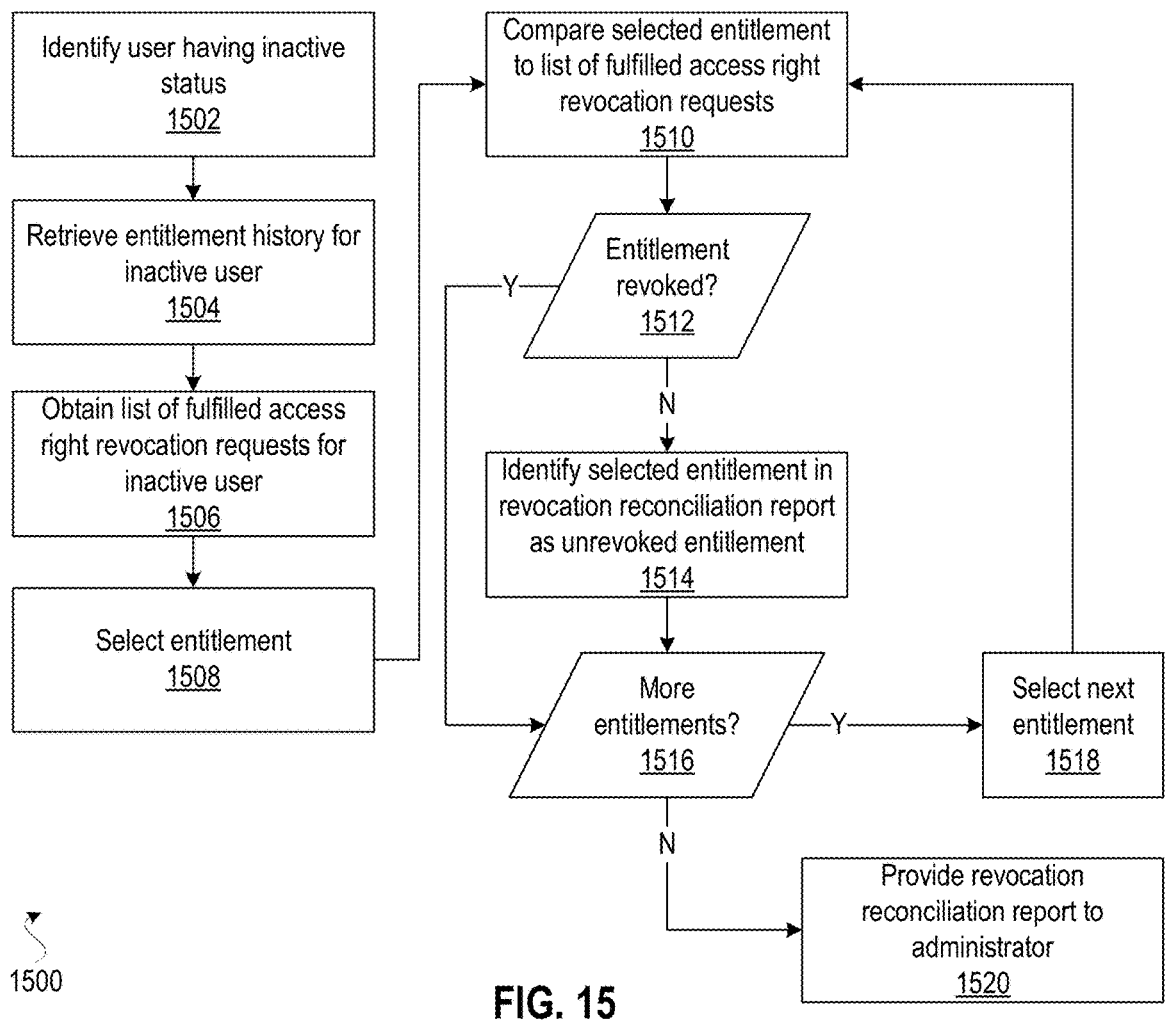
FIG. 15 is a flowchart of example method steps for performing expectation reconciliation.

FIG. 14 illustrates an example workflow between the components of the IAM review system 228 for conducting termination reconciliation. In FIG. 15, a flowchart 1500 of example method steps for performing termination reconciliation is shown. The reconciliation module 428 helps to ensure that a set or subset of access rights associated with an inactive user have been revoked. The reconciliation module 428 may determine whether access rights for an inactive user have been revoked by comparing an entitlement history 1402 for the inactive user to a list of access rights that have been revoked for the user, i.e., an access right revocation list 1404. The access rights revocation list 1404 may identify fulfilled access revocation requests. If the reconciliation module 428 cannot match an entitlement for the inactive user to a corresponding access request requesting revocation of access, then the reconciliation module may include the entitlement in termination reconciliation report 1406. The reconciliation module 428 may perform termination reconciliation periodically (e.g., daily, weekly, monthly, and do forth).

As seen in FIG. 15, the reconciliation module 428 may identify a user having an inactive status (block 1502) and retrieve an entitlement history 1402 for the inactive user (block 1504). The reconciliation module 428 may then obtain list of fulfilled access requests that requested revocation of access rights for the inactive user (block 1506). The reconciliation module 428 may then iterate over the entitlement history 1402 by selecting an entitlement (block 1508) and determining whether the access right revocation list 1404 includes a corresponding request to revoke the access rights associated with the selected entitlement (block 1510). If the access right revocation list 1404 does not include a corresponding access right revocation request (block 1512:N), then the reconciliation module 428 may add the selected entitlement to the termination reconciliation report 1406 (block 1514) to indicate that the selected access right has not yet been revoked, i.e., identify the selected right as an unsuccessfully revoked access right. If the access right revocation list 1404 does include a corresponding access right revocation request (block 1512:Y), then the reconciliation module 428 may not add the entitlement to the termination reconciliation report 1406 as the access rights associated with the selected entitlement have already been revoked. In some example implementations, the reconciliation module 428 may add the entitlement to the termination reconciliation report 1406 and identify the access right as a successfully revoked access right. If there are more entitlements in the user entitlement history 1402 to evaluate (block 1516:Y), the reconciliation module 428 may select the next entitlement for evaluation (block 1518). Once each entitlement in the inactive user entitlement history 1402 has been evaluated (block 1516:N), the reconciliation module 428 may provide the termination reconciliation report 1406 to an administrator (block 1520). The administrator may then advantageously investigate why entitlements were not revoked, and request revocation of any entitlements that have not yet been revoked. The reconciliation module 428 may repeat the example steps to perform termination revocation shown for additional users.

Figure 16:
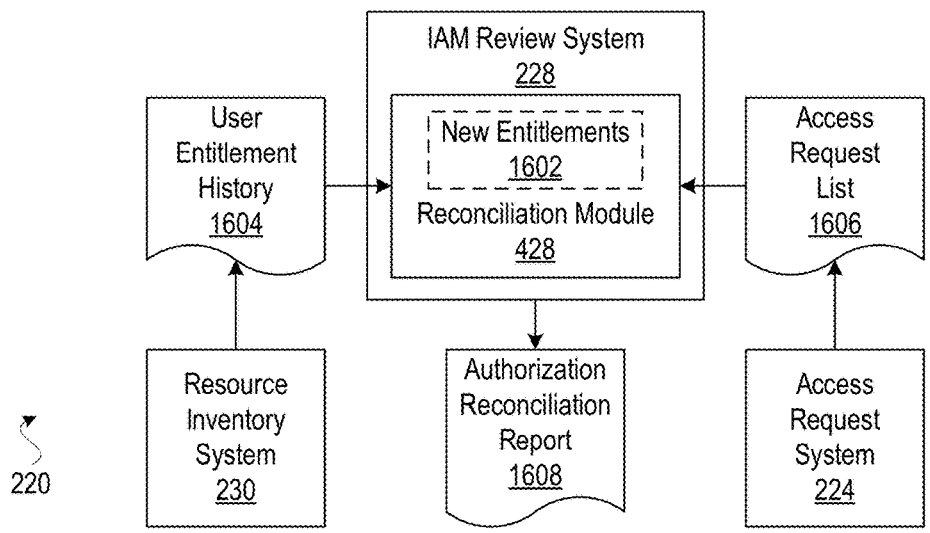
FIG. 16 is a block diagram illustrating an example workflow between components of an identity and access management system for conducting authorization reconciliation.
Figure 17:
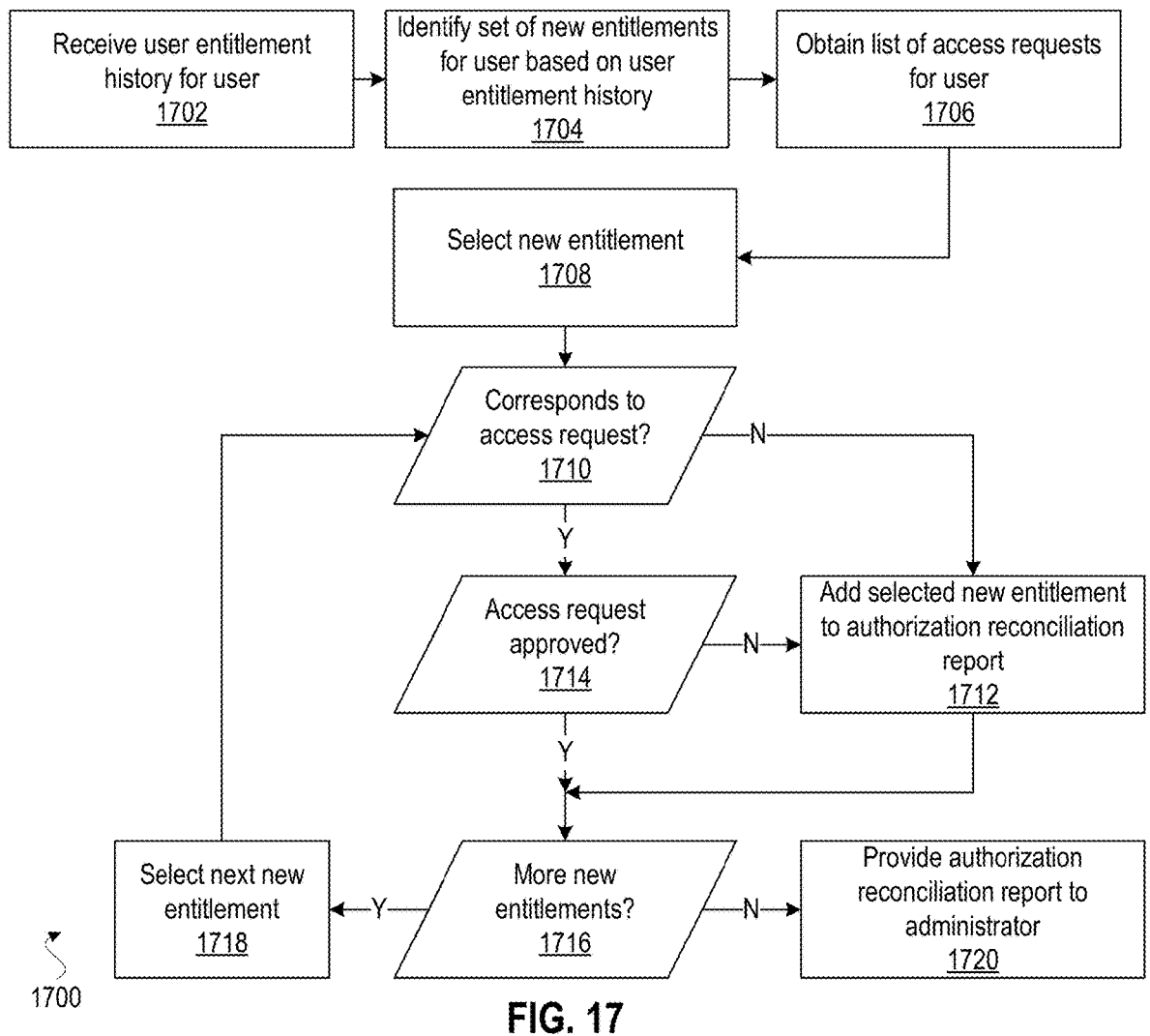
FIG. 17 is a flowchart of example method steps for performing authorization reconciliation.

Authorization reconciliation refers to ensuring that all of the access rights currently provisioned for a user can be traced to an approved access request. FIG. 16 illustrates an example workflow between the components of the IAM review system 228 for conducting authorization reconciliation. In FIG. 17, a flowchart 1700 of example method steps for performing authorization reconciliation is shown. For authorization reconciliation, the reconciliation module 428 of the IAM review system 228 may determine whether currently provisioned access rights for a user can be traced to approved access requests. The reconciliation module 428 may perform authorization reconciliation on a periodic basis (e.g., daily). During authorization reconciliation, the reconciliation module 428 may compare the entitlements for a user during a previous reporting period to the entitlements for the user during the current reporting period. Based on the comparison, the reconciliation module 428 may identify new access rights provisioned for the user since previous reporting period. The reconciliation module 428 may then compile a set of new entitlements 1602 provisioned since the previous reporting period.

The reconciliation module 428 may receive a user entitlement history 1604 from the resource inventory system 230 (block 1702) and evaluate the user entitlement history to identify the set of new entitlements 1602 (block 1704). As noted above the user entitlement history 1604 may be a type of access rights history that identifies a set of provisioned access rights associated with that user. The reconciliation module 428 may also receive a list of access requests 1606 associated with the user from the access request system 224 (block 1706). The list of access requests 1606 may include an access right grant list that identifies a set of approved access grant requests for the user. The reconciliation module 428 may iterate over the list of new entitlements 1602 by selecting one of the new entitlements (block 1708) and determining whether the selected new entitlement corresponds to an access request for the user (block 1710). If the selected new entitlement does not correspond to an access request (block 1710:N), then the reconciliation module 428 may add the selected new entitlement to the authorization reconciliation report 1608 (block 1712). The reconciliation module 428 may identify the selected new entitlement as an unapproved access right in the reconciliation report 1608. If the selected new entitlement does correspond to an access request (block 1710:Y), then the reconciliation module 428 may determine whether the corresponding access request was approved (block 1714). If the corresponding access request was not approved (block 1714:N), then the reconciliation module 428 may add the selected new entitlement to the authorization reconciliation report 1608 (block 1712). If the access request was not approved, then the reconciliation module 428 may similarly identify the selected new entitlement as an unapproved access right in the reconciliation report 1608. If the corresponding access request was approved (block 1714:Y), then the reconciliation module 428 may identify the selected new entitlement as an approved access right in the reconciliation report 1608. The reconciliation module 428 may then determine whether there are any more new entitlements to evaluate and, if so (block 1716:Y), select the next new entitlement for evaluation (block 1718). Once all new entitlements have been evaluated (block 1716:N), the reconciliation module 428 may provide the authorization reconciliation report 1608 to an administrator (block 1720). The administrator may then advantageously request revocation of the access rights listed in the authorization reconciliation report 1608 that cannot be traced to an approved access request. The reconciliation module 428 may repeat the example steps shown in FIG. 17 for additional users.

Deviation reconciliation refers to identifying IAM information associated with a user having attributes that deviate from the attributes of users typically associated with such IAM information. The IAM information associated with a user may include various types of access rights, for example, a role assigned to a user or a resource accessed by a user. Accordingly deviation reconciliation may include determining whether one or more attributes for a user that is assigned a particular role are generally consistent with one or more corresponding attributes of users assigned that role. Stated more generally, deviation reconciliation may include determining whether a user associated with an access right has one or more attributes that deviate from corresponding attributes of other users that are also associated with that access right. Deviation reconciliation may also include determining whether one or more attributes for a user that accessed a particular resource are generally consistent with one or more corresponding attributes of users that accessed that resource. One attribute or various combinations of attributes may be utilized to compare users. The attributes may be any user metadata for the users. Example attributes may thus include: job code, job title, geographic location, line-of-business, business division, and other types of IAM information associated with users.

As an example, deviation reconciliation may flag a user that is assigned a "bank teller" role where the user has a "bank manager" job code. Deviation reconciliation may determine that the "bank teller" role is typically assigned to users having a "bank teller" job code. In this example, deviation reconciliation has utilized the job code attribute to identify the deviation between the user assigned the "bank teller" role and the set of users typically assigned the "bank teller" role. As another example, deviation reconciliation may flag a user geographically located in California that has accessed a resource 210 that is typically accessed by users geographically located in Texas. In this other example, deviation reconciliation has utilized the user geographic location attribute to identify the deviation between the user that accessed the resource and the typical users that access the resource. User having attributes that deviate from the attributes of typically users that are assigned a particular role or that access a particular resource may be referred to as "outliers."

Figure 18:
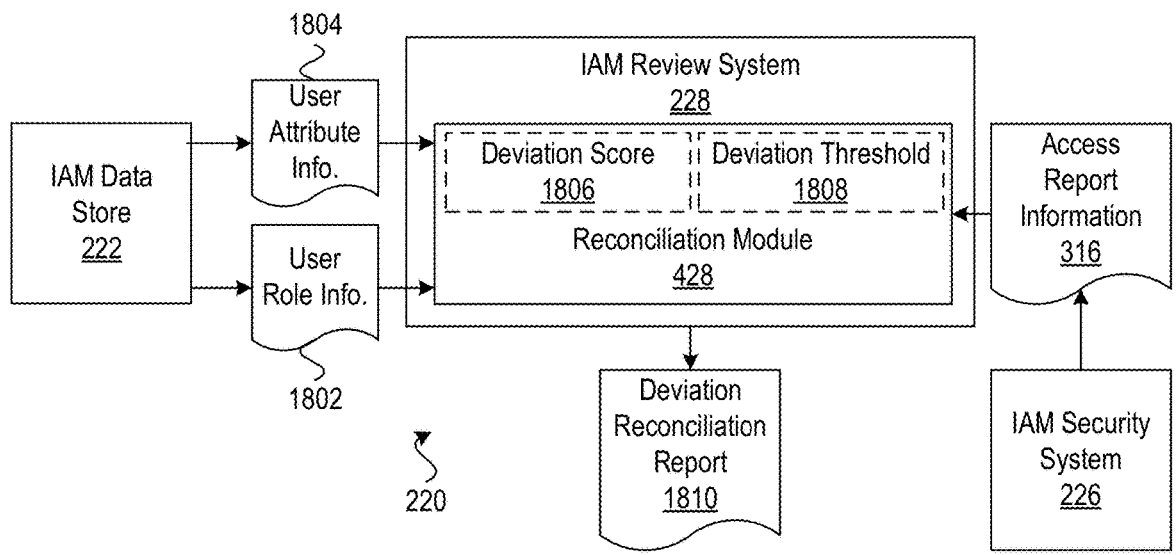
FIG. 18 is a block diagram illustrating an example workflow between components of an identity and access management system for conducting deviation reconciliation.
Figure 19:
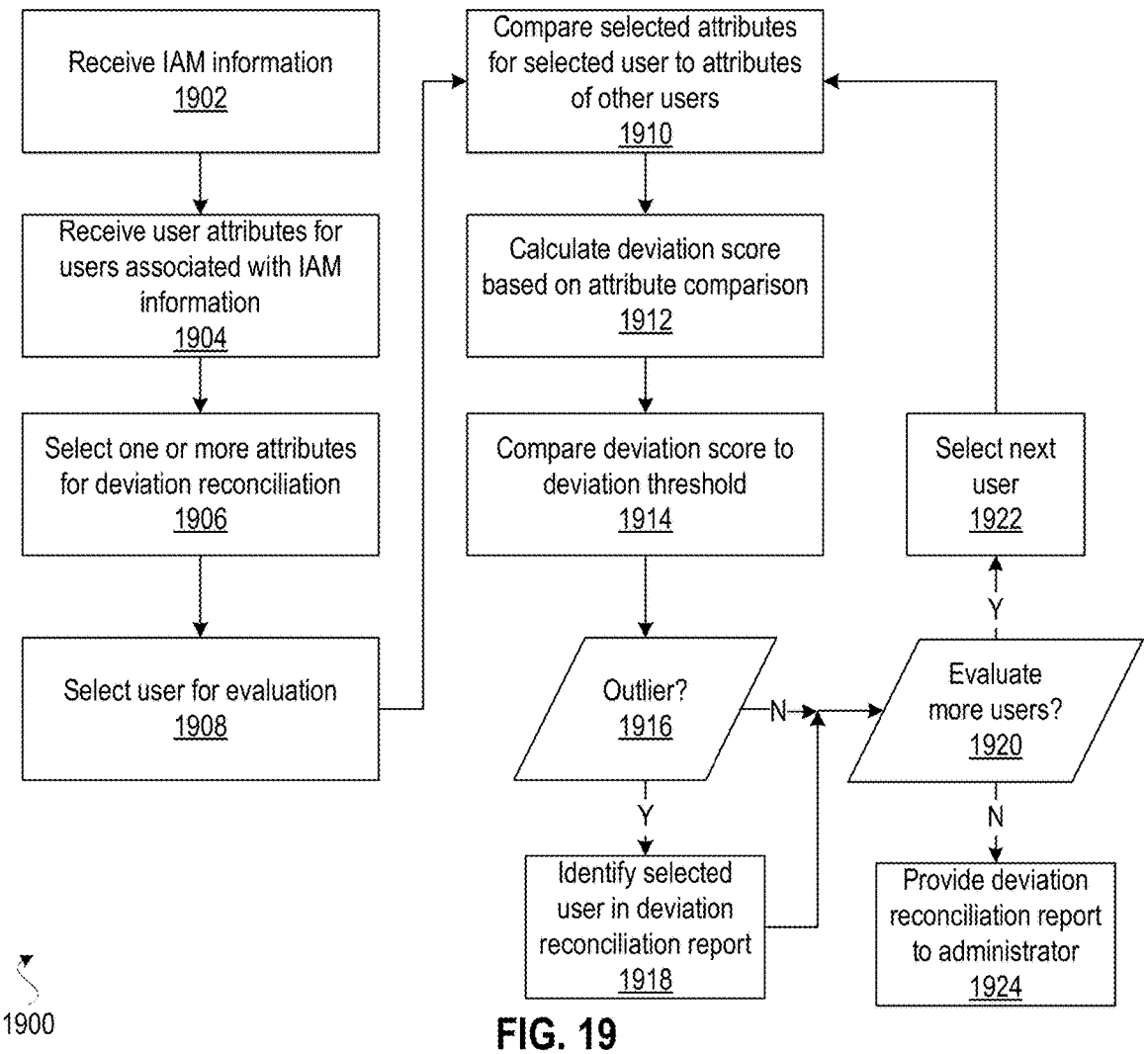
FIG. 19 is a flowchart of example method steps for performing deviation reconciliation.

FIG. 18 illustrates an example workflow between components of the IAM review system 228 for conducting deviation reconciliation and identifying outliers. In FIG. 19, a flowchart 1900 of example method steps for performing deviation reconciliation is shown. The reconciliation module 428 may receive IAM information from the IAM data store 222 (block 1902). With respect to user roles, the reconciliation module 428 may receive user role information 1802 from the IAM data store 222. With respect to resources 210, the reconciliation module 428 may receive access report information 316 from the IAM security system 226 that indicate which users accessed the resource. The reconciliation module 428 may also receive user attribute information 1804 from the IAM data store (block 1904). User attribute information 1804 may include, e.g., metadata respectively associated with one or more users.

The reconciliation module 428 may identify outliers based on a comparison of the respective user attributes for a set of users. The reconciliation module 428 may thus select one or more user attributes (block 1906) with which to evaluate a set of users assigned a particular role or that accessed a particular resource. Attributes that may be selected for deviation reconciliation may include, for example, job code, job title, location, business division, and so forth. The reconciliation module 428 may then select a user to evaluate (block 1908) and compare the user attributes of the selected user to the user attributes of the other users (block 1910). Based on the comparison of user attributes, the reconciliation module 428 may calculate an attribute deviation score 1806 ("deviation score") for the selected user (block 1912). The deviation score 1806 may quantify the extent to which the values of the selected attributes of the selected user deviate from the values of the selected attributes of the other users. Stated differently, the deviation score 1806 may quantify a difference between values of one or more attributes of a user and corresponding values of attributes of one or more other users.

In some example implementations, the deviation score 1806 may be an overall deviation score that is an aggregate of multiple individual attribute deviation scores. An attribute deviation score may quantify the extent to which the value of a particular attribute for the selected user deviates from the values of that user attribute for the other users. For example, an attribute deviation score may correspond to the percentage of users having a particular user attribute value relative to all other users. The reconciliation module 428 may aggregate the individual attribute deviation scores by computing the arithmetic average, the sum, or other type of aggregate value.

The reconciliation module 428 may determine whether a user is an outlier based on a deviation score 1806 obtained for the user. In some example implementations, the reconciliation module 428 may compare the deviation score 1806 obtained for the selected user to an attribute deviation threshold 1808 (block 1914). Depending on the particular implementation, the selected user may be determined to be an outlier if the deviation score 1806 is above or below the attribute deviation threshold 1808. If the selected user is determined to be an outlier (block 1916:Y), then the reconciliation module may identify the selected user as an outlier in the deviation reconciliation report 1810. If the selected user is not determined to be an outlier (block 1916:N), then the reconciliation module 428 may determine whether there are more users to evaluate and, if so (block 1920:Y), select the next user for evaluation (block 1922). Once the reconciliation module 428 has evaluated all of the users (block 1920:N), the reconciliation module may provide the deviation reconciliation report 1810 to an administrator (block 1924). In addition, to identifying the user as an outlier in the deviation reconciliation report, the reconciliation module 428 may also automatically create a review for the outlier user (e.g., a role review of an access review) and assign the new review to the manager that supervises the user or the resource. The administrator may then advantageously investigate the roles assigned to the outlier users or the access rights provisioned for the outlier users to determine whether any roles should be removed or whether any access rights should be revoked. The reconciliation module 428 may perform steps similar to those shown by way of example in FIG. 19 in order to identify outliers in a set of users that are each associated with an access right of the computing system 200.

As an example, the deviation threshold 1808 may be set to 10% such that a user having a deviation score below 10% is determined to be an outlier and a user having a deviation score at or above 10% is not determined to be an outlier. The job code for a user under evaluation may correspond to "bank manager," and that user may be assigned the role of "bank teller." The reconciliation module 428 may determine that 99% of users assigned the role of "bank teller" also have the job code that corresponds to "bank teller." In contrast the reconciliation module 428 may determine that only 1% of users assigned the role of "bank teller" have the job code that corresponds to "bank manager." The deviation score 1806 for the user under evaluation may thus be 1%, less than deviation threshold of 10%. The reconciliation module 428 may thus identify the user under evaluation in this example as outlier in the deviation reconciliation report. An administrator may then investigate whether the role of "bank teller" should be removed from the user. In another example, the deviation score 1806 for a user under evaluation may be based on three aggregated deviations scores, e.g., a geographic location deviation score, a job code deviation score, and a business division deviation score. The reconciliation module 428 may aggregate these three attribute deviation scores to obtain an overall deviation score and compare the overall deviation score to the deviation threshold 1808.

5. Risk Management

The IAM review system 228 may also be utilized to manage risk associated with the enterprise-wide computing system 200. Risk management, in this context may include, identifying and responding to potential risk violations as well as managing relatively high-risk resources. Accordingly the risk management module 426 of the IAM review system 228 may be configured to facilitate these types of risk management.

Figure 20:
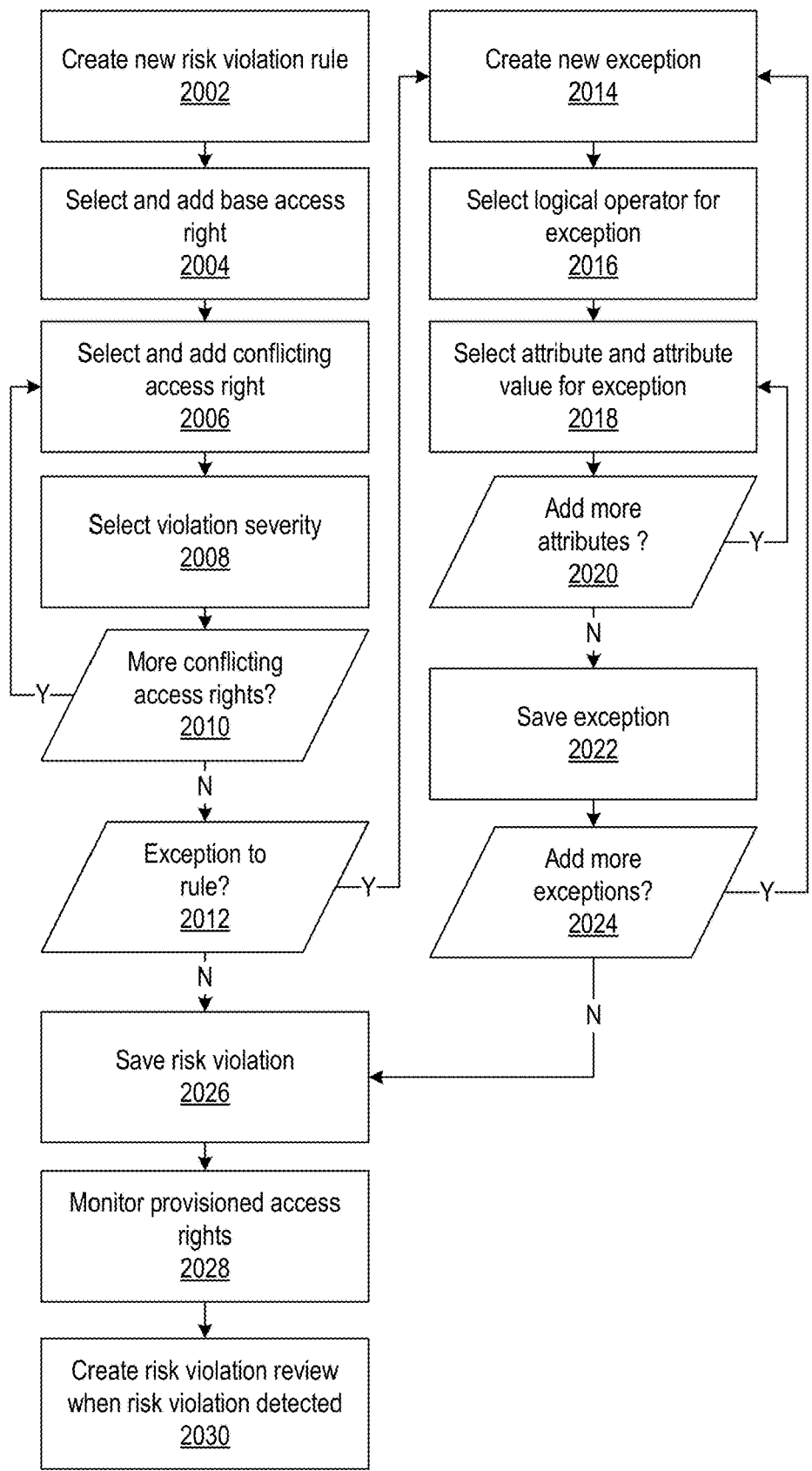
FIG. 20 is a flowchart of example method steps for defining risk violation rules and corresponding exceptions.

A risk manager may, for example, utilize the risk management module 426 to define risk violations and exceptions as shown above with reference to FIGS. 5I and 5J. In FIG. 20 a flowchart 2000 of example method steps for defining risk management rules and corresponding exceptions is shown. The risk manager may create a new risk management rule using the risk management module 426 (block 2002). The risk manager may select and add the base access right for the new risk management rule (block 2004). The base access right may be a role, task, or permission as described above. The risk manager may then select and add an access right that conflicts with the base access right (block 2006). The conflicting access right may also be a role, task, or permission as described above. In this way, the risk management module 426 advantageously enables the risk manager to configure various combinations of conflicting access rights, e.g., tasks that conflict with roles, permission that conflict with tasks, and so forth. The risk management module 426 may also enable the risk manager to select a violation severity level for the conflicting access right selected (block 2008). The risk management module 426 may utilize the violation severity level when creating a violation review in response to a violation of a risk management rule. The risk management module 426 may, for example, set the due date of the violation review based on the violation severity level of the risk management rule that was violated. The due date may also be relative to the date when the violation of the risk management rule occurred. By way of example, where the violation severity level is "critical" or "high," the due date may be set as one day from the date the violation occurred; where the violation security level is "medium" or "low," the due date may be set as three days from the date the violation occurred. Additional and alternative due dates may be selectively employed.

The risk management module 426 may enable the risk manager to add multiple conflicting access rights to the risk management rule under construction. Accordingly if there are more conflicting access rights to add (block 2010:Y), then the risk manager may repeat steps 2006-2008 to add additional conflicting access rights. The risk management module 426 may also enable the risk manager to add one or more exceptions to the risk management rule. Accordingly if there are exceptions to the risk management rule (block 2012:Y), the risk manager may create a new exception (block 2014). As shown above, the risk management module 426 may enable the risk manager to configure the risk exception by selecting a logical operator for the exception (block 2016) and select an attribute and corresponding attribute value (block 2018) for the exception. The risk manager may configure an exception to depend on multiple user attributes. Accordingly if there are additional attributes to add to the exception (block 2020:Y), the risk manager may repeat steps 2016-2018 to add additional user attributes to the exception. If there are no additional user attributes to add (block 2020:N), then the risk manager may save the exception. The risk manager may also add multiple exceptions to a risk management rule under construction. If there are additional exceptions to add (block 2024:Y), then the risk manager may repeat steps 2014-2022 to add another exception.

Once the risk manager has added any desired exceptions (block 2024:N)—or if there are no exceptions to the risk management rule (block 2012:N)—the risk manager may save the new risk violation (block 2026). The risk management module 426 may then monitor the access rights provisioned for a user (block 2028). If the risk management module 426 detects a risk violation, then the risk management module may create a new risk violation review for the detected risk violation (block 2030). As described above, the IAM review system 228 may present a list of risk management rules that have been violated at a violation review interface 630 (FIG. 5H). A violation review interface may identify the risk management rule associated with a pending violation review listed at the violation review interface. A violation review interface may also identify any exceptions that have been added to the risk management rule and whether those exceptions apply. The risk management module 426 may, for example, compare the attribute values selected for the exception to the attribute values of the user associated with the violation review. The risk management module 426 may also determine whether an expiration date for an exception associated with the risk management rule has passed, i.e., when the current date is after the expiration date. A reviewer may then review the risk violation using the access review module 424 and determine whether any exceptions apply to the risk violation. If the reviewer decides to approve the risk violation, then the access review module 424 may prompt the reviewer to provide a justification for the approval. The reviewer may, for example, justify the approval of the risk violation by noting the attributes of the user associated with the risk violation match the attributes configured for the risk exception and that the risk exception has not yet expired.

A risk manager may also, for example, utilize the risk management module 426 to express risk associated with resources at a granular permission level. It will be appreciated that in an enterprise-wide computing system some resources may be associated with relatively more risk than other resources. In the banking context, for example, an application capable of moving money between accounts may represent relatively more risk than an application for tracking employee timesheets. Accordingly the application capable of moving money between accounts may be identified as a "high priority" application. User entitlements for "high priority" applications may thus be reviewed frequently. The permissions associated with an application, however, may not all represent the same level of risk. Even in a "high priority" application, some permissions may represent relatively more risk than other permissions. Continuing the previous example, a permission to execute a money transfer may represent relatively more risk than a permission to read customer information associated with the account. Such permissions representing relatively more risk may be similarly identified as "high priority" permissions.

The risk management module 426 advantageously allows a risk manager to identify "high priority" permissions by indicating which permissions associated with a resource require review as shown above with reference to FIG. 5E and FIG. 5G. Selecting which permissions of a resource require review may be referred to as granular risk expression. Granular risk expression advantageously reduces the number of entitlements that need to be reviewed by the enterprise for effective risk management. Instead of reviewing every entitlement associated with a "high priority" application, reviewers may instead review only those entitlements that represent a relatively high level of risk, e.g., only "high priority" permissions selected as requiring review. In an enterprise-wide computing system having thousands of resources each having dozens of permissions, the total number of user entitlements may be in the hundreds of thousands. This represents potentially hundreds of thousands of access reviews that need to be performed periodically or on-demand. Through granular risk expression, it has been demonstrated that an enterprise may advantageously reduce the number of access reviews to perform by an order of magnitude.

Figure 21:
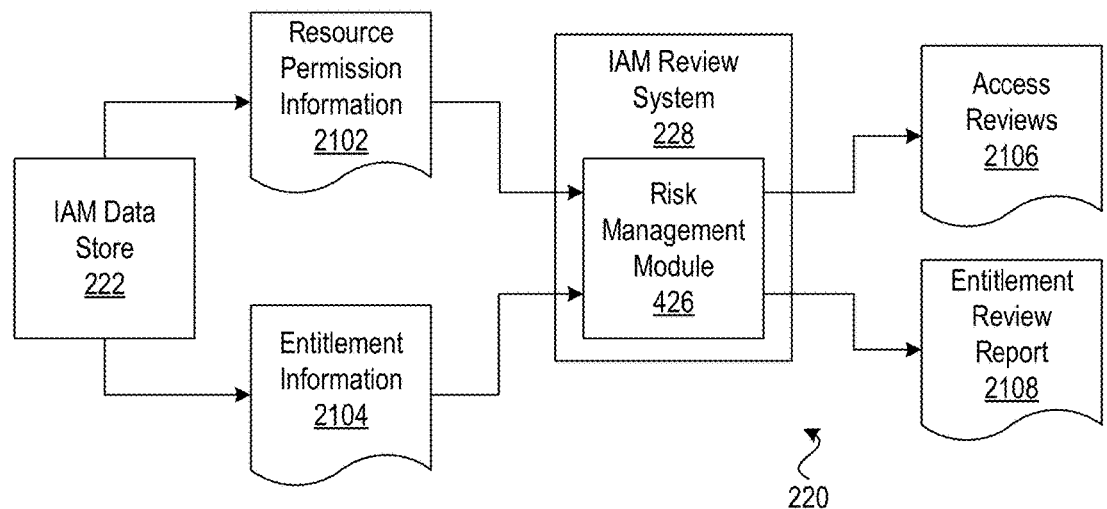
FIG. 21 is a block diagram illustrating an example workflow between components of an identity and access management system for expressing granular risk and performing access reviews based on granular risk.
Figure 22:
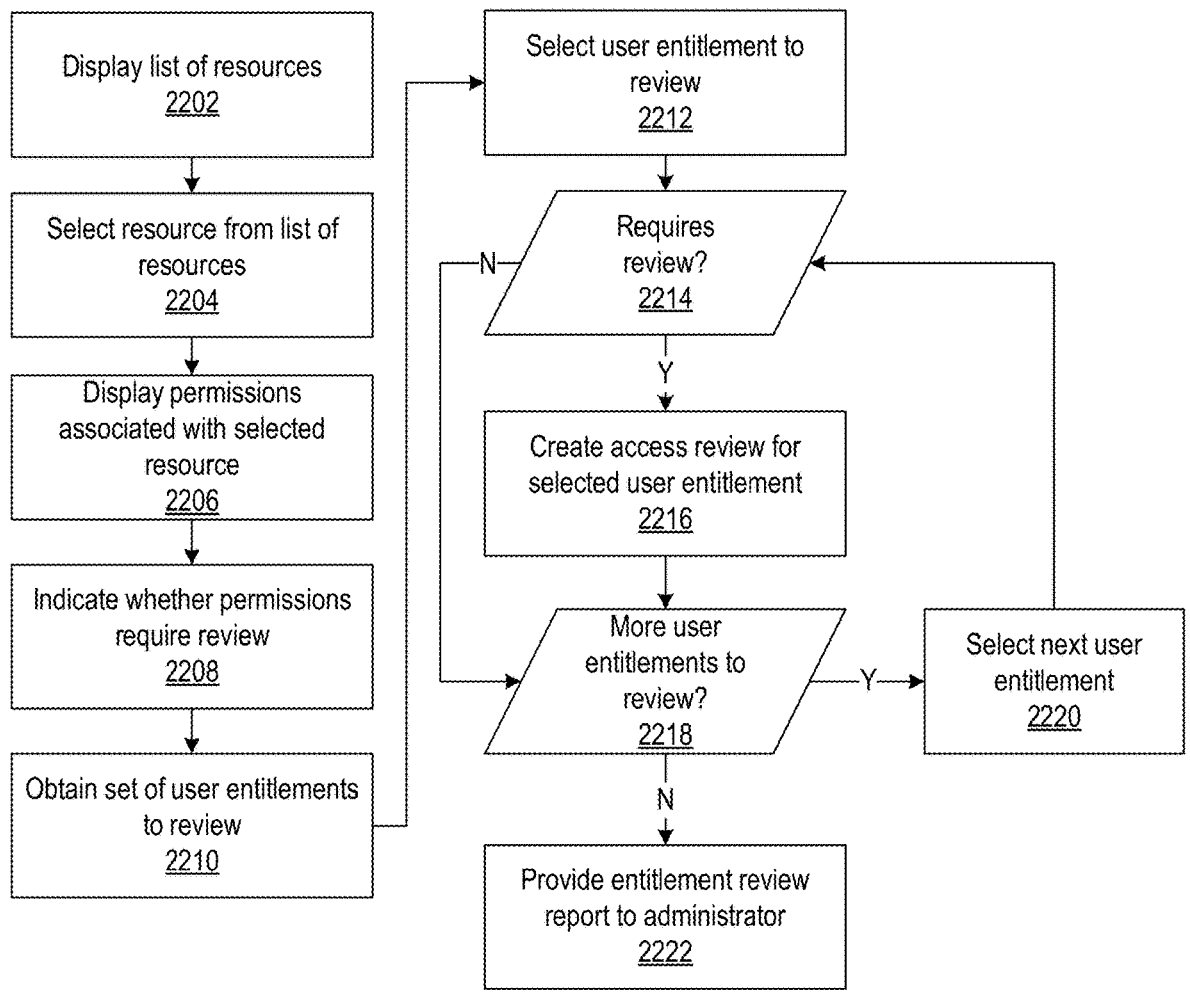
FIG. 22 is a flowchart of example method steps for expressing granular risk.

FIG. 21 illustrates an example workflow between components of the IAM review system 228 for expressing granular risk and performing access reviews based on granular risk. In FIG. 22, a flowchart 2200 of example method steps for expressing granular risk is shown. A risk manager may navigate to a resource detail interface using the IAM review system 228 as described above. The resource detail interface may display a list of resources assigned to the risk manager to supervise (block 2202). The risk manager may then select one of the resources (block 2204) to display the permissions associated with the selected resource (block 2206). The risk manager may then indicate which permissions associated with the selected resource requires review (block 2208). The IAM data store 222 may store resource permission information 2102 that includes an indication of whether a resource permission requires review, e.g., a review flag as described above. In this way, a risk manager may manually set the review flag of a permission to a resource 210. In some example implementations, however, the risk management module 426 may automatically set the review flag for a permission based on a risk level set for that permission. The risk manager may, for example, set a risk level for the resource permission at a resource detail interface, e.g., "1" (low), "2" (medium), or "3" (high). The risk management module 426 may then compare the risk level set for the permission to a risk level threshold (e.g., 2) such that a resource requires review if the risk level for a permission exceeds a risk level threshold. If the risk level set for a permission exceeds the risk level threshold, then the risk management module 426 may automatically set the review flag of the permission to indicate the permission requires review. If the risk level set for the permission does not exceed the risk level threshold, then the risk management module 426 may automatically set the review flag of the permission to indicate the permission does not require review. The risk manager may also adjust the risk level threshold, and the risk management module 426 may reevaluate the respective risk levels of the permissions against the adjusted risk level threshold to determine whether any of the review flags should be update based on the adjusted risk level. Accordingly the resource permission information 2102 may additionally or alternatively include respective risk levels that have been selected for resource permissions.

The risk management module 426 may then obtain entitlement information 2104 from the IAM data store 222 (block 2210) and iterate over a list of entitlements to determine whether any resource permissions associated with the entitlements require review. The risk management module 426 may select an entitlement to review (block 2212) and determine whether the resource permission associated with the entitlement requires review (block 2214). As noted above a resource permission may require review if a risk manager has indicated review is required or if the risk level for the resource exceeds a risk threshold. If the permission associated with the entitlement requires review (block 2214: Y), then the risk management module 426 may create an access review 2106 for the selected user entitlement (block 2216) and assign the access review to a reviewer. If the resource permission does not require review (block 2214:N), then the risk management module 426 may determine whether there are more user entitlements to evaluate and, if so (block 2218:Y), select the next user entitlement for evaluation (block 2220).

The risk management module may also create an entitlement review report 2108 that lists permissions that do not require review along with explanation indicating why review of the permission is not required. For example, the entitlement review report 2108 may indicate that various resource permissions were not selected as requiring review during granular risk expression or that the respective risk levels associated with the permission do not exceed the risk threshold. If no more user entitlements remain to review (block 2218:N), then the risk management module 426 may provide the entitlement review report 2108 to an administrator for reference during a subsequent period or regulatory review (block 2222).

The risk management module 426 may store information corresponding to the risk management rules and exceptions and information corresponding to the granular risk expression in the data store 414 of the IAM review system 228 as risk management rule information 418.

6. Access Reviews

The IAM review system 228 may also improve the access review process within an enterprise. Different types of events may trigger an access review. First enterprises may periodically perform internal access reviews on a regular basis, e.g., bi-monthly, quarterly, yearly, and so forth. Second enterprises may be subject to regulations that require periodic external reviews from regulators. Third risk violations may trigger immediate reviews whenever such risk violations occur. The IAM review system 228 advantageously allows reviewers to leverage previously completed reviews during subsequent access review efforts thereby reducing the number of access reviews to complete. In particular, the IAM review system 228 tracks and dates when access reviews are completed such that the enterprise may receive credit for such reviews if still current when a subsequent review is initiated. Access reviews may remain current for a predetermined time period following completion, e.g., a week, a month, ninety days, and so forth.

As an example, a reviewer may complete a set of user, application, and other resource reviews during a quarterly access review. The following week, regulators may initiate an external regulatory review of the same users, applications, and other resources that were previously reviewed. A reviewer may thus retrieve the access review records for those users, applications, and other resources which indicate they have already been reviewed the previous week. As a result, the reviewer may advantageously avoid repeating such access reviews.

Figure 23:
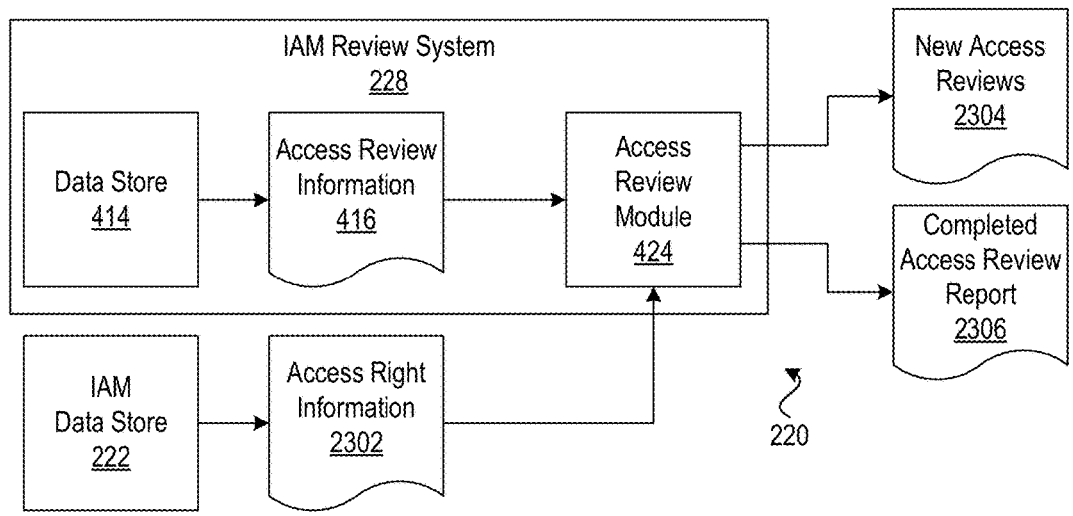
FIG. 23 is a block diagram illustrating an example workflow between components of an identity and access management system for leveraging completed access reviews during subsequent review events.
Figure 24:
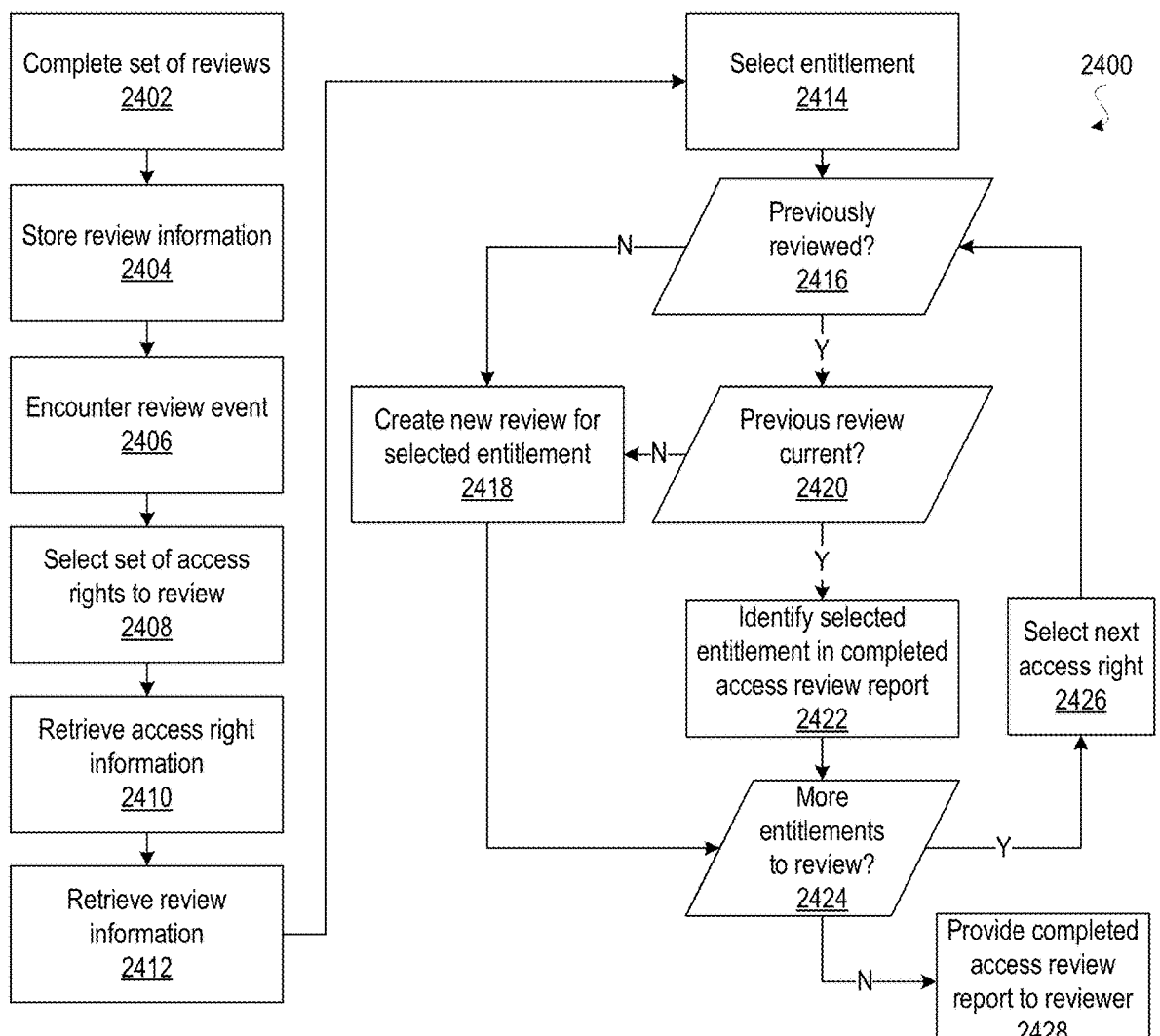
FIG. 24 is a flowchart of example method steps for leveraging completed access reviews during subsequent review events.

FIG. 23 illustrates an example workflow between components of the IAM review system 228 for leveraging completed access reviews during subsequent review events. In FIG. 24, a flowchart 2400 of example method steps for leveraging completed access reviews during subsequent review events is shown. The access review module 424 may determine whether an enterprise may get credit for previously completed reviews of access rights during subsequent review events. Stated differently, the access review module 424 may determine whether previously completed reviews of access rights are accreditable to those access rights during subsequent review event. As described above, a review event may be the start of a new internal review period at the enterprise, an external regulatory review, or a review of access rights in response to detection of a risk violation.

As described above, an enterprise may periodically perform a set of access reviews (block 2402), which may include reviews of users 216, resources 210, or roles defined in the enterprise computing system 200. During the access reviews, the IAM review system 228 may store access review information 416 (block 2404), e.g., as access review records at a data store 414. The access review information 416 may indicate, e.g., whether the access review has been completed, when the access review was performed, the individual that performed the access review, and the type of access review performed (e.g., periodic, regulatory, or risk violation).

Following completion of a set of access reviews, the enterprise may subsequently encounter a review event (block 2406). Upon encountering the review event, the access review module 424 may select a set of access rights to review (block 2408) and retrieve access right information 2302 associated with the selected access rights from the IAM data store 222 (block 2410). The set of selected access rights may include entitlements users utilize to access the resources 210 of the enterprise-wide computing system 200. The set of selected access rights may also include entitlements that resources 210 utilize to access other resources of the enterprise-wide computing system 200. The set of selected access rights may further include roles defined in the enterprise-wide computing system 200. The access review module 424 may also receive access review information 416 from the data store 414 of the IAM review system 228.

The access review module 424 may iterate over the set of selected access rights by selecting one of the access rights (block 2414) and comparing the selected access right to the access review information 416 in order to determine whether an access review has already been completed for the selected access right (block 2416). If the selected access right has not yet been reviewed (block 2416:N), then the access review module 424 may create a new access review 2304 for the selected access right (block 2418) and assign the new access review to a reviewer. If, however, an access review for the selected access right has been completed (block 2416:Y), then the access review module 424 may determine whether the previously completed access review is current (block 2420). As noted above, an access review may remain current for a predetermined time period (e.g., 90 days) following completion. If the time period following completion of the access review has not expired, then the access review may be considered to be current. If the time period following completion of the access review has expired, however, then the access review may also be considered as expired, i.e., not current. An expired access review may not be accreditable to an access right during a subsequent review event. If the previously completed access review is not current (block 2420:N), then the access review module may create a new access review 2304 for the selected entitlement (block 2418) and assign the new access review to a reviewer.

If, however, the previously completed access review is current (block 2420:Y), then the access review module may determine that the previously completed access review is accreditable to the selected access right for the current review event and identify the selected access right in a completed access review report 2306 (block 2422). The completed access review report 2306 may indicate the date the access review was completed, the event that triggered the completed access review (e.g., periodic, regulatory, or risk violation), and the date of the current review event. If there are more selected access rights to evaluate (block 2424:Y), then the access review module may select the next access right in the set of selected access rights for evaluation (block 2426). Once each access right in the set of selected entitlements has been compared to the access review information 416 (block 2424:N), the access review module 424 may provide the completed access review report 2306 to a reviewer for use during the review event (block 2428). By providing a completed access review report 2306, a reviewer may advantageously reduce the amount of reviews to complete during subsequent review events by leveraging completed access reviews that are still current.

Aspects of the disclosure have been described in terms of illustrative embodiments thereof. Numerous other embodiments, implementations, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A computer-implemented method of managing a computing system comprising:

storing, at a data store of a computing device, a computing resource list that indicates each computing resource of a plurality of computing resources of the computing system wherein each computing resource of the plurality of computing resources is configured to provide an access report that indicates which of one or more access rights have been used, during a predetermined time period, to access the computing resource;

storing, at the data store, access report information corresponding to a plurality of access reports respectively provided to the computing device by individual computing resources of the plurality of computing resources; and generating, by the computing device and in association with an evaluation of the plurality of computing resources for a current reporting period, a computing resource report that indicates which of the plurality of computing resources did not provide a current access report for the current reporting period, wherein the evaluation comprises iterating over the computing resource list and, for individual computing resources indicated in the computing resource list:

determining whether the computing resource provided a current access report for the current reporting period, and identifying, in the computing resource report, the computing resource as a non-reporting computing resource responsive to determining the computing resource did not provide a current access report for the current reporting period.

2. The computer-implemented method of claim 1, wherein:

the computing resource report further indicates which of the plurality of computing resources did provide a current access report for the current reporting period; and the evaluation further comprises, for individual computing resources indicated in the computing resource list, identifying, in the computing resource report, the computing resource as a reporting computing resource responsive to determining the computing resource did provide a current access report for the current reporting period.

3. The computer-implemented method of claim 1, further comprising:

transmitting, by the computing device and for display at a display device, the computing resource report to an administrator of the computing system.

4. The computer-implemented method of claim 1, wherein:

each computing resource of the plurality of computing resources is configured to provide the access report as one of a plurality of access reports provided by the computing resource at a predetermined periodic interval.

5. The computer-implemented method of claim 4, wherein:

the predetermined periodic interval is a daily interval.

6. The computer-implemented method of claim 1, wherein:
the access rights indicated in the access report comprise an entitlement provisioned to a user of the computing system.

7. The computer-implemented method of claim 6, wherein:
the access report further indicates at least one of the user, a user group associated with the entitlement, a role associated with the entitlement, or combinations thereof.

8. A computing device for managing a computing system, the computing device comprising:
one or more processors;
a data store storing (i) a computing resource list that indicates each computing resource of a plurality of computing resources of the computing system wherein each computing resource of the plurality of computing resources is configured to provide an access report that indicates which of one or more access rights have been used, during a predetermined time period, to access the computing resource, and (ii) access report information corresponding to a plurality of access reports respectively provided to the computing device by individual computing resources of the plurality of computing resources; and
memory storing computer-executable instructions that, when executed by the one or more processors, cause the computing device to:
generate, in association with an evaluation of the plurality of computing resources for a current reporting period, a computing resource report that indicates which of the plurality of computing resources did not provide a current access report for the current reporting period, wherein the evaluation comprises iterating over the computing resource list and, for individual computing resources indicated in the computing resource list:
determining whether the computing resource provided a current access report for the current reporting period, and
identifying, in the computing resource report, the computing resource as a non-reporting computing resource responsive to determining the computing resource did not provide a current access report for the current reporting period.

9. The computing device of claim 8, wherein:
the computing resource report further indicates which of the plurality of computing resources did provide a current access report for the current reporting period; and
the evaluation further comprises, for individual computing resources indicated in the computing resource list, identifying, in the computing resource report, the computing resource as a reporting computing resource responsive to determining the computing resource did provide a current access report for the current reporting period.

10. The computing device of claim 8, wherein:
the computer-executable instructions, when executed, further cause the computing device to transmit, for display at a display device, the computing resource report to an administrator of the computing system.

11. The computing device of claim 8, wherein:
each computing resource of the plurality of computing resources is configured to provide the access report as one of a plurality of access reports provided by the computing resource at a predetermined periodic interval.

12. The computing device of claim 11, wherein:
the predetermined periodic interval is a daily interval.

13. The computing device of claim 8, wherein:
the access rights indicated in the access report comprise an entitlement provisioned to a user of the computing system.

14. The computing device of claim 13, wherein:
the access report further indicates at least one of the user, a user group associated with the entitlement, a role associated with the entitlement, or combinations thereof.

15. A non-transitory computer-readable storage medium having computer-executable instructions stored thereon that, when executed by one or more processors of a computing device, cause the computing device to:
store, at a data store of the computing device, a computing resource list that indicates each computing resource of a plurality of computing resources of a computing system wherein each computing resource of the plurality of computing resources is configured to provide an access report that indicates which of one or more access rights have been used, during a predetermined time period, to access the computing resource;
store, at the data store, access report information corresponding to a plurality of access reports respectively provided to the computing device by individual computing resources of the plurality of computing resources; and
generate, in association with an evaluation of the plurality of computing resources for a current reporting period, a computing resource report that indicates which of the plurality of computing resources did not provide a current access report for the current reporting period, wherein the evaluation comprises iterating over the computing resource list and, for individual computing resources indicated in the computing resource list:
determining whether the computing resource provided a current access report for the current reporting period, and
identifying, in the computing resource report, the computing resource as a non-reporting computing resource responsive to determining the computing resource did not provide a current access report for the current reporting period.

16. The non-transitory computer-readable storage medium of claim 15, wherein:
the computing resource report further indicates which of the plurality of computing resources did provide a current access report for the current reporting period; and
the evaluation further comprises, for individual computing resources indicated in the computing resource list, identifying, in the computing resource report, the computing resource as a reporting computing resource responsive to determining the computing resource did provide a current access report for the current reporting period.

17. The non-transitory computer-readable storage medium of claim 15, wherein:
the computer-executable instructions, when executed by the one or more processors, further cause the computing device to transmit, for display at a display device, the computing resource report to an administrator of the computing system.

18. The non-transitory computer-readable storage medium of claim 15, wherein:
    each computing resource of the plurality of computing resources is configured to provide the access report as one of a plurality of access reports provided by the computing device at a daily periodic interval.

19. The non-transitory computer-readable storage medium of claim 15, wherein:
    the access rights indicated in the access report comprise an entitlement provisioned to a user of the computing system; and
    the access report further indicates at least one of the user, a user group associated with the entitlement, a role associated with the entitlement, or combinations thereof.

20. The non-transitory computer-readable storage medium of claim 15, wherein:
    the plurality of computing resources comprise at least one of a server, a database, a software application, a software program, or combinations thereof.

* * * * *